United States Patent
Jung et al.

(10) Patent No.: US 10,595,271 B2
(45) Date of Patent: Mar. 17, 2020

(54) METHOD, APPARATUS, AND SYSTEM FOR TERMINAL IDENTIFICATION AND PAGING SIGNAL TRANSMISSION FOR TERMINAL IN POWER SAVING STATE

(71) Applicant: Samsung Electronics Co., Ltd., Gyeonggi-do (KR)

(72) Inventors: Byounghoon Jung, Gyeonggi-do (KR); Anil Agiwal, Gyeonggi-do (KR); Jungsoo Jung, Gyeonggi-do (KR); Hyukmin Son, Gyeonggi-do (KR); Sunheui Ryoo, Gyeonggi-do (KR); Jungmin Moon, Gyeonggi-do (KR); Seunghoon Park, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/863,486

(22) Filed: Jan. 5, 2018

(65) Prior Publication Data
US 2018/0192371 A1    Jul. 5, 2018

(30) Foreign Application Priority Data

Jan. 5, 2017 (KR) .......... 10-2017-0002078
May 4, 2017 (KR) .......... 10-2017-0056881
Aug. 10, 2017 (KR) .......... 10-2017-0101944

(51) Int. Cl.
*H04W 16/28* (2009.01)
*H04W 52/02* (2009.01)
(Continued)

(52) U.S. Cl.
CPC ...... *H04W 52/0216* (2013.01); *H04B 7/0408* (2013.01); *H04W 68/02* (2013.01); *H04W 72/046* (2013.01); *H04B 7/022* (2013.01); *H04B 7/088* (2013.01); *H04W 4/70* (2018.02); *H04W 72/085* (2013.01); *Y02D 70/00* (2018.01); *Y02D 70/10* (2018.01); *Y02D 70/12* (2018.01); *Y02D 70/126* (2018.01); *Y02D 70/1262* (2018.01); *Y02D 70/142* (2018.01); *Y02D 70/21* (2018.01); *Y02D 70/24* (2018.01)

(58) Field of Classification Search
CPC ... H04W 4/70; H04W 52/0216; H04W 68/02; H04W 72/046; H04W 72/085
See application file for complete search history.

(56) References Cited

U.S. PATENT DOCUMENTS

2005/0153657 A1   7/2005   Maruta
2006/0079220 A1   4/2006   Cha et al.
(Continued)

FOREIGN PATENT DOCUMENTS

WO    WO 2017/123060    7/2017

OTHER PUBLICATIONS

International Search Report dated Apr. 18, 2018 issued in counterpart application No. PCT/KR2018/000224, 4 pages.
(Continued)

*Primary Examiner* — Phuc H Tran
(74) *Attorney, Agent, or Firm* — The Farrell Law Firm, P.C.

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. The present disclosure relates to an operating method of a terminal in a power saving state, a method for identifying a terminal and transmitting a paging signal to the terminal at a base station, and a system including such a terminal and such a base station.

16 Claims, 43 Drawing Sheets

(51) Int. Cl.
  *H04W 68/02*   (2009.01)
  *H04W 72/04*   (2009.01)
  *H04B 7/0408*  (2017.01)
  H04W 4/70     (2018.01)
  H04W 72/08    (2009.01)
  H04B 7/022    (2017.01)
  H04B 7/08     (2006.01)

(56) References Cited

U.S. PATENT DOCUMENTS

| | | | |
|---|---|---|---|
| 2011/0065448 A1* | 3/2011 | Song | H04B 7/0632 455/452.2 |
| 2011/0096738 A1 | 4/2011 | Choi | |
| 2013/0329642 A1 | 12/2013 | Yu | |
| 2016/0014718 A1 | 1/2016 | Mysore Balasubramanya et al. | |
| 2016/0191201 A1 | 6/2016 | Park et al. | |
| 2016/0192439 A1 | 6/2016 | Phuyal et al. | |
| 2016/0309282 A1 | 10/2016 | Xu et al. | |
| 2017/0207843 A1 | 7/2017 | Jung et al. | |
| 2018/0138590 A1* | 5/2018 | Uchida et al. | H04B 7/0413 |

OTHER PUBLICATIONS

Huawei et al., "Discussion on Beam Management Aspects for DL MIMO", R1-1611670, 3GPP TSG RAN WG1 Meeting #87, Nov. 14-18, 2016, 7 pages.
Samsung, "QCL Relations for Different Types of RS", R1-1612492, 3GPP TSG RAN WG1 #87, Nov. 14-18, 2016, 5 pages.
European Search Report dated Aug. 19, 2019 issued in counterpart application No. 18736023.5-1219, 11 pages.

* cited by examiner

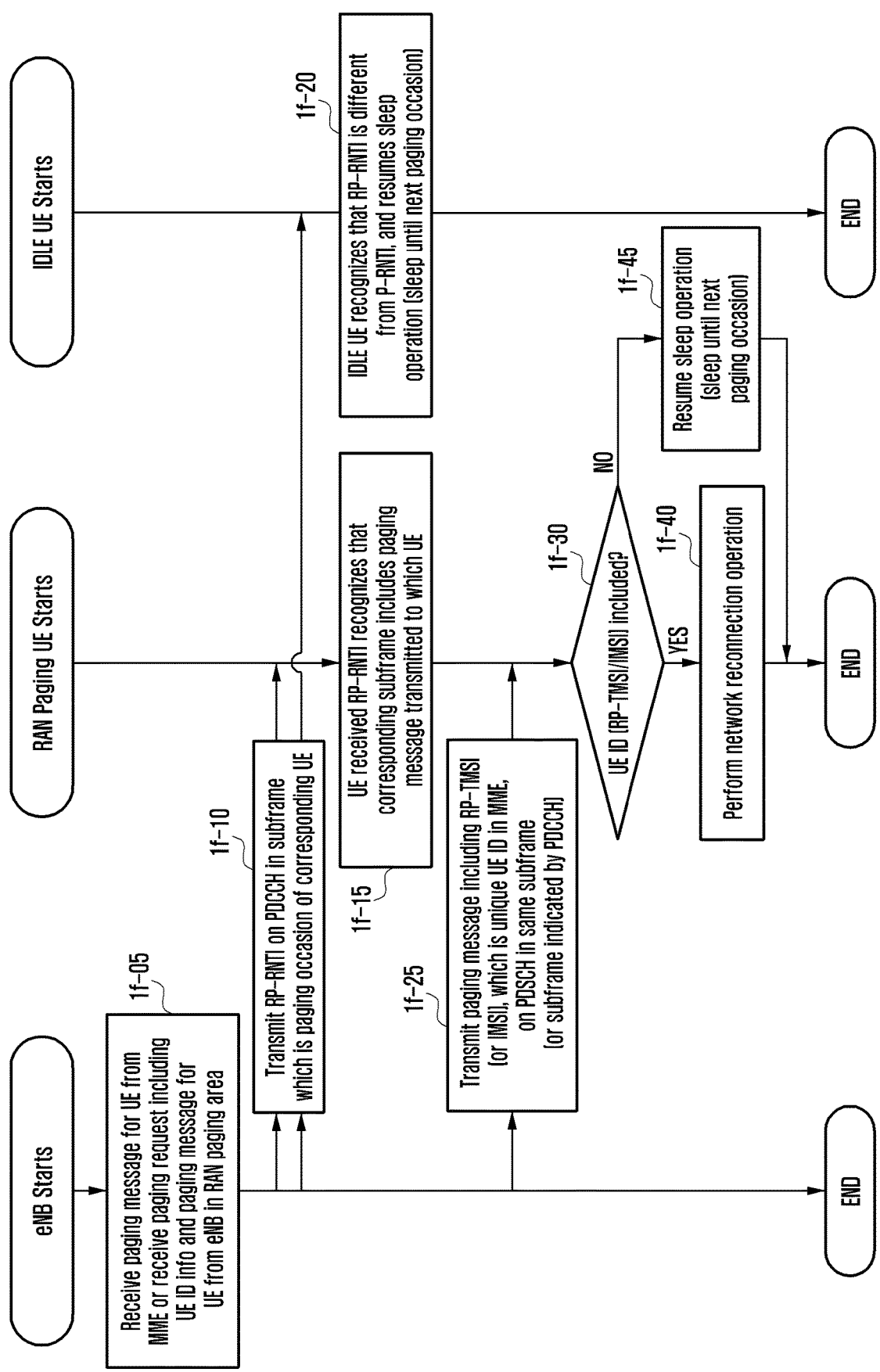

FIG. 1M

| C-RNTI | Paging PCH Config. | UL-SCH Config |

FIG. 10

| P-RNTI (or other RNTI) | Paging PCH Config. | UL-SCH Config |

FIG. 1Q

| C-RNTI | Paging PCH Config. | UL-SCH Config | CONN. Request indeicator |
|---|---|---|---|

FIG. 1S

| P-RNTI (or other RNTI) | Paging PCH Config. | UL-SCH Config | CONN. Request indeicator |

FIG. 1U

| P-RNTI (or other RNTI) | Paging PCH Config. | Dedicated RACH Preamble(s) |

FIG. 1W

| UE ID<br>(S-TMSI,<br>IMSI,<br>C-RNTI,<br>RNTI) | Dedicated<br>RACH<br>Preamble(s) |
|---|---|

FIG. 2D

| BI$_1$ | | | | | | | | OCt 1 |
| BI$_1$ | BI$_2$ | | | | | | | OCt 2 |
| BI$_2$ | | BRSRP | | | | | | OCt 3 |
| BRSRP | R | R | R | R | R | R | R | OCt 4 |

. . .

| BI$_1$ | | | | | | | | OCt n |
| BI$_1$ | BI$_2$ | | | | | | | OCt n+1 |
| BI$_2$ | | BRSRP | | | | | | OCt n+2 |
| BRSRP | R | R | R | R | R | R | R | OCt n+3 |

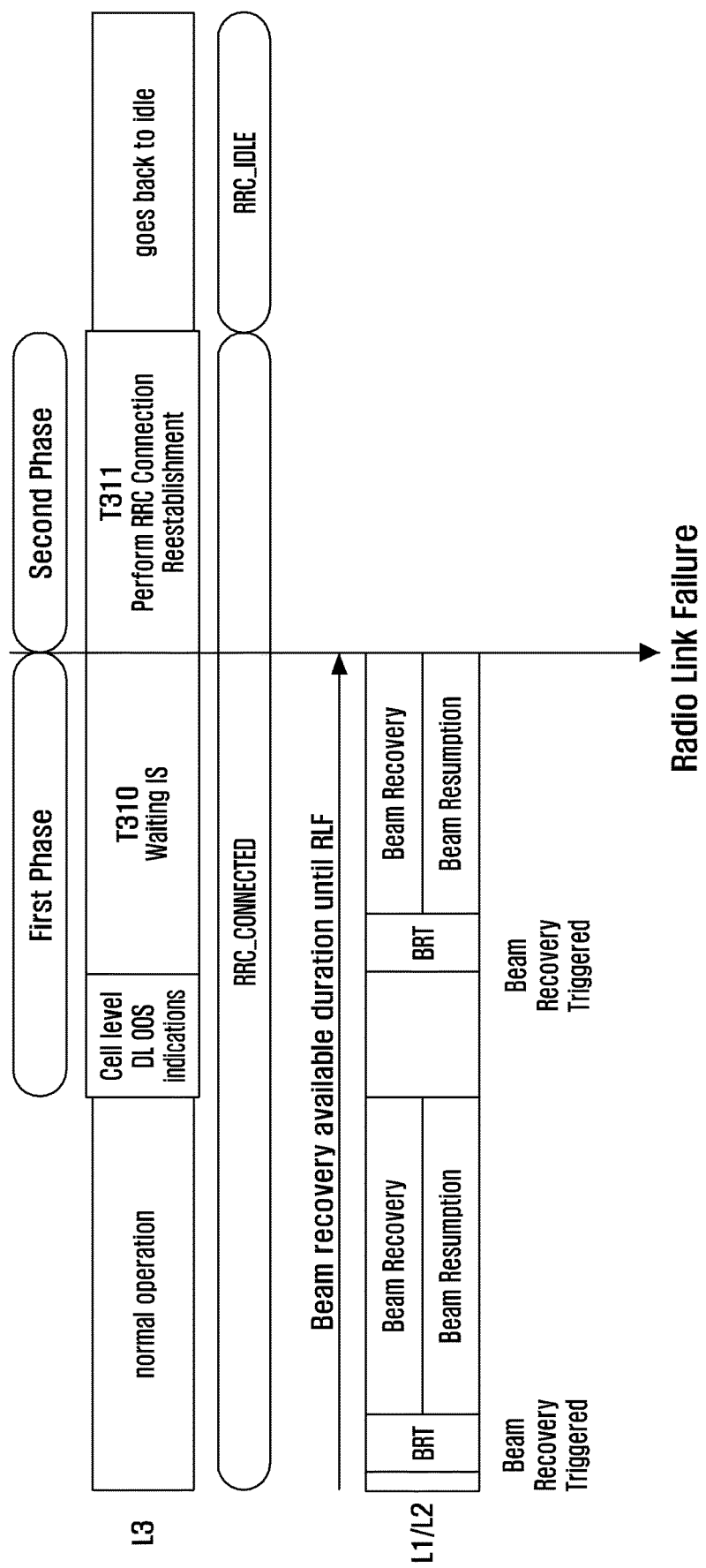

METHOD, APPARATUS, AND SYSTEM FOR TERMINAL IDENTIFICATION AND PAGING SIGNAL TRANSMISSION FOR TERMINAL IN POWER SAVING STATE

PRIORITY

The present application claims priority under 35 U.S.C. § 119(a) to Korean Patent Applications filed in the Korean Intellectual Property Office on Jan. 5, 2017, May 4, 2017, and Aug. 10, 2017, and assigned Serial No. 10-2017-0002078, Serial No. 10-2017-0056881, and Serial No. 10-2017-0101944, respectively, the entire contents of each of which are incorporated herein by reference.

BACKGROUND

1. Field of the Disclosure

The present disclosure relates to a next generation wireless communication system and, more particularly, to an operating method of a terminal in a power saving state, a method for identifying a terminal and transmitting a paging signal to the terminal at a base station, and a system including such a terminal and such a base station.

2. Description of Related Art

Wireless data traffic has increased since deployment of 4G communication systems. To meet demands for such an increase in traffic, efforts have been made to develop an improved 5th-generation (5G) or pre-5G communication system. Therefore, the 5G or pre-5G communication system is also called a "beyond 4G network" or a "post long term evolution (LTE) system". The 5G communication system is implemented in higher frequency wavelength bands (e.g., 60 GHz bands) so as to accomplish higher data rates. To decrease propagation loss of the radio waves and increase transmission distance, beamforming, massive multiple-input multiple-output (MIMO), full dimensional MIMO (FD-MIMO), array antenna, analog beam forming, and large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), and reception-end interference cancellation. In the 5G system, hybrid frequency-shift keying (FSK), quadrature amplitude modulation (QAM), sliding window superposition coding (SWSC) as an advanced coding modulation (ACM), filter bank multi carrier (FBMC), non-orthogonal multiple access (NOMA), and sparse code multiple access (SCMA) as an advanced access technology have been developed.

The Internet is now evolving to the Internet of things (IoT), where distributed entities exchange and process information without human intervention. The Internet of everything (IoE), which is a combination of the IoT technology and big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, and a machine type communication (MTC), have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud radio access network (RAN) as the above-described big data processing technology may also be considered as an example of convergence between the 5G technology and the IoT technology.

The 5G system supports various services compared to the existing 4G system. For example, representative services are an enhanced mobile broadband (eMBB) service, an ultra-reliable and low latency communication (URLLC) service, a massive machine type communication (mMTC) service, and an evolved multimedia broadcast/multicast service (eMBMS). A system that provides the eMBB service may be referred to as an eMBB system. Similarly, a system providing the URLLC service may be referred to as a URLLC system, and a system providing the mMTC service may be referred to as an mMTC system. Also, the terms "service" and "system" may be used interchangeably.

SUMMARY

The present disclosure has been made to address at least the above-mentioned problems and/or disadvantages and to provide at least the advantages described below.

Accordingly, an aspect of the present disclosure provides an operating method of a terminal in a power saving state, a method for identifying a terminal and transmitting a paging signal to the terminal at a base station, and a system including such a terminal and such a base station.

Accordingly, another aspect of the present disclosure provides a system, method, and apparatus for performing beam tracking and feedback operations in a beamforming based system.

Another aspect of the present disclosure provides a system, method, and apparatus for performing beam tracking and feedback operations in a beamforming based system.

Another aspect of the present disclosure provides a beam feedback and management method in a wireless communication system having a base station and a terminal both using multiple antennas.

Another aspect of the present disclosure provides a beam feedback and tracking method by which a terminal notifies beam measurement information to a base station through an indicator in a system and environment using beamforming based on multiple antennas.

Another aspect of the present disclosure provides a beam feedback and management method in a wireless communication system having a base station and a terminal both using multiple antennas.

Another aspect of the present disclosure provides a system that includes at least one base station and at least one terminal, wherein the terminal operates in a power saving state, and the base station identifies and recognizes an individual terminal and transmits a paging signal to that terminal.

In accordance with an aspect of the present disclosure, an operating method of a base station in a wireless communication system includes receiving beam measurement information from a terminal, determining a transmission beam change of the base station for the terminal, based on the beam measurement information, and changing a transmission beam of the base station, based on a relationship between a new transmission beam of the base station and a current reception beam of the terminal included in the beam measurement information.

In accordance with an aspect of the present disclosure, a base station includes a transceiver configured to transmit and receive a signal, and a controller configured to control receiving beam measurement information from a terminal, determining a transmission beam change of the base station for the terminal, based on the beam measurement information, and changing a transmission beam of the base station, based on a relationship between a new transmission beam of the base station and a current reception beam of the terminal included in the beam measurement information.

In accordance with an aspect of the present disclosure, an operating method of a terminal in a wireless communication system includes performing a beam measurement for at least one transmission beam of a base station and at least one beam of the terminal, transmitting beam measurement information to the base station, based on the beam measurement, and receiving downlink information through a new transmission beam of the base station, wherein the new transmission beam of the base station is changed, based on a relationship between the new transmission beam of the base station and a current reception beam of the terminal included in the beam measurement information.

In accordance with an aspect of the present disclosure, a terminal includes a transceiver configured to transmit and receive a signal, and a controller configured to control performing a beam measurement for at least one transmission beam of a base station and at least one beam of the terminal, transmitting beam measurement information to the base station, based on the beam measurement, and receiving downlink information through a new transmission beam of the base station, wherein the new transmission beam of the base station is changed, based on a relationship between the new transmission beam of the base station and a current reception beam of the terminal included in the beam measurement information.

BRIEF DESCRIPTION OF THE DRAWINGS

The above and other aspects, features, and advantages of the present disclosure will be more apparent from the following description taken in conjunction with the accompanying drawings, in which:

FIG. 1F illustrates a method using both RP-RNTI and RP-TMSI, according to an embodiment of the present disclosure;

FIG. 1M illustrates uplink transmission resource allocation in a paging physical downlink control channel (PDCCH) for fast reconnection, according to an embodiment of the present disclosure;

FIG. 1O illustrates uplink transmission resource allocation in the paging PDCCH for fast reconnection, according to an embodiment of the present disclosure;

FIG. 1Q illustrates uplink transmission resource allocation and indicator addition in a paging PDCCH for fast reconnection, according to an embodiment of the present disclosure;

FIG. 1S illustrates uplink transmission resource allocation and indicator addition in the paging PDCCH for fast reconnection, according to an embodiment of the present disclosure;

FIG. 1U is a diagram illustrating transmitting RNTI, according to an embodiment of the present disclosure;

FIG. 1W is a diagram illustrating transmitting a paging message and preamble, according to an embodiment of the present disclosure;

FIG. 2D is a diagram illustrating a frame structure for feeding back a multi-beam ID and a beam measurement value, according to an embodiment of the present disclosure;

FIGS. 2K to 2P illustrate methods for a terminal to attempt a beam recovery request transmission when a certain condition is satisfied, in association with a radio link failure (RLF) operation, according to an embodiment of the present disclosure.

DETAILED DESCRIPTION

Figure 1A:
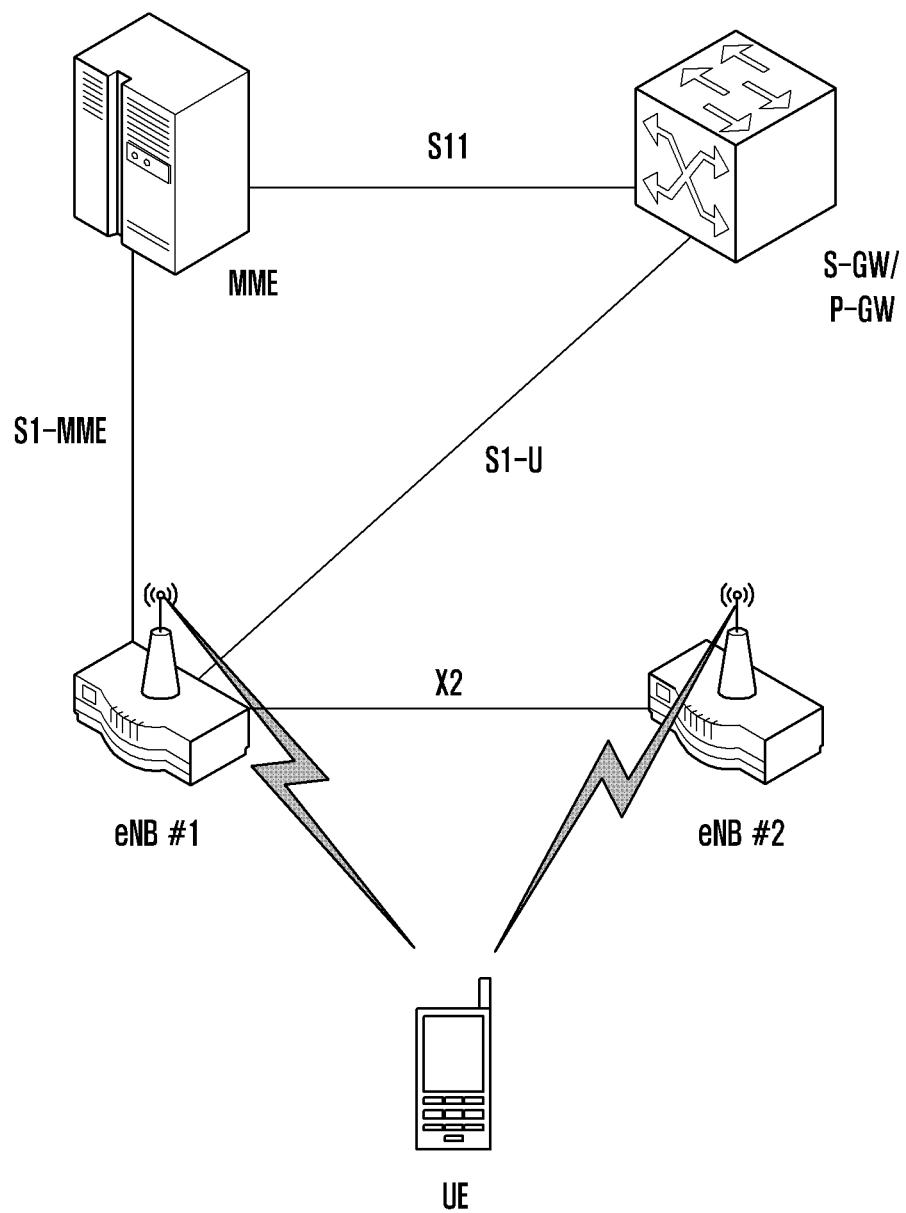
FIG. 1A illustrates a RAN paging procedure, according to an embodiment of the present disclosure.

Embodiments of the present disclosure are described in detail with reference to the accompanying drawings, in which similar reference numerals may be used to refer to similar elements. However, it should be understood that there is no intent to limit the present disclosure to the particular forms disclosed herein; rather, the present disclosure should be construed to cover various modifications, equivalents, and/or alternatives of embodiments of the present disclosure.

In this disclosure, the term "base station" is used interchangeably with "eNB". Also, the term "terminal" is used interchangeably with "user equipment (UE)".

[Embodiment A: Inactive UE ID]

With the advent of smart phones, the use of smart phones is growing exponentially and there is a growing demand for an increase in battery life to use smart phones for a long time. This means that efficient power saving technology is required, and a terminal is also required to operate in a power saving state. For efficient power saving of a terminal, in order for a terminal to operate in a power saving state more frequently, and for more quickly reestablishing the connection with a network, various techniques have been proposed and standardized.

Typical techniques for power saving in smartphones are a power saving state UE operation in sub-state of RRC Connected State, a power saving state UE operation in sub-state of RRC IDLE State, or a power saving state UE operation in new RRC state, an LTE lightly connected state operation, a 5G NR RRC_INACTIVE state operation, and a WLAN (IEEE 802.11) power save mode operation.

If there is no transmission/reception information for a certain period of time, or if another condition is satisfied, a terminal performs the transition to a power saving state (LC: lightly connected state, INACTIVE: RRC_INACTIVE state). This state is different from an IDLE state in that the base station and the terminal maintain terminal information and network connection information (S1 information) of the terminal, and the core network assumes that the terminal is still in a connected state (RRC_Connected). The reason for maintaining the S1 information in this way is so the network can perform reconnection for the terminal very quickly. The terminal that operates in the power saving state will wake up by itself and reconnect with the network if there is information to be transmitted, and will wake up through paging of the base station and reconnect with the network if the base station receives any downlink information from the network.

For paging of the base station (RAN based paging), a bundle of base stations transmitting the paging is defined as an RAN paging area, and the corresponding information is provided to the terminal. The terminal that knows the RAN paging area information periodically wakes up during a power saving state operation and determines whether the terminal is still in the already-known RAN paging area. If so, the terminal should check a promised subframe to determine whether there is downlink paging information. If the terminal is out of the RAN paging area while sleeping, the terminal should reestablish the connection with a neighbor base station and perform an RAN paging area update.

FIG. 1A illustrates a structure for RAN paging transmission including a core network, a base station, and a terminal, according to an embodiment of the present disclosure.

In order to transmit paging information to a terminal that operates in a power saving state, a terminal identifier for identifying a terminal is required, and a procedure for transmitting a paging message including an identifier may be required.

In case of the IDLE mode paging (i.e., CN paging) transmitted by a mobility management entity (MME), a paging-radio network temporary identifier (P-RNTI) is used to specify a subframe in which paging exists.

If there is a terminal to receive any paging, a P-RNTI value is transmitted while being included in a physical downlink control channel (PDCCH) of a subframe received at a given paging occasion by the terminal that periodically wakes up.

Figure 1B:
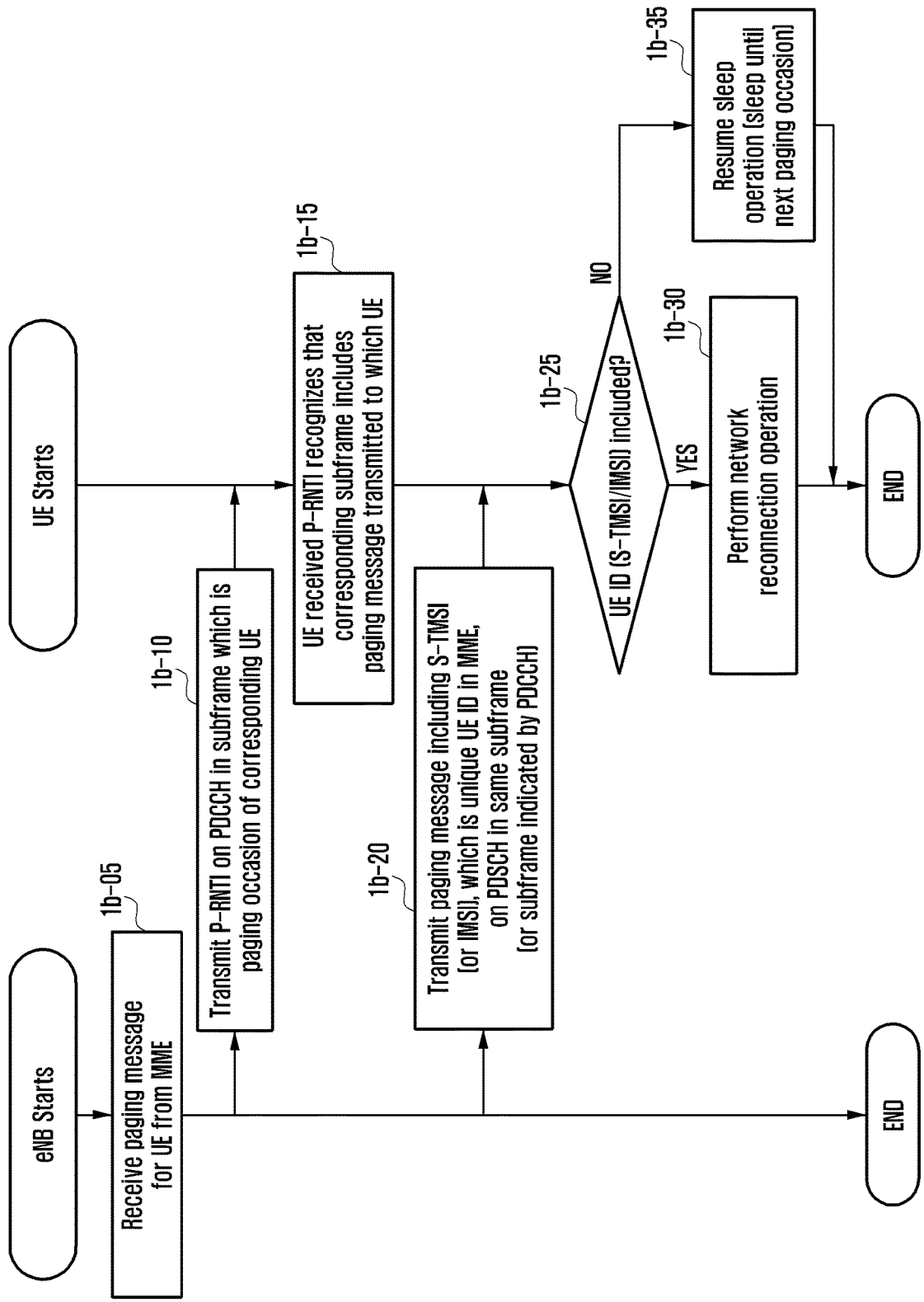
FIG. 1B illustrates a paging reception method of a terminal that operates in a power saving state, according to an embodiment of the present disclosure.

FIG. 1B illustrates a paging reception method of a terminal that operates in a power saving state, according to an embodiment of the present disclosure.

Referring to FIG. 1B, at operation 1b-05, a base station receives a paging message for a terminal from an MME.

At operation 1b-10, the base station transmits a P-RNTI on a PDCCH of a subframe received at a given paging occasion by the terminal that periodically wakes up.

At operation 1b-15, the terminal that receives the P-RNTI and determines that the corresponding subframe includes a paging message to be transmitted.

At operation 1b-20, the base station transmits a paging message through a physical downlink shared channel (PDSCH) of the same subframe or a PDSCH of a subframe indicated by a PDCCH. The paging message may include a system architecture evolution (SAE)-temporary mobile subscriber identity (S-TMSI) or an international mobile subscriber identity (IMSI), which is a unique terminal ID in the MME.

At operation 1b-25, the terminal checks whether the S-TMSI or IMSI, which is an identifier corresponding to the terminal, is included in the corresponding subframe. If it is included, operation 1b-30 is performed. If not, operation 1b-35 is performed. At operation 1b-30, the terminal performs a network reconnection operation. At operation 1b-35, the terminal resumes a sleep operation. The terminal may perform the sleep operation until the next paging occasion.

A method for specifying RAN paging subframe by defining new RNTI will now be described.

This method is to define a new RNTI (RAN paging RNTI: RP-RNTI) different from the P-RNTI and to enable the base station to perform paging for the terminal by using the RP-RNTI.

The base station may transmit the P-RNTI and/or the RP-RNTI through a PDCCH of a subframe received at a given paging occasion by the terminal that periodically wakes up. The transmission method may be a method of scrambling a cyclic redundancy check (CRC) of downlink control information (DCI) transmitted. The terminal that receives the PDCCH in one subframe is capable of distinguishing between CN paging and RAN paging through the P-RNTI and the RP-RNTI, and terminals corresponding to the CN paging and the RAN paging may be distinguished through the P-RNTI and the RP-RNTI. At this time, only the terminals that receive their own P-RNTI or RP-RNTI can additionally decode the PDSCH, and the other terminals can quickly return to the sleep mode.

Table 1 shows a new RNTI value, and Table 2 shows an example of using a new RNTI.

Figure 1C:
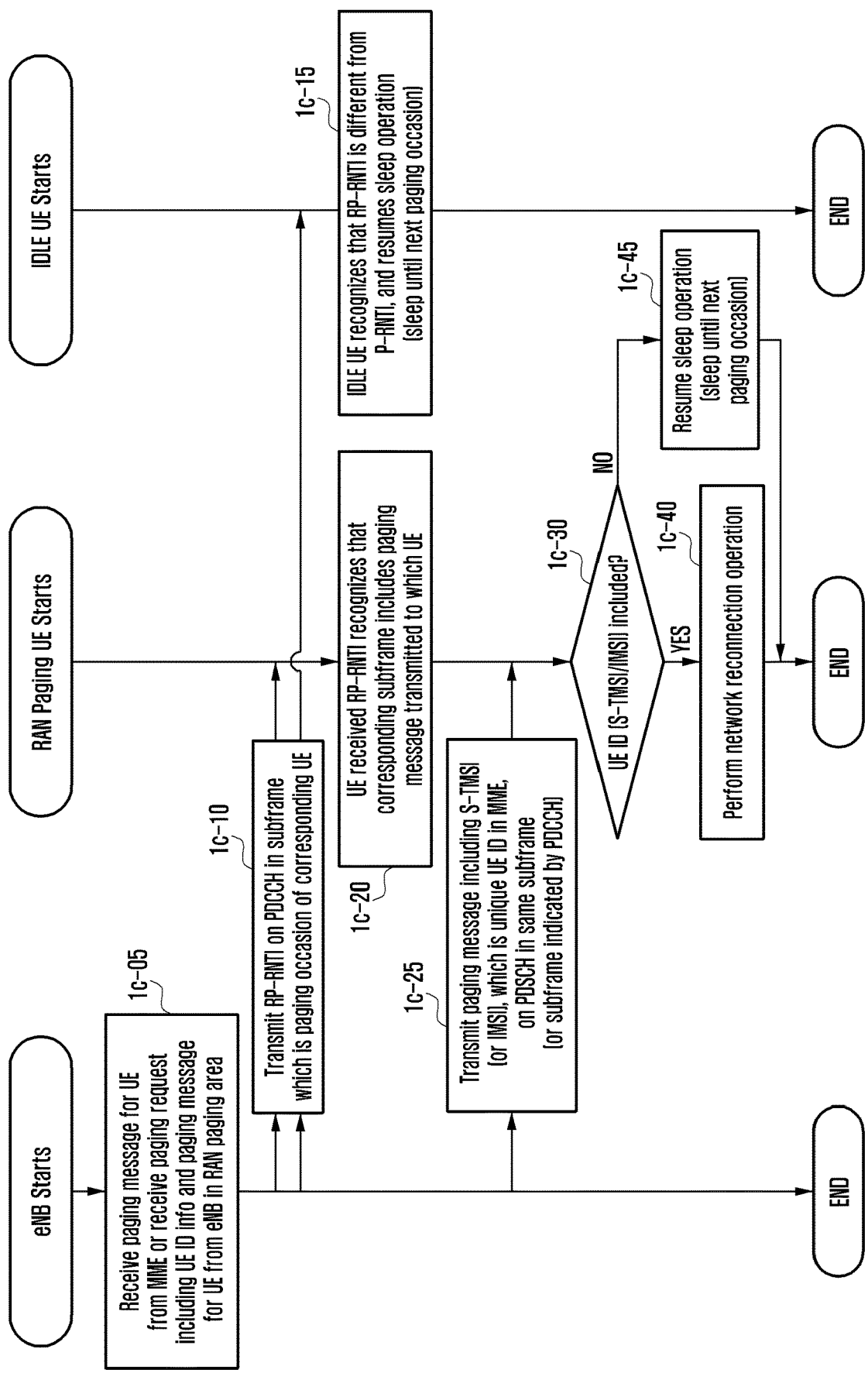
FIG. 1C illustrates a method for using a new radio network temporary identifier (RNTI) for RAN paging, according to an embodiment of the present disclosure.

In addition, FIG. 1C illustrates a method for using a new RNTI for RAN paging, according to an embodiment of the present disclosure.

TABLE 1

| value (hexa-decimal) | RNTI |
|---|---|
| . . . | . . . |
| FFFC | RP-RNTI |
| FFFE | P-RNTI |
| . . . | . . . |

TABLE 2

| RNTI | Usage | Transport channel | Logical Channel |
|---|---|---|---|
| RP-RNTI | RAN based paging and System Information change notification | PCH | PDCCH |

Referring to FIG. 1C, a base station, an RAN paging terminal, and an IDLE terminal are included.

At operation 1c-05, the base station receives a paging message for a terminal from an MME, or receives a paging request including terminal ID information and a paging message for a terminal from the base station in a RAN paging area.

At operation 1c-10, the base station transmits an RP-RNTI through a PDCCH of a subframe which is a paging occasion of a terminal. The base station may transmit the RP-RNTI to the RAN paging terminal and/or the IDLE terminal on the PDCCH of the subframe which is the paging occasion of the corresponding terminal.

At operation 1c-20, the IDLE terminal that receives the RP-RNTI recognizes that the RP-RNTI is different from the P-RNTI, and resumes a sleep operation. The IDLE terminal may maintain a sleep state until the next paging occasion.

At operation 1c-15, the RAN paging terminal that receives the RP-RNTI recognizes that the subframe receiving the RP-RNTI includes a paging message transmitted to a particular terminal.

At operation 1c-25, the base station transmits a paging message through a PDSCH of the same subframe as the subframe transmitting the RP-RNTI or of the subframe indicated by a PDCCH including the RP-RNTI. The paging message may include an S-TMSI or an IMSI, which is a unique terminal ID in the MME. Operation 1c-25 may be performed simultaneously with operation 1c-10. That is, information corresponding to operation 1c-10 may be transmitted on the PDCCH of the same subframe, and information corresponding to operation 1c-25 may be transmitted on the PDSCH. The same may be applied to other embodiments of the present disclosure.

At operation 1c-30, the RAN paging terminal checks whether its own S-TMSI or IMSI is included in the paging message. If the paging message includes the S-TMSI or IMSI corresponding to the RAN paging terminal, operation 1c-40 is performed. If the paging message does not include the S-TMSI or IMSI corresponding to the RAN paging terminal, operation 1c-45 is performed.

At operation 1c-40, the RAN paging terminal recognizes that the paging message is for itself, and performs a network reconnection operation. At operation 1c-45, the RAN paging terminal recognizes that the paging message is not for itself, and resumes a sleep operation. The RAN paging terminal may maintain a sleep state until the next paging occasion.

A method for distinguishing RAN paging by defining a new UE specific ID will now be described.

This method is to define a new UE specific ID (RAN paging TMSI: RP-TMSI) that is different from S-TMSI and IMSI, and to enable the base station to perform paging for the terminal by using the RP-TMSI.

The terminal that receives a paging message through a PDSCH in one subframe may recognize that the corresponding paging message specifies the terminal itself that operates in RAN paging.

Table 3 shows a PagingUE-Identity field value including a new UE ID.

TABLE 3

| PagingUE-Identity | :: = | CHOICE { |
|---|---|---|
| s-TMSI | S-TMSI, | |
| rp-TMSI | RP-TMSI, | |
| imsi | IMSI, | |
| ... | | |
| } | | |

The RP-TMSI may be a unique UE ID under the MME, a unique UE ID in the RAN paging area, or a unique UE ID in the eNB.

Figure 1D:
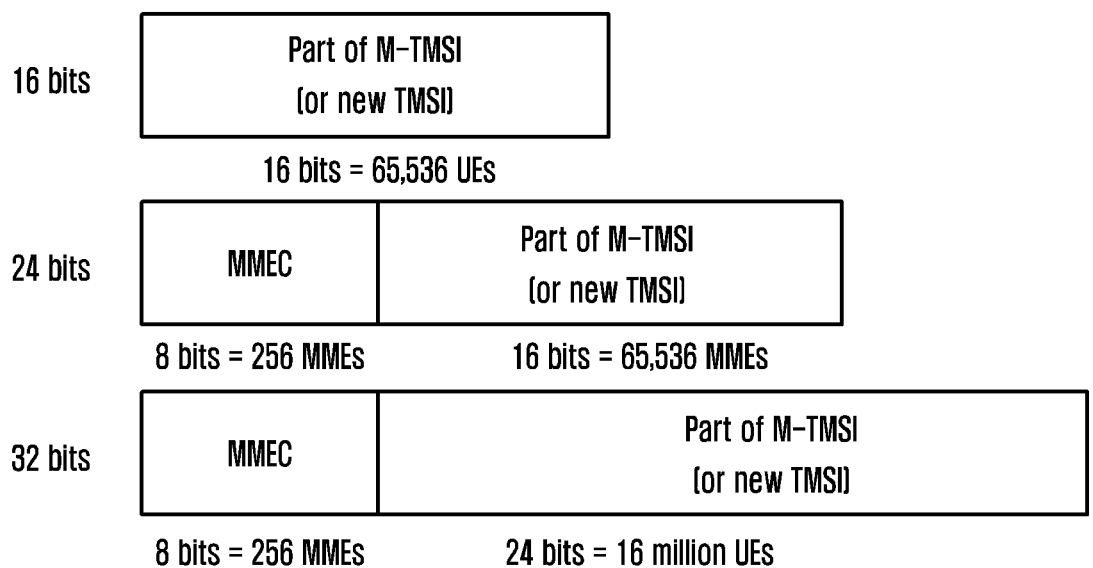
FIG. 1D illustrates various methods for constructing the RAN paging—temporary mobile subscribe identity (RP-TMSI) (or the new TMSI), according to an embodiment of the present disclosure.

FIG. 1D illustrates various methods for constructing the RP-TMSI (or the new TMSI), according to an embodiment of the present disclosure.

Figure 1E:
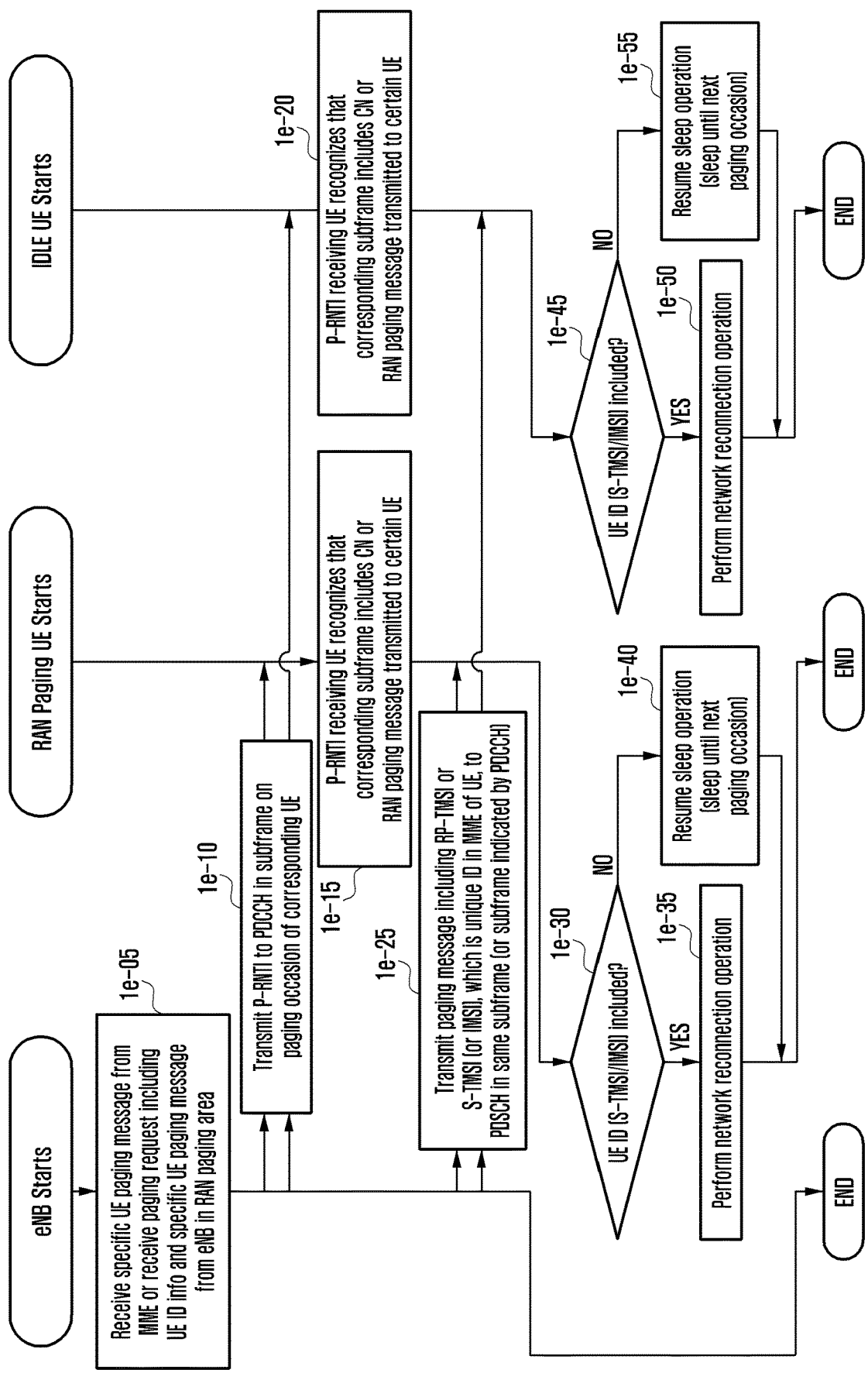
FIG. 1E illustrates an RAN and core network (CN) paging procedure and operations of respective terminals when RP-TMSI is added, according to an embodiment of the present disclosure.

FIG. 1E illustrates an RAN and CN paging procedure and operations of respective terminals when RP-TMSI is added, according to an embodiment of the present disclosure.

A procedure in which the system uses the same RNTI (P-RNTI) as the RNTI for CN paging and RAN paging, and uses a method for distinguishing UE with the UE specific ID is as shown in FIG. 1E.

Referring to FIG. 1E, at operation 1e-05, the base station receives a paging message for a terminal from the MME, or receives a paging request including terminal ID information and a terminal paging message from the base station in the RAN paging area.

At operation 1e-10, the base station transmits the P-RNTI through the PDCCH of the subframe, which is the paging occasion of the terminal. The base station may transmit the P-RNTI to the RAN paging terminal and/or the IDLE terminal on the PDCCH of the subframe, which is the paging occasion of the corresponding terminal.

At operation 1e-15, the RAN paging terminal that receives the P-RNTI recognizes that the subframe receiving the P-RNTI includes a paging message to be transmitted to a particular terminal. At operation 1e-20, the IDLE terminal that receives the P-RNTI recognizes that the subframe receiving the P-RNTI includes a paging message to be transmitted to a particular terminal.

At operation 1e-25, the base station transmits a paging message through the PDSCH of the same subframe as the subframe transmitting the P-RNTI or the subframe indicated by the PDCCH including the P-RNTI. The paging message may include RP-TMSI, S-TMSI, or IMSI, which is a unique terminal ID in the MME.

At operation 1e-30, the RAN paging terminal checks whether the paging message includes its own RP-TMSI or IMSI. If the RP-TMSI or IMSI corresponding to the RAN paging terminal is included in the paging message, operation 1e-35 is performed. If the paging message does not include the RP-TMSI or IMSI corresponding to the RAN paging terminal, operation 1e-40 is performed.

At operation 1e-35, the RAN paging terminal recognizes that the paging message is for itself, and performs a network reconnection operation. At operation 1e-40, the RAN paging terminal recognizes that the paging message is not for itself, and resumes a sleep operation. The RAN paging terminal may maintain a sleep state until the next paging occasion.

At operation 1e-45, the IDLE terminal checks whether the paging message includes its own S-TMSI or IMSI. If the paging message includes the S-TMSI or IMSI corresponding to the IDLE terminal itself, operation 1e-50 is performed. If the paging message does not include the S-TMSI or IMSI corresponding to the IDLE terminal itself, operation 1e-55 is performed.

At operation 1e-50, the IDLE terminal recognizes that the paging message is for itself, and performs the network reconnection operation. At operation 1e-55, the IDLE terminal recognizes that the paging message is not for itself, and resumes the sleep operation. The IDLE terminal may maintain a sleep state until the next paging occasion.

A method for using both new RNTI and new UE Specific ID will now be described.

FIG. 1F illustrates a method for using both RP-RNTI and RP-TMSI, according to an embodiment of the present disclosure.

An operating procedure of the terminal when RAN paging is performed using the above-proposed new RNTI (RP-RNTI) and new UE Specific ID (RP-TMSI) at the same time is as shown in FIG. 1F.

Referring to FIG. 1F, at operation 1f-05, the base station receives a paging message for a terminal from the MME, or receives a paging request including terminal ID information and terminal paging message from the base station in the RAN paging area.

At operation 1f-10, the base station transmits the RP-RNTI through the PDCCH of the subframe which is the paging occasion of the terminal. The base station may transmit the RP-RNTI to the RAN paging terminal and/or the IDLE terminal on the PDCCH of the subframe which is the paging occasion of the corresponding terminal.

At operation 1f-20, the IDLE terminal that receives the RP-RNTI recognizes that the RP-RNTI is different from the P-RNTI, and resumes a sleep operation. The IDLE terminal may maintain a sleep state until the next paging occasion.

At operation 1f-15, the RAN paging terminal that receives the RP-RNTI recognizes that the subframe receiving the RP-RNTI includes a paging message transmitted to a particular terminal.

At operation 1f-25, the base station transmits a paging message through a PDSCH of the same subframe as the subframe transmitting the RP-RNTI or of the subframe indicated by the PDCCH including the RP-RNTI. The paging message may include an RP-TMSI or IMSI, which is a unique terminal ID in the MME.

At operation 1f-30, the RAN paging terminal checks whether the paging message includes its own RP-TMSI or IMSI. If the RP-TMSI or IMSI corresponding to the RAN paging terminal is included in the paging message, operation 1f-40 is performed. If the paging message does not include the RP-TMSI or IMSI corresponding to the RAN paging terminal, operation 1f-45 is performed.

At operation 1f-40, the RAN paging terminal recognizes that the paging message is for itself, and performs a network reconnection operation. At operation 1f-45, the RAN paging terminal recognizes that the paging message is not for itself, and resumes a sleep operation. The RAN paging terminal may maintain a sleep state until the next paging occasion.

A method for allocating a unique terminal ID in a RAN paging area by base stations in the RAN paging area may include the following operations (1)-(4).

(1). An allocation method by a management subject comprising:

(A) selection of a base station; and (B) allocation of an MME.

(2). An arbitrary allocation method without a management subject.

(3). An allocation method within a unique ID pool of each base station.

(4). A Method for mutually announcing distributed IDs allocated by base stations.

A method for paging a terminal by the last serving base station and a neighboring base station using different RNTIs will now be described.

The last serving base station that the terminal accessed before performing the transition to the power saving state has a C-RNTI of the terminal and also maintains the S1 connection for exchanging information between the terminal and the core network. With this feature, the last serving base station may perform more efficient paging using a different method from other base stations in the RAN paging area of the corresponding terminal.

The operations of the base station and the terminal are as follows. The terminal that operates in the power saving state periodically wakes up and checks a promised subframe at an appointed time to check whether paging information is received. For this, the terminal periodically wakes up, reestablishes downlink synchronization before receiving the subframe, and selects a camping cell by selecting a cell to receive the subframe (same as or similar to a cell reselection operation in the IDLE mode).

Figure 1G:
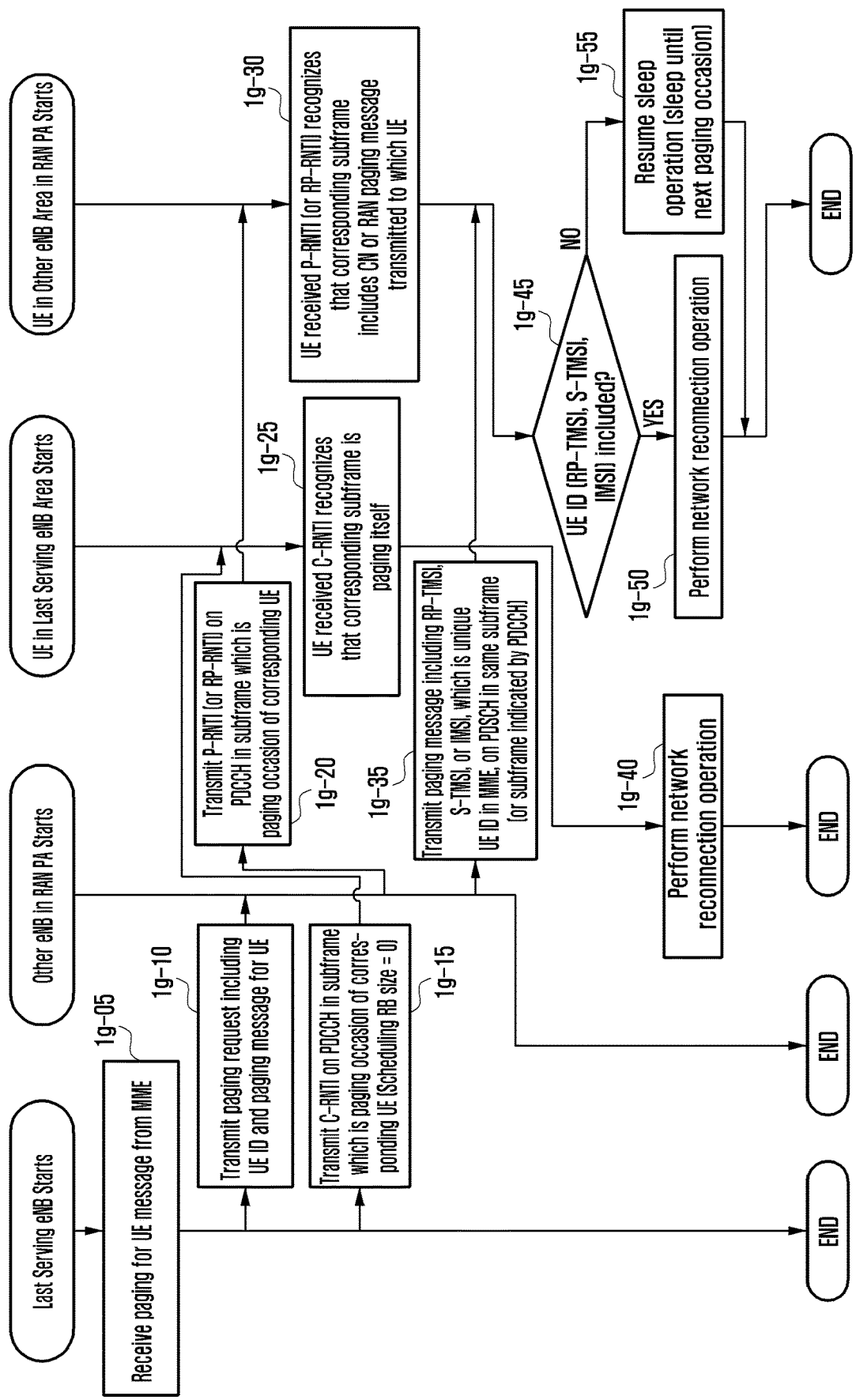
FIG. 1G illustrates method in which the last serving base station simplifies paging by using a cell-radio network temporary identifier (C-RNTI), according to an embodiment of the present disclosure.

FIG. 1G illustrates a method in which the last serving base station simplifies paging by using a C-RNTI, according to an embodiment of the present disclosure.

Referring to FIG. 1G, base stations in a RAN paging area other than the last serving base station to which the terminal was connected may not use the C-RNTI of the corresponding terminal and thus should perform paging for the terminal by using P-RNTI or RP-RNTI. However, the last serving base station may perform paging using the C-RNTI that knows the terminal. In this case, the C-RNTI may be transmitted while being included in the PDCCH (by scrambling the CRC of the DCI), and a resource scheduling (RB) size in the PDCCH including the C-RNTI may be set to zero. If there is a PDCCH message including a C-RNTI (scrambled with a C-RNTI) in a subframe in a paging occasion that is received by the terminal that periodically wakes up, the terminal may recognize that there is downlink data to be received (determine that the paging has been successfully received) and attempt to reconnect to the network. At this time, if the resource scheduling size is zero in addition to the C-RNTI, the terminal may perform the above operation.

Referring to FIG. 1G at operation 1g-05, the last serving base station receives a paging message for a terminal from the MME.

At operation 1g-10, the last serving base station transmits a paging request including terminal ID information and a terminal message to the base station in the RAN paging area (RAN PA).

At operation 1g-15, the last serving base station transmits the C-RNTI to the terminal in the last serving base station area through the PDCCH of the subframe which is the paging occasion of the terminal. At this time, the RB size in the PDCCH including the corresponding C-RNTI may be set to zero.

At operation 1g-20, the base station in the RAN PA may transmit the P-RNTI or the RP-RNTI to the terminal in its area. The base station in the RAN PA may transmit the RP-RNTI or the P-RNTI to the PDCCH of the subframe which is the paging occasion of the terminal.

At operation 1g-25, the terminal in the last serving base station area that receives the message in the PDCCH including the C-RNTI or the C-RNTI with the RB size set to zero recognizes that the paging is for the terminal itself in the corresponding subframe. When there is a PDCCH message including the C-RNTI (scrambled with the C-RNTI), the terminal may recognize that there is downlink data to be received (determine that the paging has been successfully received), and may attempt to reconnect to the network at operation 1g-40.

At operation 1g-30, the terminal that receives the P-RNTI or the RP-RNTI confirms that the subframe receiving the P-RNTI or the RP-RNTI includes the CN paging message or the RAN paging message transmitted to a particular terminal.

At operation 1g-35, the base station transmits a paging message through the PDSCH of the same subframe as the subframe transmitting the P-RNTI or the RP-RNTI or of the subframe indicated by the PDCCH including the P-RNTI or the RP-RNTI. The paging message may include RP-TMSI, S-TMSI, or IMSI, which is a unique terminal ID in the MME.

At operation 1g-45, the terminal in the base station area in the RAN PA checks whether the paging message includes its own RP-TMSI, S-TMSI, or IMSI. If the paging message includes the RP-TMSI, S-TMSI, or IMSI corresponding to the terminal itself, operation 1g-50 is performed. If the paging message does not include the RP-TMSI, S-TMSI, or IMSI corresponding to the terminal itself, operation 1g-55 is performed.

At operation 1g-50, the terminal recognizes that the paging message is for itself, and performs the network reconnection operation. At operation 1g-55, the terminal recognizes that the paging message is not for itself, and resumes the sleep operation. The terminal may maintain a sleep state until the next paging occasion.

Figure 1H:
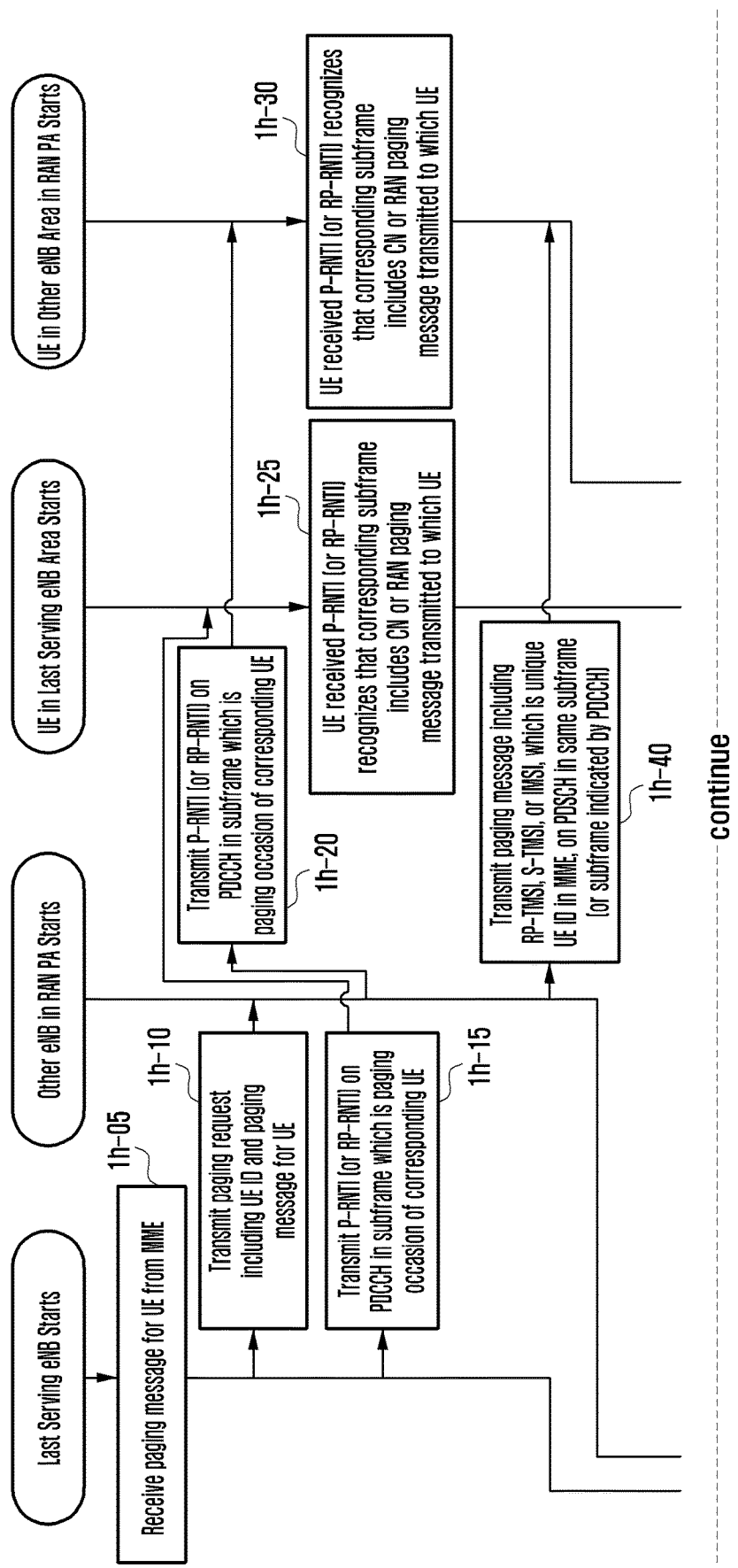
FIG. 1HA and FIG. 1HB illustrate a method in which the last serving base station transmits a C-RNTI included in a paging message, according to an embodiment of the present disclosure.
Figure 1H:
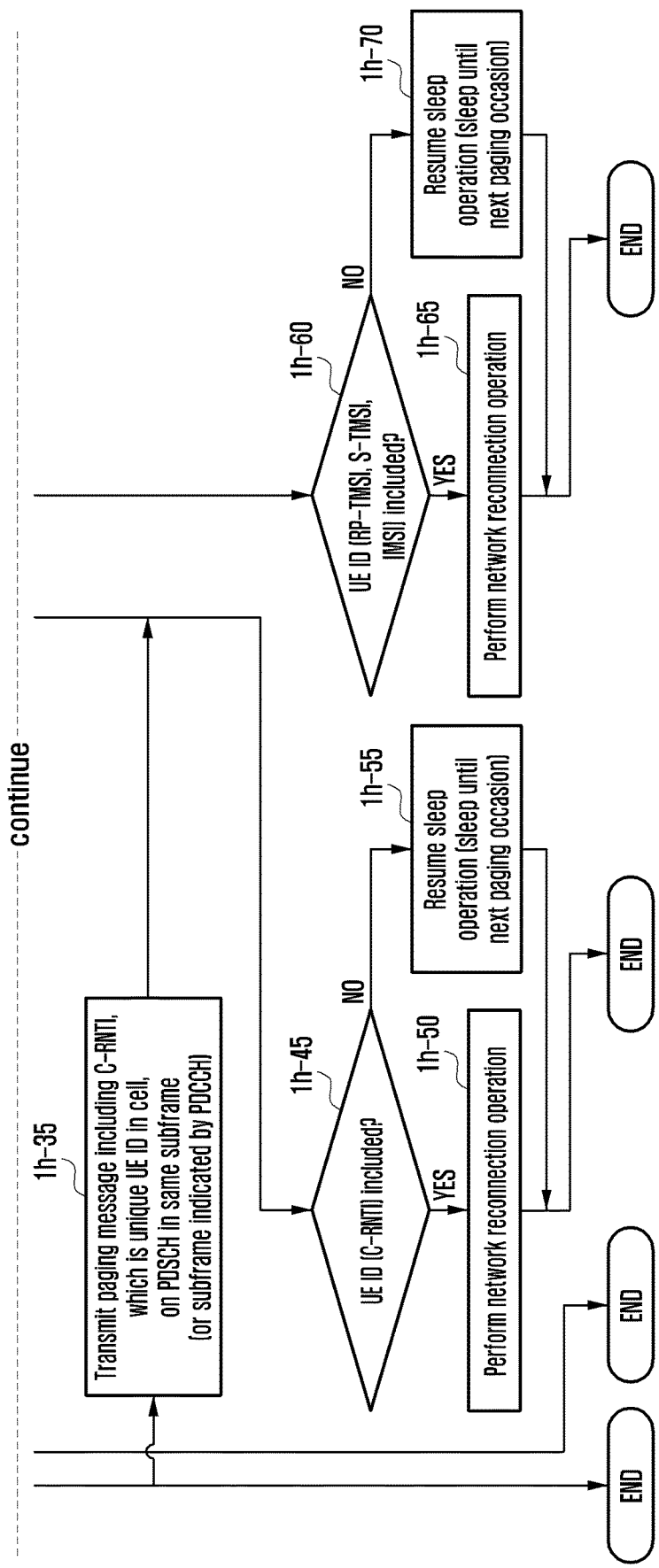

FIG. 1HA and FIG. 1HB illustrate a method in which the last serving base station transmits a C-RNTI included in a paging message, according to an embodiment of the present disclosure.

Referring to FIG. 1HA and FIG. 1HB, when base stations in the RAN paging area perform paging for the terminal by using a P-RNTI and an RP-RNTI, and transmit a paging message of a PDSCH for specifying the terminal, the last serving base station may transmit the C-RNTI that knows the terminal. In this case, other base stations in the RAN paging area may use RP-TMSI, S-TMSI, or IMSI, instead of C-RNTI.

At operation 1h-05, the last serving base station receives the paging message for the terminal from the MME.

At operation 1h-10, the last serving base station transmits a paging request including terminal ID information and a terminal message to a base station in a RAN paging area (RAN PA).

At operation 1h-15, the last serving base station transmits the P-RNTI or the RP-RNTI to the terminal in the last serving base station area through the PDCCH of the subframe which is the paging occasion of the terminal. At operation 1h-20, the base station in the RAN PA transmits the P-RNTI or the RP-RNTI to the terminal in its area. The base station in the RAN PA may transmit the RP-RNTI or the P-RNTI to the PDCCH of the subframe which is the paging occasion of the terminal. At operation 1h-25, the terminal in the last serving base station area that receives the P-RNTI or the RP-RNTI recognizes that the subframe receiving the P-RNTI or the RP-RNTI includes a CN paging message or a RAN paging message transmitted to a particular terminal. At operation 1h-30, the terminal that receives the P-RNTI or the RP-RNTI recognizes that the subframe receiving the P-RNTI or the RP-RNTI includes the CN paging message or the RAN paging message transmitted to a particular terminal.

At operation 1h-35, the last serving base station transmits a paging message through the PDSCH of the same subframe as the subframe transmitting the P-RNTI or RP-RNTI, or of the subframe indicated by the PDCCH including the P-RNTI or RP-RNTI. The paging message may include a C-RNTI.

At operation 1h-45, the terminal in the last serving base station area checks whether the C-RNTI that is a terminal ID is included in the paging message. If the C-RNTI is included in the paging message, operation 1h-50 is performed. Otherwise, operation 1h-55 is performed. At operation 1h-50, the terminal recognizes that the paging message is for itself, and performs the network reconnection operation. At operation 1h-55, the terminal recognizes that the paging message is not for itself, and resumes the sleep operation. The terminal may maintain a sleep state until the next paging occasion.

At operation 1h-40, the base station in the RAN PA transmits a paging message through the PDSCH of the same subframe as the subframe transmitting the P-RNTI or RP-RNTI, or of the subframe indicated by the PDCCH including the P-RNTI or RP-RNTI. The paging message may include RP-TMSI, S-TMSI, or IMSI, which is a unique terminal ID in the MME.

At operation 1h-60, the terminal in the base station area in the RAN PA checks whether the paging message includes its own RP-TMSI, S-TMSI, or IMSI. If the paging message includes the RP-TMSI, S-TMSI, or IMSI corresponding to the terminal itself, operation 1h-65 is performed. If the paging message does not include the RP-TMSI, S-TMSI, or IMSI corresponding to the terminal itself, operation 1h-70 is performed.

At operation 1h-65, the terminal recognizes that the paging message is for itself, and performs the network reconnection operation. At operation 1h-70, the terminal recognizes that the paging message is not for itself, and resumes the sleep operation. The terminal may maintain a sleep state until the next paging occasion.

A method for distinguishing RAN based paging by adding indicator will now be described.

There may be a method for distinguishing the paging by using RNTI and TMSI instead of using new RNTI and TMSI, and also by adding an indicator to other field.

A method for adding a 1-bit indicator to the DCI in the PDCCH is as follows.

Table 4 shows a one-bit RAN paging indicator for DCI format 1A/1C, and Table 5 shows a two-bit RAN paging indicator for DCI format 1A/1C.

TABLE 4

RAN paging indicator - 1 bit
  If the format 1A(1C) CRC is scrambled by P-ANTI, C-ANTI, or RP-RNTI:
    the RAN paging indicator bit indicates the RAN paging, where value 0 indicates CN paging and value 1 indicates RAN paging
  Else the RAN paging indicator bit is reserved.

TABLE 5

RAN paging indicator - 2 bits
  If the format 1A(1C) CRC is scrambled by P-RNTI, C-RNTI, or RP-RNTI:
    the RAN paging indicator bit indicates the RAN paging, where value 00 indicates CN paging, value 01 indicates RAN paging, value 10/11 indicates both CN and RAN paging
  Else the RAN paging indicator bit is reserved.

A method for distinguishing between RAN paging and CN paging by adding a 1-bit indicator in addition to the UE identity in the PDSCH is as follows. Table 6 shows a one-bit RAN paging indicator after pagingUE-identity.

TABLE 6

```
PagingUE-Identity ::=  CHOICE {
    s-TMSI    S-TMSI,
    imsi      IMSI,
    ...
},
CN-RNA Paging Ind ::= BOOLEAN,
```

The terminal that receives the above indicator may distinguish whether the corresponding pagingUE-identity and paging message are RAN paging or CN paging, perform the operation according to its own state, and ignore paging transmitted for other state purposes.

A new RAN paging discontinuous reception (DRX) configuration will now be described.

In a new power saving state, the terminal performs a sleep and wake-up operation according to a certain rule, such as the IDLE mode operation. Such a discontinuous reception operation of the terminal is called DRX, and the terminal DRX operation in the power saving state should be signaled and controlled by the base station.

A DRX cycle of the terminal may be signaled and controlled in the following manner.

Table 7 shows the INACTIVE Paging Cycle under DRX-Configuration, and Table 8 shows the INACTIVE Paging Cycle under PDCCH-Configuration.

TABLE 7

```
DRX-Config ::=  CHOICE {
    release         NULL,
    setup           SEQUENCE {
        ...
        inactiveDRX-CycleStartOffset CHOICE {
            sf10            INTEGER (0..9),
            sf20            INTEGER (0..19),
            ...
        },
    ...
}}
```

TABLE 8

```
PDCCH-Config ::=        SEQUENCE {
    defaultPagingCycle      ENUMERATED {
                                rf 32, rf64, rf128, rf256},
    inactivePagingCycle     ENUMERATED {
                                rf32, rf64, rf128, rf256},
    nB                      ENUMERATED {
                                fourT, twoT, oneT, half, quarterT,
                                oneEighthT, oneSixteenthT,
                                oneThirtySecondT
}
```

When RAN paging is newly defined as above and signaled in an environment where two kinds of paging such as CN paging and RAN paging coexist, the system (base station and terminal) may configure and use the CN paging and the RAN paging which have different paging occasions and paging cycles. In this case, the terminal that operates in the power saving state may use only the RAN paging cycle, and the terminal that operates in the IDLE mode may use only the CN paging cycle. In addition, the terminal that desires more frequent and faster paging reception such as SI update or radio link failure recovery (cell reselection) may check both paging occasions regardless of a terminal's state. Of course, in this case, power consumption may be increased due to frequent paging of the terminal as compared with the case of receiving only one type of paging.

FIG. 11 illustrates an environment where CN paging and RAN paging having different cycles and paging occasions coexist, according to an embodiment of the present disclosure.

Figure 1I:
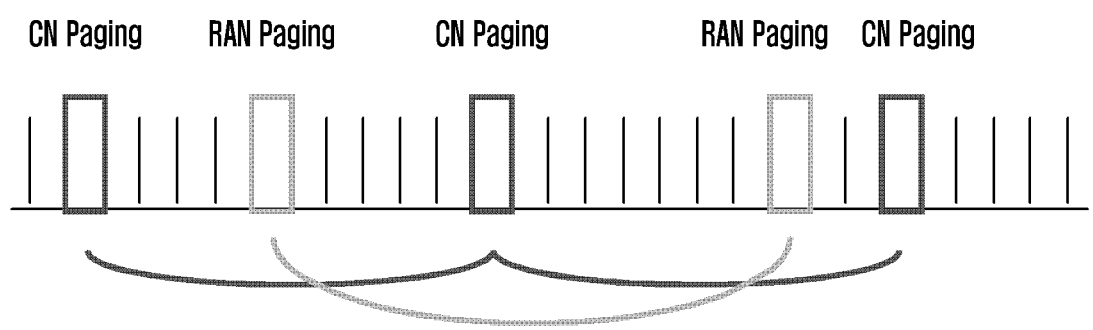
FIG. 1I illustrates an environment where CN paging and RAN paging having different cycles and paging occasions coexist, according to an embodiment of the present disclosure.

An example of the terminal configured for the CN paging and the RAN paging to have different cycles is as shown in FIG. 1I.

On the other hand, the terminals configured for the CN paging and the RAN paging having the same cycle and having different states (IDLE and power saving) may wake up simultaneously. In this case, if there is a new RAN paging DRX configuration, the corresponding value may be set to be the same as that of CN paging and may be signaled. Also, the CN paging configuration may be utilized for RAN paging without adding a new DRX configuration.

Figure 1J:
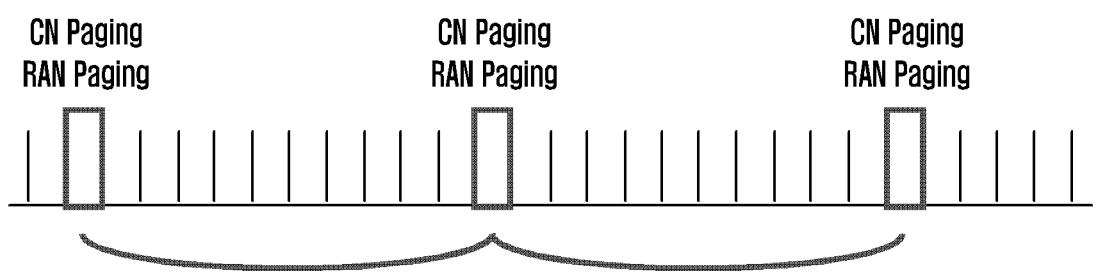
FIG. 1J illustrates an environment where the CN paging and the RAN paging having the same cycle and paging occasion coexist, according to an embodiment of the present disclosure.

An example configuration for reusing the CN paging in the RAN paging are shown in FIG. 1J and Table 9.

FIG. 1J illustrates an environment where the CN paging and the RAN paging having the same cycle and paging occasion coexist, and Table 9 shows RadioResourceConfigCommon field descriptions.

TABLE 9

RadioResourceConfigCommon field descriptions defaultPagingCycle
default paging cycle, used to derive 'T' in TS 36.304 [4]. Value rf32 corresponds to 32 radio frames, rf64 corresponds to 64 radio frames and so on.
The UEs operate in INACTIVE state uses the Default paging cycle, to derive the RAN paging cycle. Value rf32 corresponds to 32 radio frames, rf64 corresponds to 64 radio frames and so on.

Alternatively, an indicator may be used to inform the terminal that the CN paging and the RAN paging in the PCCH configuration are the same.

Table 10 shows the INACTIVE Paging Cycle under PDCCH-Configuration with indicator, and Table 11 shows RadioResourceConfigCommon field descriptions.

TABLE 10

```
PCCH-Config ::=    SEQUENCE {
    defaultPagingCycle    ENUMERATED {
                            rf32, rf64, rf128, rf256},
    inactive Ind          BOOLEAN,
    nB                    ENUMERATED {
                            fourT, twoT, oneT, quarterT,
                            oneEighthT, quarterT,
                            oneThirtySecondT}
}
```

TABLE 11

RadioResourceConfigCommon field descriptions defaultPagingCycle

Default paging cycle, used to derive 'T' in TS 36.304[4]. Value rf32 corresponds to 32 radio frames, rf64 corresponds to 64 radio frames and so on.
inactive Ind if the inactive IND is true, the Default paging cycle is used to derive the RAN paging cycle.

A method for deleting terminal information at a terminal, a base station, and a network, will now be described.

The unique information and network connection information of the terminal that operates in the power saving state should be deleted from the terminal and the base station when the terminal performs the transition to the IDLE state or is unable to use the network due to an unavoidable change. The information deletion timing of the terminal and the network may be cases of satisfying various conditions, and these conditions are as follows.

When the UE is re-connected to the other cell may be satisfied when (a) the UE itself is re-connected to the other cell and reconfigured, or (b) the other cell transmitted a signal to the last serving cell that the UE is re-connected.

When the UE updated paging area may be satisfied when (a) the UE itself is moved out of the RAN paging area and successfully updated paging area, or (b) the other cell transmitted a signal to the last serving cell that the UE is updated RAN paging area.

When the UE state changes into IDLE mode (UE operation) may be satisfied when the eNB indication signal (RRC message, MAC message, . . . ) by when the channel quality degradation is measured if (a) reference signal received power (RSRP), reference signal received quality (RSRQ), channel quality indicator (CQI), signal to interference plus noise ratio (SINR), signal to noise ratio (SNR), of the serving channel<threshold 1, or (b) the current measured RSRP, RSRQ, CQI, SINR, SNR, of the serving channel<last measured RSRP, RSRQ, CQI, SINR, SNR, of the serving channel−threshold 2. Or, the UE state changes into IDLE mode (UE operation) may be satisfied by a timer expiration when the timer started at the last successful data transmission/reception (tx/rx), at the last channel measurement, at the last channel measurement result>threshold, etc.

When the eNB detects a UE is no longer in the power saving state may be satisfied (a) by when the number of paging retransmission reaches the maximum threshold 3, (b) by when the channel quality degradation is measured if (i) RSRP, RSRQ, CQI, SINR, SNR, of the serving channel<threshold 1, or (ii) the current measured RSRP, RSRQ, CQI, SINR, SNR, of the serving channel<last measured RSRP, RSRQ, CQI, SINR, SNR, of the serving channel−threshold 2, (c) by a timer expiration, or (d) by a number of NACK (or Non ACK) responses reaches the maximum threshold 4

A method for transmitting paging for a system information update will now be described.

In 5G, system information may be divided into two or more components. Among them, the minimum system information periodically transmitted for network connection may be referred to as minimum SI, and the other system information transmitted by broadcasting or unicasting (on-demand) may be referred to as additional SI. In this case, the minimum SI and the additional SI may be updated at the same period, or only one of the minimum SI and the additional SI may be updated.

In order to update different kinds of system information, the next standard may set the system information update period to two or more different periods. In such a case, different system information update periods may be as follows.

Table 12 shows minimum/additional SI update periods in TS36.331 (3gpp standard specification numbering), and Table 13 shows minimum/additional SI update periods in TS36.331.

TABLE 12

```
BCCH-Config ::=              SEQUENCE {
    modificationPeriodCoeff          ENUMERATED {n2, n4, n8,
                                     n16, n32, n64, n128},
    minSIModificationPeriodCoeff     ENUMERATED {n2, n4, n8,
                                     n16, n32, n64, n128},
    addSIModificationPeriodCoeff     ENUMERATED {n2, n4, n8,
                                     n16, n32, n64, n128}
}
```

TABLE 13

RadioResourceConfigCommon field descriptions modificationPeriodCoeff

Actual modification period, expressed in number of radio frames = modificationPeriodCoeff * defaultPagingCycle.
n2 corresponds to value 2, n4 corresponds to value 4, n8 corresponds to value 8, n16 corresponds to value 16, and n64 corresponds to value 64.

TABLE 13-continued

RadioResourceConfigCommon field descriptions minSImodificationPeriodCoeff

Actual modification period for minimum SI update, expressed in number of radio frames = modificationPeriodCoeff * defaultPagingCycle. n2 corresponds value 2, n4 corresponds to value 4, n8 corresponds to value 8, n16 corresponds to value 16, and n64 corresponds to value 64.

addSImodificationPeriodCoeff

Actual modification period for additional SI update, expressed in number of radio frames = modificationPeriodCoeff * defaultPagingCycle. n2 corresponds to value 2, n4 corresponds to value 4, 8 corresponds to value 8, n16 corresponds to value 16, and n64 corresponds to value 64.

Figure 1K:
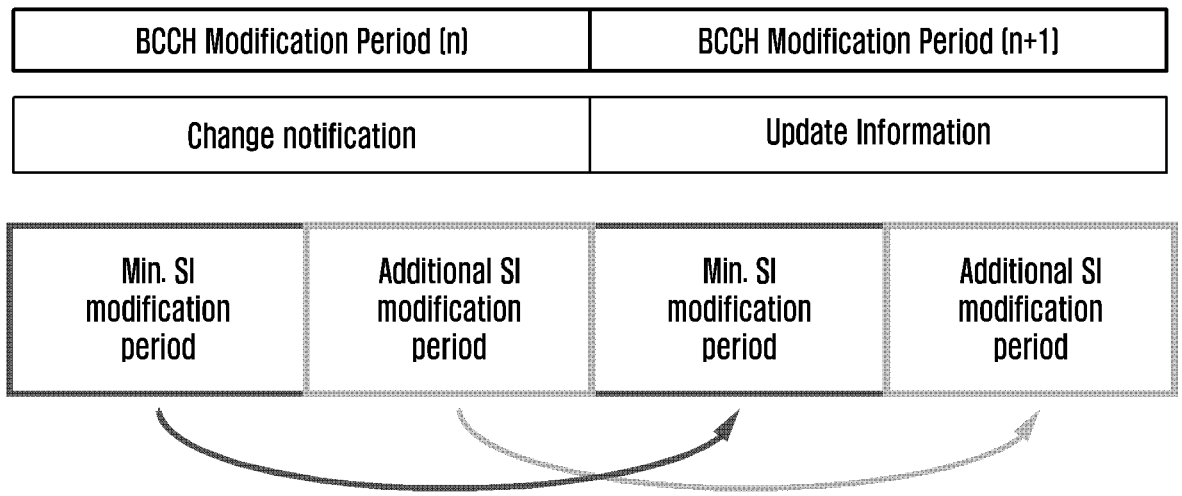
FIG. 1K illustrates a minimum/additional system information (SI) modification period operation, according to an embodiment of the present disclosure.

FIG. 1K illustrates a minimum/additional SI modification period operation, according to an embodiment of the present disclosure.

The periods for updating different kinds of system information may be individually assigned to different times so as not to be overlapped with each other, as shown in FIG. 1K. When a system information update and a change notification therefor are performed in such a non-overlapping time, the terminal may update only the corresponding information in the corresponding period after receiving the specific change notification. Therefore, the terminal may not need to update all the system information. Alternatively, it is possible to assign different periods to the same time so as to be overlapped with each other.

In order to update different kinds of system information, the system may transmit paging messages including a change notification in a period immediately before the modification period in which the system information is actually updated. This paging message may be CN paging, RAN paging, or both.

The terminals connected to the network, operating in the power saving state in the network, or camped in the network receive such paging information and update the system information in the next modification period.

At this time, the system information update (change) notifications included in the paging message may be classified for the minimum SI and for the additional SI. This may be reflected in the terminal operation as follows.

Table 14 shows the minimum/additional SI update of UE in TS36.331.

TABLE 14

5.3.2.3 Reception of the Paging message by the UE
Upon receiving the Paging message, the UE shall:
 1> if in RRC_IDLE, for each of the PagingRecord, If any, included
 in the Paging message:
  2> if the ue-Identity included in the PagingRecord matches one of the
 UE identities allocated by upper layers:
   3> forward the ue-Identity and, except for NB-IoT, the en-Domain
   to the upper layers;
  1> if the systemInfomodification is included; or
  1> if the UE is configured with a DRX cycle longer than the
 modification period and the systemInfoModification-eDRX is included; or
  1> if the systemInfoModification-minimumSI is included; or
  1> if the systemInfoModification-additionalSI is included:
   2> re-acquire the required system information using the system
 information acquisition procedure as specified in 5.2.2.

Alternatively, a case where the reception of additional SI information is performed on-demand upon UE request is as follows:

Table 15 shows the minimum/additional SI update of UE in TS36.331.

TABLE 15

5.3.2.3 Reception of the Paging message by the UE.
Upon receiving the Paging message, the UE shall;
 1> if in RRC_IDLE, for each of the PagingRecord, if any, included
 in the Paging message:
  2> if the ue-Identity included in the PagingRecord matches one of
 the UE identities allocated by upper layers:
   3> forward the ue-Identity and, except for NB-IoT, the en-domain
   to the upper layers;
  1> if the systemInfoModification is included; or
  1> if the UE is configured with a DRX cycle longer than the
 modification period and the systemInfoModification-eDRX is included;
 or
  1> if the systemInfoModification-minimumSI is included:
   2> re-acquire the required system information using the system
 information acquisition procedure as specified in 5.2.2
  1> if the systemInfoModification-additionalSI is included:
   2> re-acquire the required system information using the system
   information acquisition procedure as:

In receiving the paging information including the change notification indicating that the system information will be changed soon, it may be considered that each paging information receiving cycle is smaller than the modification period in which the change notification is continuously transmitted (paging cycle<modification period). In this case, the terminal receives a paging message including the same change notification every time, and this information is not only redundant but also causes power consumption of the terminal. Therefore, if only the paging message including the first notification is decoded by the terminal, and if paging messages including only the same SI update change notification among the paging messages transmitted in the same modification period can be distinctively ignored, power consumption of the terminal may be reduced.

To this end, an embodiment of the present disclosure proposes a new paging information identifier (SIU-RNTI), as follows.

SIU-RNTI is used if the paging is only for SI update notification. If the paging contains other information, such as data paging then SIU-RNTI cannot be used (P-RNTI can be used). The UE which received the SI update once can ignore the other SIU-RNTI during the same BCCH modification period.

Figure 1L:
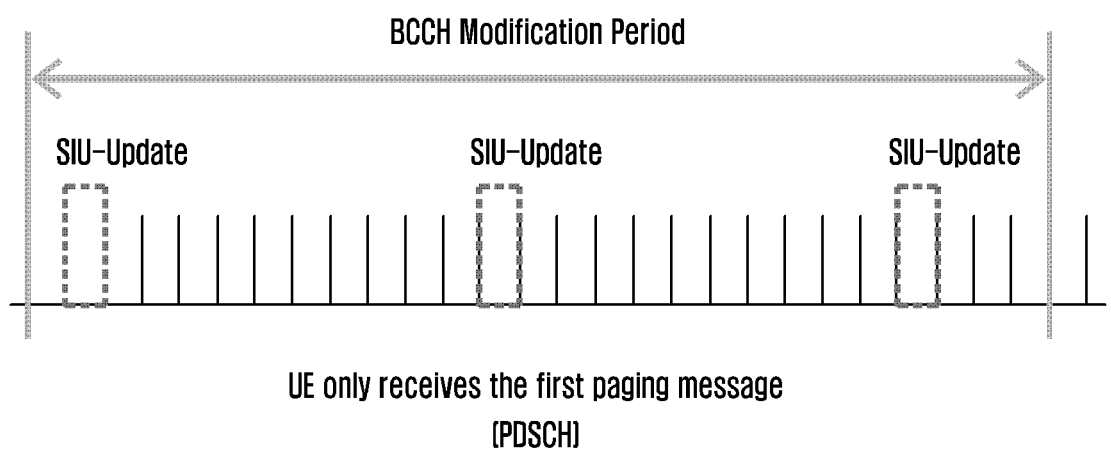
FIG. 1L illustrates an system information update (SIU) operation, according to an embodiment of the present disclosure.

Table 16 shows a new RNTI value for SI update, and [FIG. 1L] shows an embodiment of an SIU update operation according to the present disclosure.

TABLE 16

| Value (hexa-decimal) | RNTI |
|---|---|
| . . . | . . . |
| FFFB | SIU-RNTI |
| FFFE | P-RNTI |
| . . . | . . . |

A method by which a terminal operating in a power saving state quickly reconnects to a network will now be described.

There may be various methods by which a terminal that operates in the power saving state quickly reconnects to the network. Methods considered by the present disclosure are used when uplink and downlink channels have similar characteristics because of a shorter distance between transmitting and receiving ends and also because synchronization is similar. In this method, uplink resources are occupied in downlink paging information, and the terminal performs uplink transmission immediately without a special uplink synchronization operation (e.g., RACH). A detailed procedure for uplink transmission resource allocation in paging PDCCH for fast re-connection is as follows:

The base station transmits UL-SCH resource reservation for a response from the terminal (or for a resume request transmission of the terminal) included in the paging PDCCH, and the terminal that receives this recognizes that the corresponding paging message is a request for network reconnection of the terminal (implicit indication via UL-SCH configuration).

According to an embodiment of the present disclosure, a C-RNTI+Paging PCH+UL SCH configuration may be employed.

Figure 1M:
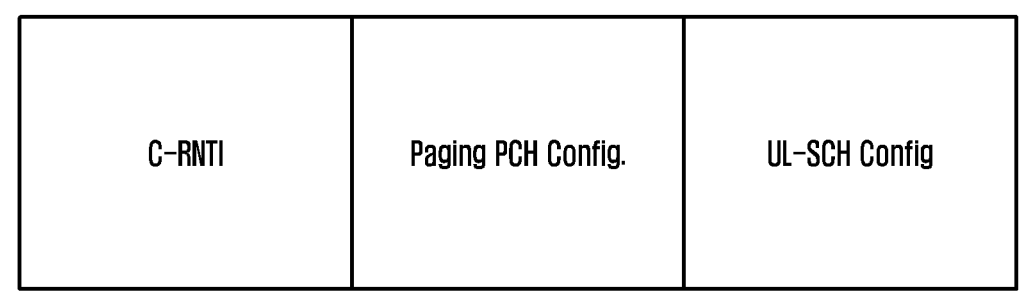

FIG. 1M illustrates uplink transmission resource allocation in a paging PDCCH for fast re-connection according to an embodiment of the present disclosure.

The base station (e.g., the last serving eNB) having a C-RNTI previously used (or promised) with the terminal transmits the paging PDCCH using the C-RNTI to request the terminal operating in the power saving state to reconnect to the network (connection resume). At this time, the UL-SCH configuration resource should be allocated more than 3 transmission time intervals (TTIs) later in time than the paging message transmission resource allocated by the paging PCH configuration. The terminal that receives the message receives paging information through the paging PCH and transmits a connection resume request on the UL-SCH. Upon successful completion of transmission/reception of connection resume request, the network and the terminal recognize that the connectivity is completed, and performs the transition of a terminal state to RRC_CONNECTED.

According to an embodiment of the present disclosure, a C-RNTI+UL SCH configuration may be employed.

Figure 1N:
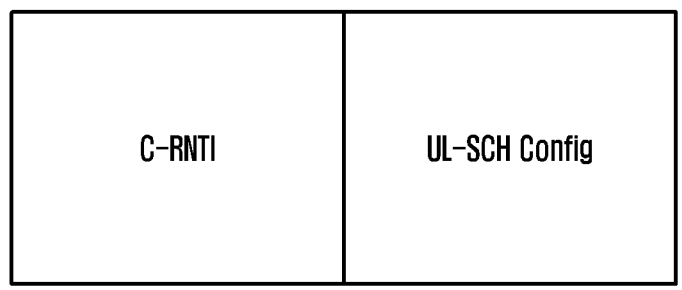
FIG. 1N illustrates uplink transmission resource allocation in the paging PDCCH for fast reconnection, according to an embodiment of the present disclosure.

FIG. 1N illustrates uplink transmission resource allocation in the paging PDCCH for fast reconnection according to an embodiment of the present disclosure.

The base station (e.g., the last serving eNB) having a C-RNTI previously used (or promised) with the terminal transmits the paging PDCCH using the C-RNTI to request the terminal operating in the power saving state to reconnect to the network (connection resume). The terminal that receives the message transmits a connection resume request on the UL-SCH. Upon successful completion of transmission/reception of connection resume request, the network and the terminal recognize that the connectivity is completed, and performs the transition of a terminal state to RRC_CONNECTED.

According to an embodiment of the present disclosure, an RNTI+Paging PCH+UL SCH configuration may be employed.

FIG. 1O illustrates the uplink transmission resource allocation in the paging PDCCH for fast reconnection, according to an embodiment of the present disclosure.

The base station transmits the paging PDCCH using the RNTI to request the terminal operating in the power saving state to reconnect to the network (connection resume). At this time, the UL-SCH configuration resource should be allocated more than 3 TTIs later in time than the paging message transmission resource allocated by the paging PCH configuration. The terminal that receives the message receives paging information through the paging PCH and transmits a connection resume request on the UL-SCH if the received information contains its UE-specific ID. Upon successful completion of transmission/reception of connection resume request, the network and the terminal recognize that the connectivity is completed, and performs the transition of a terminal state to RRC_CONNECTED.

Figure 1P:
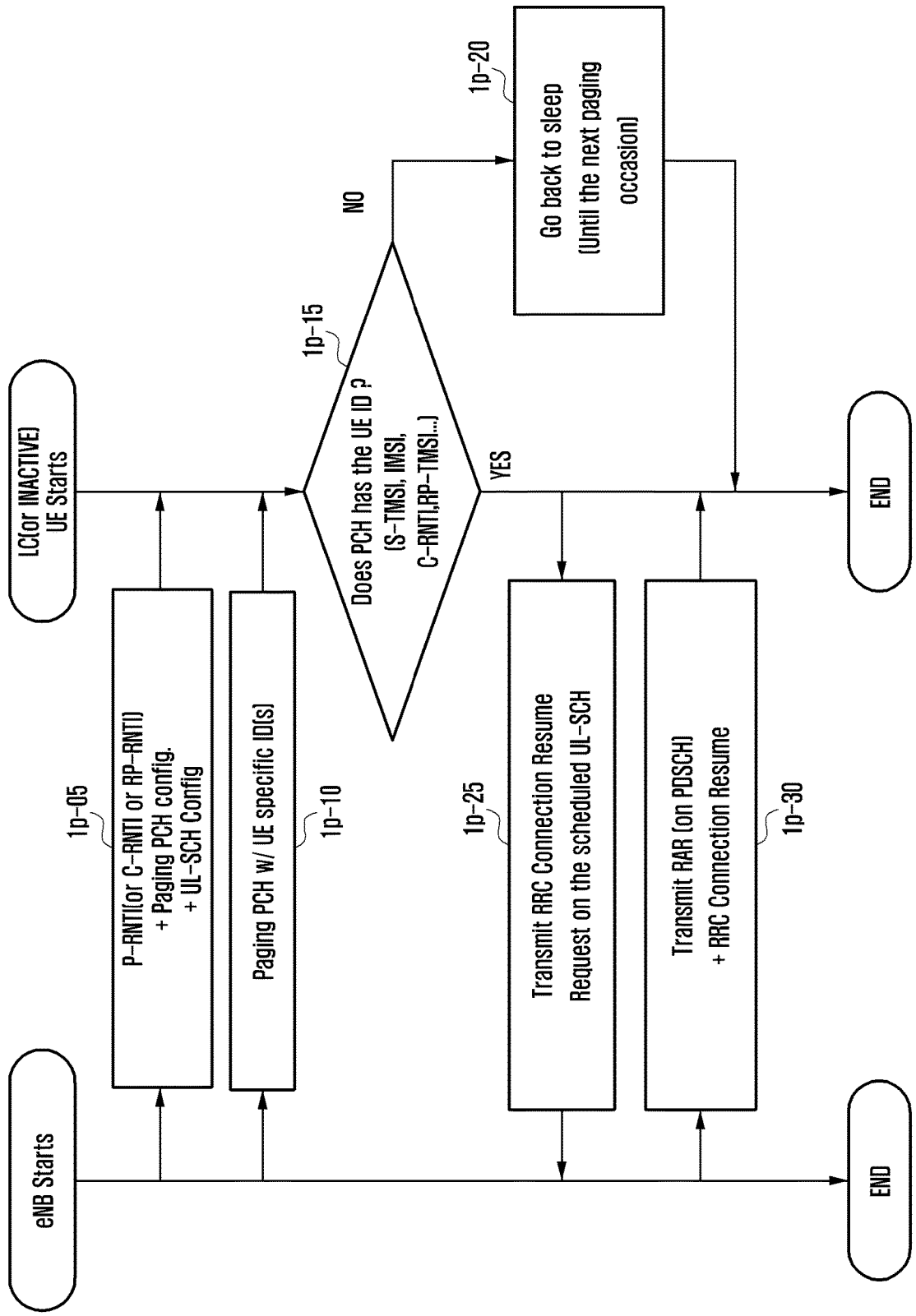
FIG. 1P illustrates a fast network reconnection method using a paging paging channel (PCH) configuration including (uplink-shared channel) UL-SCH, according to an embodiment of the present disclosure.

FIG. 1P illustrates a fast network reconnection method using a paging PCH configuration including UL-SCH, according to an embodiment of the present disclosure.

Referring to FIG. 1P, the system includes a base station and a terminal. The terminal may be in a light connection (LC) state or in an inactive state.

At operation 1p-05, the base station transmits a paging PDCCH using an RNTI to the terminal. The RNTI may be at least one of a P-RNTI, a C-RNTI, or an RP-RNTI. The paging PDCCH may include a paging PCH configuration and also include a UL-SCH configuration. The UL-SCH configuration resource may be allocated to a subframe or TTI which is later in time than the paging message transmission resource allocated by the paging PCH configuration. The UL-SCH resource may be allocated more than 3 TTIs later than the paging message transmission resource.

At operation 1p-10, the base station transmits a paging message to the terminal. The paging message may include a terminal identifier, which may include at least one of IMSI, S-TMSI, C-RNTI, and RP-TMSI.

At operation 1p-15, the terminal receives the paging information through the paging PCH and checks whether the received information contains its own terminal identifier.

If there is no terminal identifier, the terminal proceeds to operation 1p-20. At operation 1p-20, the terminal performs a sleep operation until the next paging occasion.

If there is its own terminal identifier, the terminal proceeds to operation 1p-25. At operation 1p-25, the terminal transmits an RRC connection resume request through the UL-SCH. The UL-SCH transmission resource may use the UL-SCH resource allocated at the operation 1p-10.

At operation 1p-30, the base station may transmit a random access response (RAR) and RRC connection resume to the terminal. The terminal may receive the RAR through the PDSCH. If the transmission and reception of the RRC connection resume request and the RRC connection resume are successfully completed, the network and the terminal may recognize that the connectivity is completed, and may perform the transition of a terminal state to RRC_CONNECTED.

A method for uplink transmission resource allocation and indicator addition in paging PDCCH for fast reconnection will now be described The base station transmits UL-SCH resource reservation for a response from the terminal (or for a resume request transmission of the terminal) included in the paging PDCCH, and also transmits, using the resource, an indicator to request the terminal to perform reconnection. The terminal recognizes that the corresponding message is a request for network reconnection of the terminal (explicit indication). At this time, the indicator may be included in the UL-SCH configuration.

According to an embodiment of the present disclosure, a C-RNTI+Paging PCH+UL SCH configuration may be employed.

FIG. 1Q illustrates uplink transmission resource allocation and indicator addition in a paging PDCCH for fast reconnection, according to an embodiment of the present disclosure.

The base station (e.g., the last serving eNB) having a C-RNTI previously used (or promised) with the terminal transmits the paging PDCCH using the C-RNTI to request the terminal operating in the power saving state to reconnect to the network (connection resume). At this time, the UL-SCH configuration resource should be allocated more than 3 TTIs later than the paging message transmission resource allocated by the paging PCH configuration. The terminal that receives the message receives paging information through the paging PCH and transmits a connection resume request on the UL-SCH if a reconnection request indicator is a predetermined value (usually 1). Upon successful completion of transmission/reception of connection resume request, the network and the terminal recognize that the connectivity is completed, and performs the transition of a terminal state to RRC_CONNECTED.

According to an embodiment of the present disclosure, a C-RNTI+UL SCH configuration may be employed.

Figure 1R:
FIG. 1R illustrates uplink transmission resource allocation and indicator addition in the paging PDCCH for fast reconnection, according to an embodiment of the present disclosure.

FIG. 1R illustrates uplink transmission resource allocation and indicator addition in the paging PDCCH for fast reconnection, according to an embodiment of the present disclosure.

The base station (e.g., the last serving eNB) having a C-RNTI previously used (or promised) with the terminal transmits the paging PDCCH using the C-RNTI to request the terminal operating in the power saving state to reconnect to the network (connection resume). The terminal that receives the message transmits a connection resume request on the UL-SCH if a reconnection request indicator is a predetermined value (usually 1). Upon successful completion of transmission/reception of connection resume request, the network and the terminal recognize that the connectivity is completed, and performs the transition of a terminal state to RRC_CONNECTED.

According to an embodiment of the present disclosure, a RNTI+Paging PCH+UL SCH configuration may be employed.

FIG. 1S illustrates uplink transmission resource allocation and indicator addition in the paging PDCCH for fast reconnection, according to an embodiment of the present disclosure.

The base station transmits the paging PDCCH using the RNTI to request the terminal operating in the power saving state to reconnect to the network (connection resume). At this time, the UL-SCH configuration resource should be allocated more than 3 TTIs later in time than the paging message transmission resource allocated by the paging PCH configuration. The terminal that receives the message receives paging information on the paging PCH and transmits a connection resume request on the UL-SCH if a reconnection request indicator is a predetermined value (usually 1) and if the received information contains its UE-specific ID. Upon successful completion of transmission/reception of connection resume request, the network and the terminal recognize that the connectivity is completed, and performs the transition of a terminal state to RRC_CONNECTED.

Figure 1T:
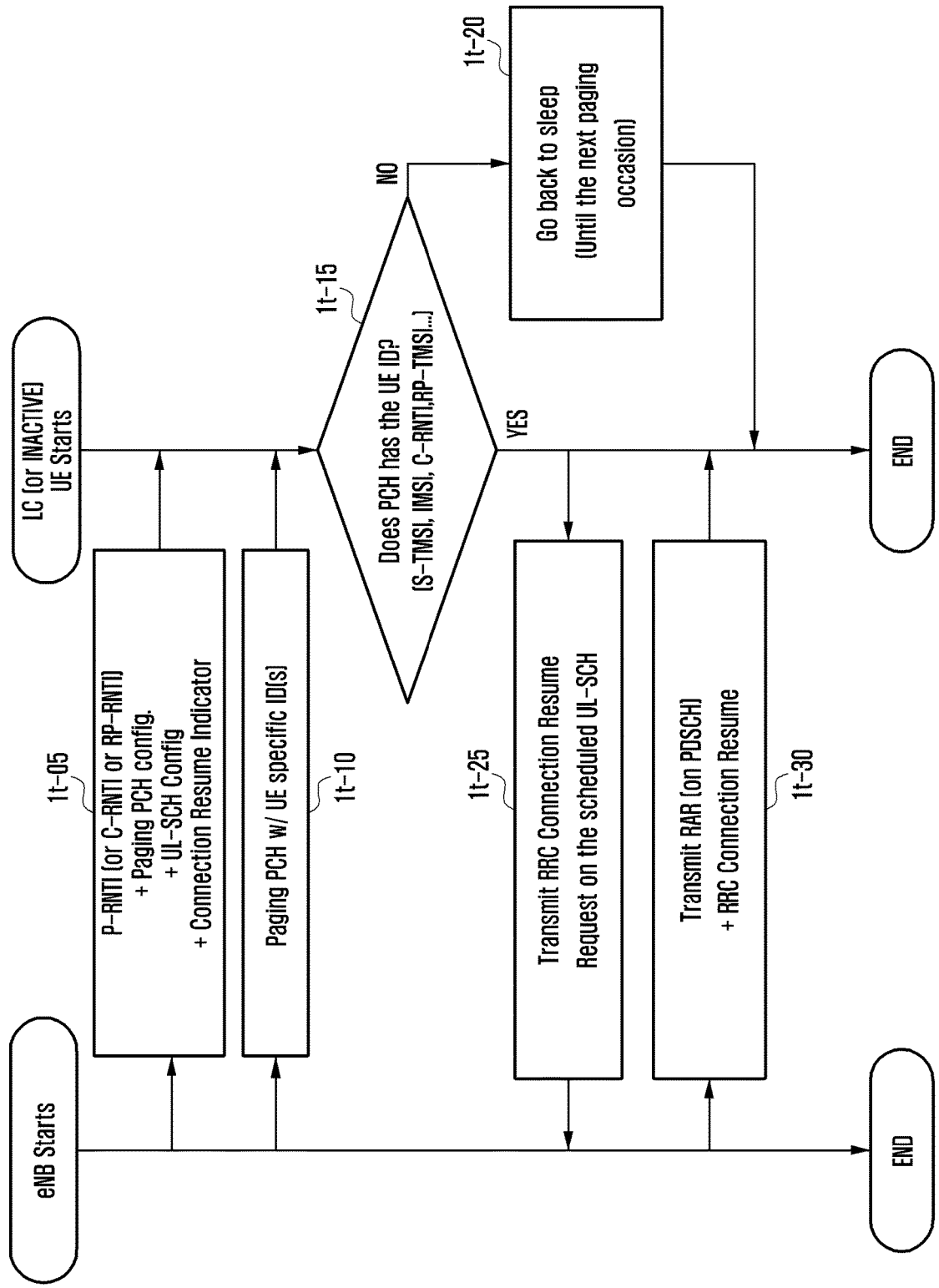
FIG. 1T illustrates a fast network reconnection method using a paging PCH configuration including UL-SCH and an indicator, according to an embodiment of the present disclosure.

FIG. 1T illustrates a fast network reconnection method using paging PCH configuration including UL-SCH and an indicator.

Referring to FIG. 1T, the system includes a base station and a terminal. The terminal may be in a light connection (LC) state or in an inactive state.

At operation 1t-05, the base station transmits a paging PDCCH using an RNTI to the terminal. The RNTI may be at least one of a P-RNTI, a C-RNTI, or an RP-RNTI. The paging PDCCH may include a paging PCH configuration and also include a UL-SCH configuration and a connection request indicator (or a connection resume request indicator). The UL-SCH configuration resource may be allocated to a subframe or TTI which is later in time than the paging message transmission resource allocated by the paging PCH configuration. For example, the UL-SCH resource may be allocated more than 3 TTIs later than the paging message transmission resource.

At operation 1t-10, the base station transmits a paging message to the terminal. The paging message may include a terminal identifier, which may include at least one of IMSI, S-TMSI, C-RNTI, and RP-TMSI.

At operation 1t-15, the terminal receives the paging information through the paging PCH and checks whether the received information contains its own terminal identifier.

If there is no terminal identifier, the terminal proceeds to operation 1t-20. At operation 1t-20, the terminal performs a sleep operation until the next paging occasion.

If there is its own terminal identifier, the terminal proceeds to operation 1t-25. At operation 1t-25, the terminal transmits an RRC connection resume request through the UL-SCH if a reconnection request indicator is a predetermined value (usually 1). The UL-SCH transmission resource may use the UL-SCH resource allocated at operation 1t-10.

At operation 1t-30, the base station transmits a random access response (RAR) and RRC connection resume to the terminal. The terminal may receive the RAR through the PDSCH. If the transmission and reception of the RRC connection resume request and the RRC connection resume are successfully completed, the network and the terminal may recognize that the connectivity is completed, and may perform the transition of a terminal state to RRC_CONNECTED.

A method for allocating dedicated resources (time, frequency, code (preamble)) capable of being used for the purpose of a limited uplink access request to allow the corresponding terminal to perform a fast network connection may be an RNTI+preamble transmission method.

FIG. 1U is a diagram illustrating transmitting RNTI and preamble.

The RNTI receiving terminals start RACH using a dedicated preamble when their UE specific ID is included in received information, and indicate that the corresponding RACH is the RACH for an uplink reconnection request. The base station that receives the dedicated RACH preamble recognizes that the terminal performs a network reconnection request, and thereby reconfigures and resumes the connection.

Figure 1V:
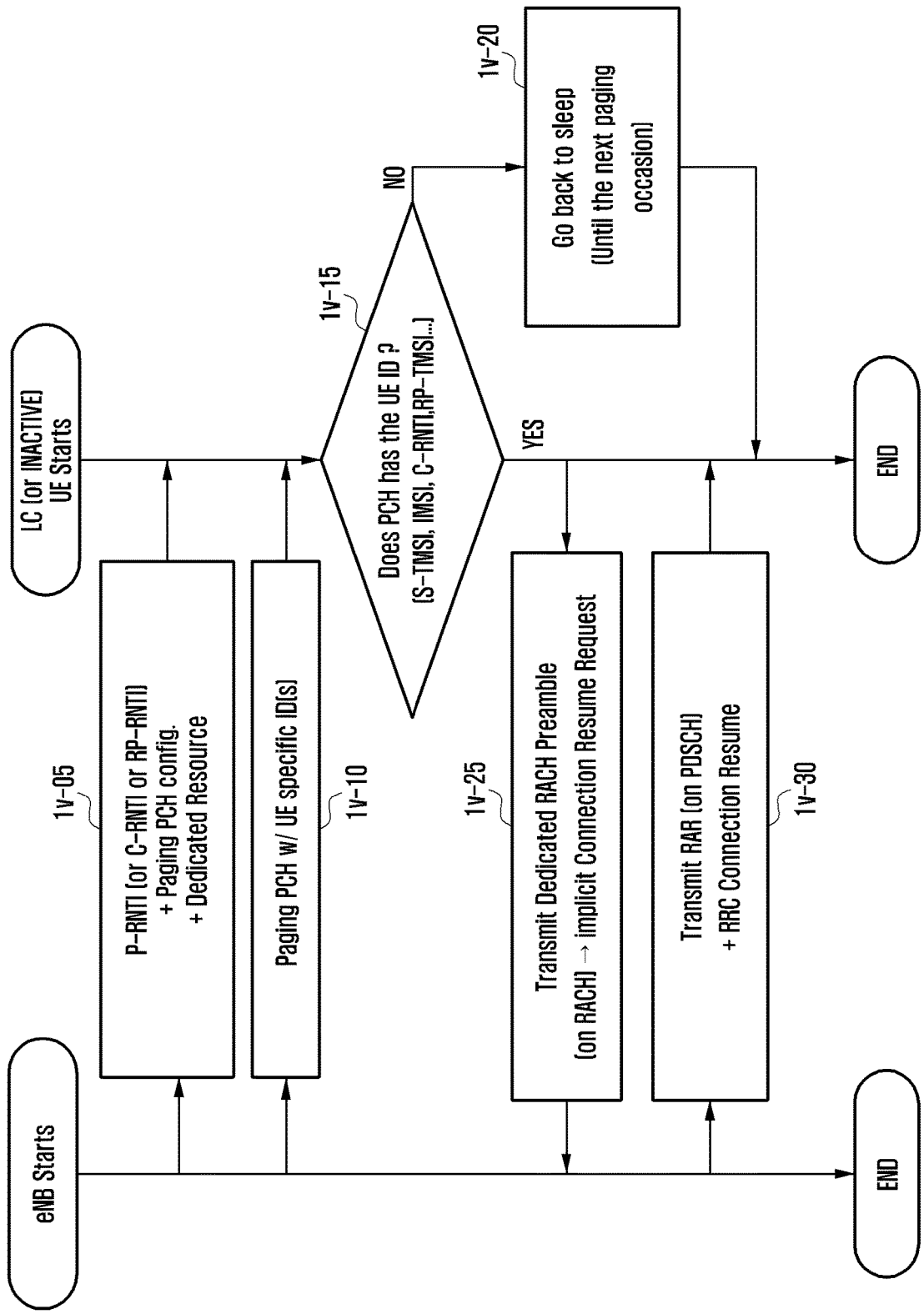
FIG. 1V is a diagram illustrating a fast network reconnection method using a paging PCH configuration including a dedicated random access channel (RACH) preamble, according to an embodiment of the present disclosure.

FIG. 1V is a diagram illustrating a fast network reconnection method using a paging PCH configuration including a dedicated RACH preamble.

Referring to FIG. 1V, the system includes a base station and a terminal. The terminal may be in a light connection (LC) state or in an inactive state.

At operation 1v-05, the base station transmits a paging PDCCH using an RNTI to the terminal. The RNTI may be at least one of a P-RNTI, a C-RNTI, or an RP-RNTI. The paging PDCCH may include a paging PCH configuration and also include a dedicated RACH preamble.

At operation 1v-10, the base station transmits a paging message to the terminal. The paging message may include a terminal identifier, which may include at least one of IMSI, S-TMSI, C-RNTI, and RP-TMSI.

At operation 1v-15, the terminal receives the paging information through the paging PCH and checks whether the received information contains its own terminal identifier.

If there is no terminal identifier, the terminal proceeds to operation 1v-20. At operation 1v-20, the terminal performs a sleep operation until the next paging occasion.

If there is its own terminal identifier, the terminal proceeds to operation 1v-25. At operation 1v-25, the terminal initiates the RACH using the dedicated preamble, thereby indicating that the corresponding RACH is the RACH for the RRC connection resume request.

The base station that receives the dedicated RACH preamble recognizes that the terminal performs the network reconnection request. Then, at operation 1v-30, the base station resets and resumes the connection with the terminal. The base station may transmit a RAR and RRC connection resume to the terminal. The terminal may receive the RAR through the PDSCH. If the transmission and reception of the RRC connection resume request and the RRC connection resume are successfully completed, the network and the terminal may recognize that the connectivity is completed, and may perform the transition of a terminal state to RRC_CONNECTED.

A paging message+resource (time, frequency, code (preamble)) transmission method will now be described FIG. 1W is a diagram illustrating transmitting a paging message and preamble.

The terminals that receive corresponding paging messages on the paging PCH start RACH using a dedicated resource when their UE specific ID is included in received information, and indicate that the corresponding RACH is the RACH for an uplink reconnection request. The base station that receives the dedicated RACH preamble recognizes that the terminal performs a network reconnection request, and thereby reconfigures and resumes the connection.

Figure 1X:
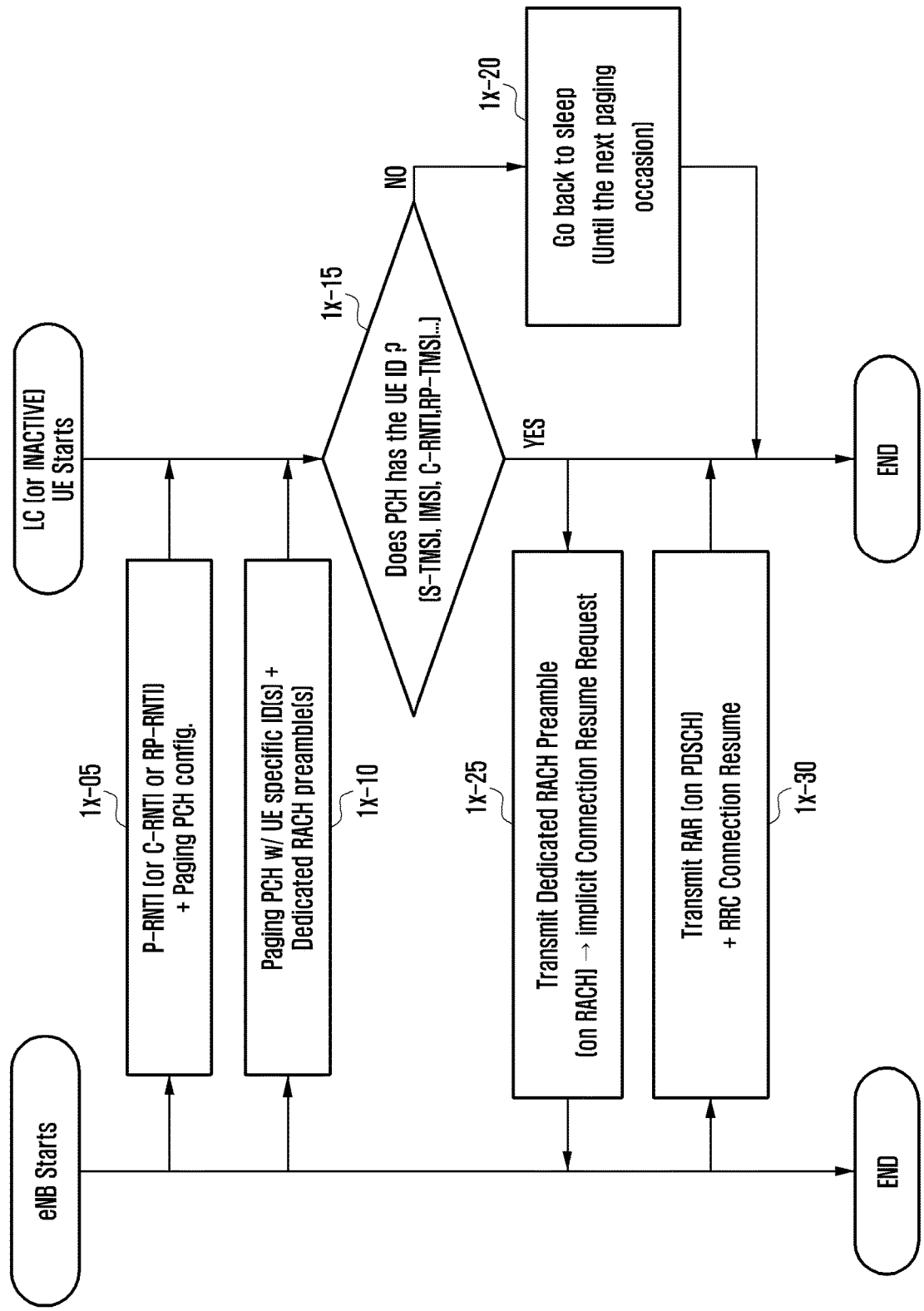
FIG. 1X is a diagram illustrating a fast network reconnection method using a paging message including a dedicated RACH preamble, according to an embodiment of the present disclosure.

FIG. 1X is a diagram illustrating a fast network reconnection method using a paging message including a dedicated RACH preamble.

Referring to FIG. 1X, the system includes a base station and a terminal. The terminal may be in a light connection (LC) state or in an inactive state.

At operation 1x-05, the base station transmits a paging PDCCH using an RNTI to the terminal. The RNTI may be at least one of a P-RNTI, a C-RNTI, or an RP-RNTI. The paging PDCCH may include a paging PCH configuration.

At operation 1x-10, the base station transmits a paging message to the terminal. The paging message may include a terminal identifier, which may include at least one of IMSI, S-TMSI, and C-RNTI, RP-TMSI. The paging message may include a dedicated preamble, or include the dedicated preamble together with the paging message.

At operation 1x-15, the terminal receives the paging information through the paging PCH and checks whether the received information contains its own terminal identifier.

If there is no terminal identifier, the terminal proceeds to operation 1x-20. At operation 1x-20, the terminal performs a sleep operation until the next paging occasion.

If there is its own terminal identifier, the terminal proceeds to operation 1x-25. At operation 1x-25, the terminal initiates the RACH using the dedicated preamble, thereby indicating that the corresponding RACH is the RACH for the RRC connection resume request.

The base station that receives the dedicated RACH preamble recognizes that the terminal performs the network reconnection request. Then, at operation 1x-30, the base station resets and resumes the connection with the terminal. The base station may transmit a RAR and RRC connection resume to the terminal. The terminal may receive the RAR through the PDSCH. If the transmission and reception of the RRC connection resume request and the RRC connection resume are successfully completed, the network and the terminal may recognize that the connectivity is completed, and may perform the transition of a terminal state to RRC_CONNECTED.

A direct transmission method of downlink data using RNTI will now be described.

In case of desiring to transmit short information in downlink to a terminal that operates in a power saving state, the network may identify the terminal by using a known C-RNTI (or other new RNTI) and allocate downlink resources to the terminal to transmit information.

In this case, if the terminal does not need to perform uplink synchronization through random access, the base station may allocate uplink ACK/NACK resources to downlink transmission, receive a response from the terminal, and perform the retransmission and HARQ operation to increase a success rate of DL transmission.

In this case, if the terminal needs to perform uplink synchronization through random access, the base station may repetitively perform the downlink transmission a certain number of times or more by using the repetition to increase the success rate.

Figure 1Y:
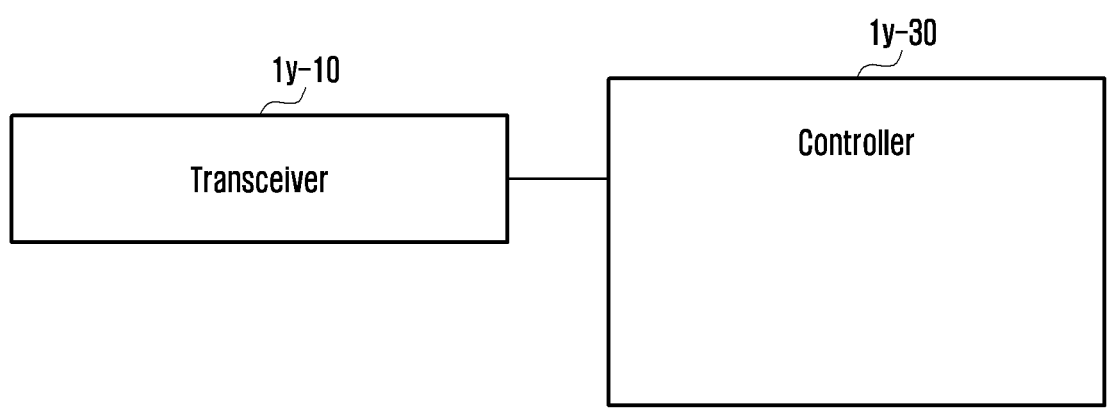
FIG. 1Y is a diagram illustrating a terminal, according to an embodiment of the present disclosure.

FIG. 1Y is a diagram illustrating a terminal, according to an embodiment of the present disclosure.

Referring to FIG. 1Y, the terminal may include a transceiver 1y-10 for transmitting and receiving a signal and a controller 1y-30. The terminal may transmit and/or receive signals, information, and messages through the transceiver 1y-10. The controller 1y-30 may control the overall operation of the terminal. The controller 1y-30 may include at least one processor. The controller 1y-30 may control the operation of the terminal described with reference to FIGS. 1A to 1X.

The controller 1y-30 may receive a beam feedback trigger condition and determine whether the beam feedback trigger condition is satisfied. If it is determined that the beam feedback trigger condition is satisfied, the controller 1y-30 may trigger a beam feedback on a medium access control (MAC) layer of the terminal and, based on the beam feedback trigger, control the transmission of a MAC control element (MAC CE) including beam feedback information. The beam feedback trigger condition may include a case where a channel measurement value of at least one beam is greater than the sum of a predetermined threshold value and a channel measurement value of a current serving beam.

In addition, if the uplink of the terminal is synchronized, the controller 1y-30 may control the transmission of the beam feedback information by using the uplink allocation resources received through a scheduling request (SR) procedure. The terminal may transmit the SR and receive information on resources allocated for beam feedback in response to the SR transmission. The resource allocation may be performed periodically or aperiodically.

If the uplink of the terminal is not synchronized, the controller 1y-30 may control the transmission of the beam feedback information through a random access procedure. When the beam feedback is triggered, the controller 1y-30 may control transmitting a random access preamble, receiving a random access response in response to the transmission of the random access preamble, transmitting the beam feedback information in response to the reception of the random access response, and receiving a random access contention result in response to the transmission of the beam feedback information. The message transmitting the beam feedback information may be message 3 (MSG3) in the random access procedure.

In addition, the controller 1y-30 may control the reception of beam change indication information and, upon receiving the beam change indication information, control the change of a beam, based on the beam feedback information, after a predetermined time.

Figure 1Z:
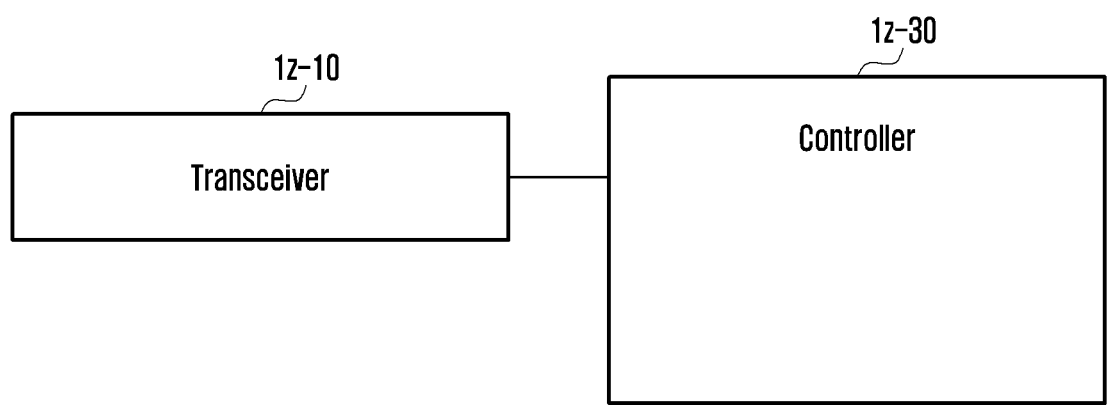
FIG. 1Z is a diagram illustrating a base station, according to an embodiment of the present disclosure.

FIG. 1Z is a diagram illustrating a base station, according to an embodiment of the present disclosure.

Referring to FIG. 1Z, the base station may include a transceiver 1z-10 for transmitting and receiving a signal and a controller 1z-30. The base station may transmit and/or receive signals and information, messages through the transceiver 1z-10. The controller 1z-30 may control the overall operation of the base station. The controller 1z-30 may include at least one processor. The controller 1z-30 may control the operation of the base station described with reference to FIGS. 1A to 1X.

Also, the controller 1z-30 may control the transmission of a beam feedback trigger condition to the terminal and also control the reception of a MAC CE including beam feedback information from the terminal. The beam feedback information may be triggered when it is determined that the beam feedback condition is satisfied on the MAC layer of the terminal. That is, the beam feedback condition may be triggered according to the determination of the MAC layer of the terminal. The beam feedback trigger condition may include a case where a channel measurement value of at least one beam is greater than the sum of a predetermined threshold value and a channel measurement value of a current serving beam.

If the uplink of the terminal is synchronized, the controller 1z-30 may allocate uplink resources to the terminal through an SR procedure and control the reception of the beam feedback information from the allocated uplink resources.

Also, if the uplink of the terminal is not synchronized, the controller 1z-30 may control the reception of the beam feedback information through the random access procedure. The controller 1z-30 may control receiving a random access preamble, transmitting a random access response in response to the reception of the random access preamble, receiving the beam feedback information in response to the transmission of the random access response, and transmitting a random access contention result in response to the reception of the beam feedback information. The message receiving the beam feedback information may be MSG3 in the random access procedure.

Further, the controller 1z-30 may control the transmission of beam change indication information in response to the reception of the beam feedback information and then control the change of a beam, based on the beam feedback information, after a predetermined time.

[Embodiment B: Beam Grouping]

According to an embodiment of the present disclosure, a beam management method for a terminal and a base station may be provided including operations of transmitting beam measurement information to the base station at the terminal, selecting a beam to be used, based on the beam measurement information of the terminal at the base station, notifying information on the selected beam to the terminal at the base station, and changing a currently used beam to a new beam at the base station and the terminal.

In addition, according to an embodiment of the present disclosure, a method by which the terminal inserts an indicator in the beam measurement information to be transmitted to the base station so as to indicate whether a beam change message needs to be transmitted when the base station changes a beam may be provided. Also, a beam change method of the base station using this indicator may be provided.

The wireless communication system considers a structure in which a single base station including a plurality of transmitting/receiving ends supports a wide physical area in order to improve the delay due to frequent exchange of information and realize efficient resource utilization.

A distributed antenna system (DAS) transmits or receives the same signal by implementing, as physical antennas, different transmitting/receiving ends under a single base station.

A remote radio head (RRH) system is capable of transmitting or receiving different signals by implementing different transmitting/receiving ends under a single base station as a structure including an antenna and a simple radio frequency (RF) end.

A coordinated multi-point transmission/reception (CoMP) system is one in which different transmitting/receiving ends under one or more base stations simultaneously transmit or receive the same synchronized information to or from one user or when one transmitting/receiving end transmits or receives information, the other transmitting/receiving ends are silent.

Analog beamforming is for forming beams having physical directionality in a specific direction and obtaining antenna gain by transmitting different transmit powers and phases with multiple array antennas and superimposing radiation patterns of the antennas.

Analog beamforming is capable of setting a beam from multiple antennas in a desired direction without channel information of a target receiving end and allowing transmission/reception only in one direction at a time (radiation patterns in the other directions are offset) to form a beam reaching farther with the same power and having high antenna gain (different beam widths/lengths according to the number of antennas).

Digital beamforming is a technique of forming a plurality of orthogonal beams that offset desired inter-channel interference by applying different coding to each set of information before transmission for each antenna through the utilization of multi-channel information between antennas having different strengths in multi-antenna transmission/reception environment.

Digital beamforming utilizes different channel characteristics as much as possible by using a pre-coding technique on the data transmitted through each antenna.

In addition, digital beamforming supports single-user MIMO and multi-user MIMO

Hybrid beamforming is a technique that uses analog beamforming and digital beamforming simultaneously.

Hybrid beamforming uses digital beamforming by using different pre-coding techniques for respective transmission antennas and beams formed by analog beamforming.

The technique described in embodiments of the present disclosure may use one of analog beamforming, digital beamforming, and hybrid beamforming. Also, a method of occupying and transmitting resources that can be distinguished physically or with a frequency, time, code, or signal for transmission of information is referred to as beamforming and is applicable to all systems in which the occupied resources are called beams.

In addition, features of related technologies used in wireless communication technologies complying with 3GPP standards are as follows.

Uplink transmission (from a terminal to a base station) should be performed using reserved resources through resource allocation by the base station.

The terminal that needs uplink transmission should be allocated a resource for uplink transmission by transmitting a resource allocation request (i.e., a SR) allocated in advance by the base station. The terminal transmits the SR, then transmits a buffer status report (BSR) to notify a data amount to be transmitted in uplink, receives resource allocation, and perform uplink transmission. Alternatively, the terminal may perform uplink transmission through a random access channel (RACH) capable of contention-based transmission.

Channel measurement information feedback includes techniques for notifying the base station of channel information measured by the terminal, as well as channel measurement and feedback performed on the physical layer. Examples of such information include a reference signal received power (RSRP), a reference signal received quality (RSRQ), a signal-to-noise ratio (SNR), a signal-to-interference-plus-noise ratio (SINR), a channel quality indicator (CQI), and a channel state information-reference signal (CSI-RS). The terminal may acquire such information by measuring a certain signal (a cell specific reference signal or common reference signal (CRS), a dedicated reference signal (DRS), a CSI-RS, or a demodulation reference signal (DMRS)) transmitted by the base station.

The terminal may transmit the acquired information by using resources allocated by the base station according to the uplink transmission rule. Without the resources allocated by the base station, the wireless communication technology has no method or no need of providing such information to the base station.

In order to improve efficiency, the wireless communication system transmits signals for maintaining connectivity such as a control signal and a reference signal by using frequency channels and time resources that can be received by all users in common.

On the other hand, in case of a multi-antenna beamforming system in which different resources such as frequency channels, times, beams, and codes are allocated and used differently for different beams, it may be impossible to use resources due to a change in beam characteristics (i.e., direction or channel) caused between a resource reservation time and a used time.

For example, in a system that uses a plurality of analog beams for transmission/reception, the terminal and the base station transmit and receive information by selecting a specific beam estimated to be good. At this time, the base station reserves the best (or most non-problematic) beam resource, known at the time of reserving the resource, for uplink transmission of the terminal. However, changes in a channel of the reserved beam resources may occur due to a terminal movement or other variables (e.g., sudden traffic obstacles or climate change). When the uplink information transmission fails due to a change in the characteristics of the reserved beam resource, there is no way to solve this problem with the existing technique.

Therefore, in case of a multi-antenna beamforming system in which different resources such as frequency channels, times, beams, and codes are allocated and used differently for different beams, a beam management technique for exchanging beam status information between the terminal and the base station and for rapidly tracking and applying a beam change is required.

In addition, in case of the existing technique that transmits signals for maintaining connectivity such as a control signal and a reference signal by using frequency channels and time resources that can be received by all users in common, if a channel state becomes poor, there is only a method for changing the channel to another channel of different frequency or attempting to reconnect to the network after declaring a failure when a radio link failure condition is satisfied.

However, in case of a multi-antenna beamforming system in which different resources such as frequency channels, times, beams, and codes are allocated and used differently for different beams, there is a high probability that another usable beam exists at the same position even though the beam characteristics become poor. Therefore, since the terminal has an opportunity for maintaining the connectivity, a technique that can utilize this is needed.

Typically, the terminal notifies a channel state change to the base station through a channel information feedback which is allowed only on the physical layer. Specifically, the terminal may know the channel state by receiving a specific signal (CRS, DRS, RS, beam RS, or CSI-RS) from the base station, process and encapsulate channel state information as feedback information (e.g., CQI, rank indicator (RI), or precoding matrix indicator (PMI)), and transmit this to the base station through resources capable of uplink transmission allocated by the base station (e.g., a physical uplink control channel (PUCCH) or a physical uplink shared channel (PUSCH)), or the terminal may transmit an uplink transmission request to the base station (or request a resource allocation for uplink transmission), receive resource allocation, and transmit channel state information.

However, in case of a multi-antenna beamforming system in which different resources such as frequency channels, times, beams, and codes are allocated and used differently for different beams, if the performance of unique resources (e.g., analog beams or hybrid beams) that have been used by the terminal and the base station, a new procedure is required to notify the base station of other available resource information and then use corresponding resources allocated later.

Figure 2A:
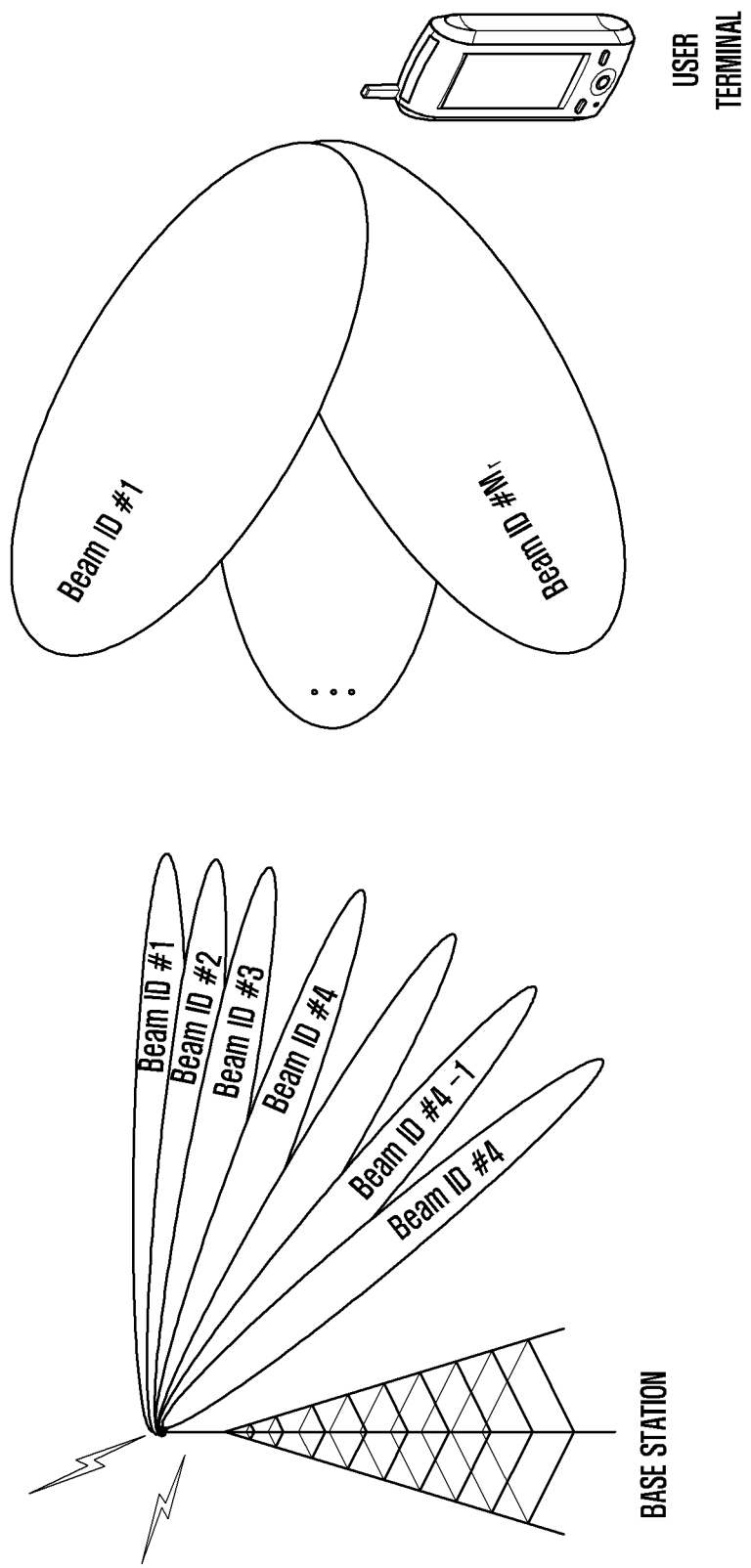
FIG. 2A is a diagram illustrating a multi-beam system, according to an embodiment of the present disclosure.

FIG. 2A is a diagram illustrating a multi-beam system, according to an embodiment of the present disclosure.

Referring to FIG. 2A, the system includes a base station and a terminal that form analog beams having various directions. Here, the analog beam used by the base station and the terminal may be composed of a plurality of small antenna arrays, and it is possible to perform wireless transmission/reception in one direction by using one antenna array group at a time. If one or more antenna array groups are simultaneously operable, it is possible to perform wireless transmission/reception in one or more directions at a time.

An embodiment of the present disclosure provides an environment in which the base station (or transmitting/receiving ends) and the terminal use one or more beams for transmission/reception using a pair of beams at a time in the multi-antenna beamforming system in which different resources such as frequency channels, times, beams, and codes are allocated and used differently for different beams.

In addition, a beam information exchange method is provided which is applicable to a case where the base station or the terminal does not use a plurality of beams, such as a case where the base station uses one or more beams and the terminal uses one beam, or a case where the base station uses one beam and the terminal uses one or more beams.

Specifically, the terminal finds and uses a suitable beam by exchanging and changing information on beams used in the same base station measuring beam information, providing the beam information, and changing the beam being used. In the multi-antenna beamforming system in which different resources such as frequency channels, times, beams, and codes are allocated and used differently for different beams, the base station and the terminal should be able to detect and track a channel status of the transmission/reception beam in real time and to maintain and change a used beam.

The beam measurement is performed to measure the channel of beam pairs resulting from a combination of various beams between the terminal and the neighboring base station. The beam measurement may be performed periodically or aperiodically by the terminal or the base station.

Embodiments of the present disclosure are not limited by any beam measurement method, and it is assumed that the terminal or the base station can measure the channel status of the beam pairs with each other. It is also assumed that the terminal performs an operation of measuring beam information in a certain manner and performs an operation of updating and recognizing a measured value according to each beam information measurement.

The beam feedback is an act of informing the base station of the beam information measured by the terminal. Feedback from the terminal (or the base station) is essential because the base station (or the terminal) which is a transmitting end cannot know downlink (or uplink) beam information. The beam information feedback may be performed periodically or aperiodically by the terminal or the base station.

An embodiment of the present disclosure provides an operation of transmitting beam information measured by the terminal to the base station. However, the scope of the present disclosure is not limited to the beam feedback or reporting of the terminal, and an operation of transmitting beam information measured by the base station to the terminal is also possible. Therefore, the following procedure for beam feedback and beam change of the terminal may be applied equally or similarly to the operation of the base station.

In an embodiment of the present disclosure, the beam feedback information may be beam state information (BSI) and/or beam refinement information (BRI).

To perform a beam change, the base station or the terminal may determine a beam pair to be used in the future, based on the received beam feedback information. The base station or the terminal may perform various operations to use the determined beam pair.

A terminal refers to a beam measuring entity of performing beam measurement, and a base station refers to a beam using entity of transmitting a reference signal for beam measurement, allocating resources to the beam measuring entity, and using beam information through the measurement when the beam measuring entity informs beam information through feedback.

Although the terminal and the base station are used as an entity of performing beam measurement and feedback and an entity of transmitting a beam reference signal and allocating resources, respectively, their roles are not limited thereto. Alternatively, the base station may be an entity of performing beam measurement and feedback, and the terminal may be an entity of transmitting a beam reference signal and allocating resources.

The best beam refers to a beam pair or two beams of the beam pair when one beam of a beam measuring entity and one beam of a beam using entity, which are assumed to have the best performance among analog beams usable by the beam measuring entity and the beam using entity, are determined. In addition, the best beam may be normally, but not limited to, the best performance beam used by the beam using entity (base station) to communicate with a beam measuring entity (terminal) in the best beam pair measured according to a reference signal transmitted by the beam using entity.

The beam measuring entity may notify information on the best beam pair to the beam using entity through feedback, or the beam using entity may notify information on only one beam to be used to the corresponding beam measuring entity. For example, the terminal may notify the base station of information on only one beam belonging to the base station to be used for transmission/reception of information.

Figure 2B:
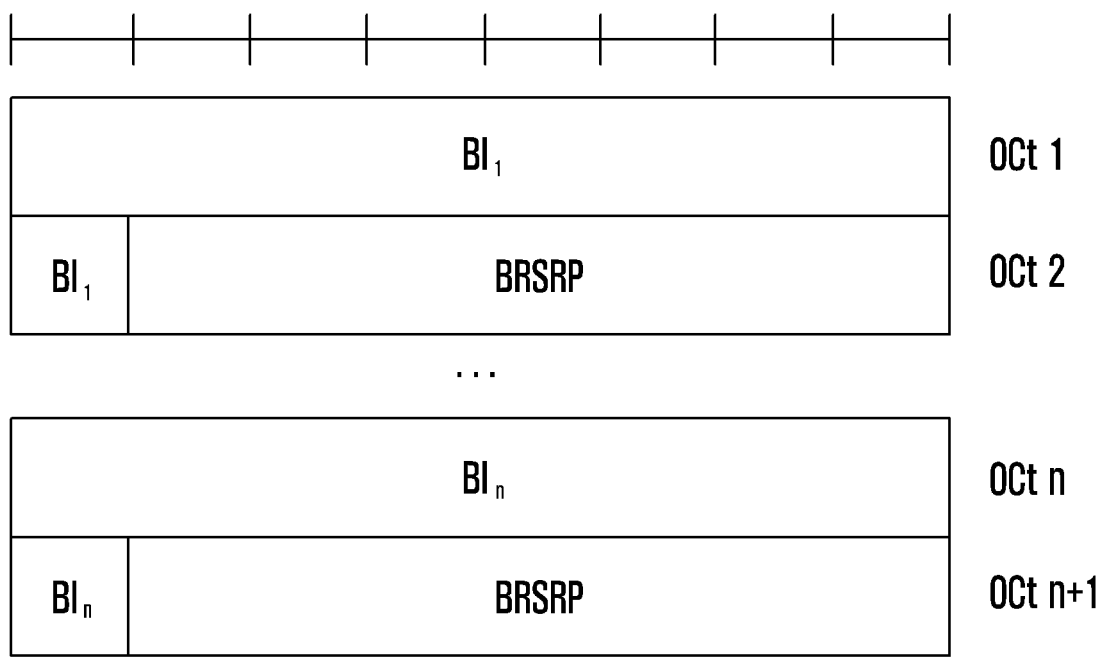
FIG. 2B is a diagram illustrating a frame structure for feeding back a multi-beam ID and a beam measurement value, according to an embodiment of the present disclosure.

FIG. 2B is a diagram illustrating a frame structure for feeding back a multi-beam ID and a beam measurement value, according to an embodiment of the present disclosure.

Referring to FIG. 2B, an embodiment of a MAC-CE structure for transmitting N-beam information (ID 9 bits, BRSRP 7 bits) is shown. BI (9-bit) is a field indicating a beam index. BRSRP (7-bit) is a field indicating an RSRP of a beam.

Although FIG. 2B shows the BI of 9 bits and the BRSRP of 7 bits, the fields may have different bit sizes.

Figure 2C:
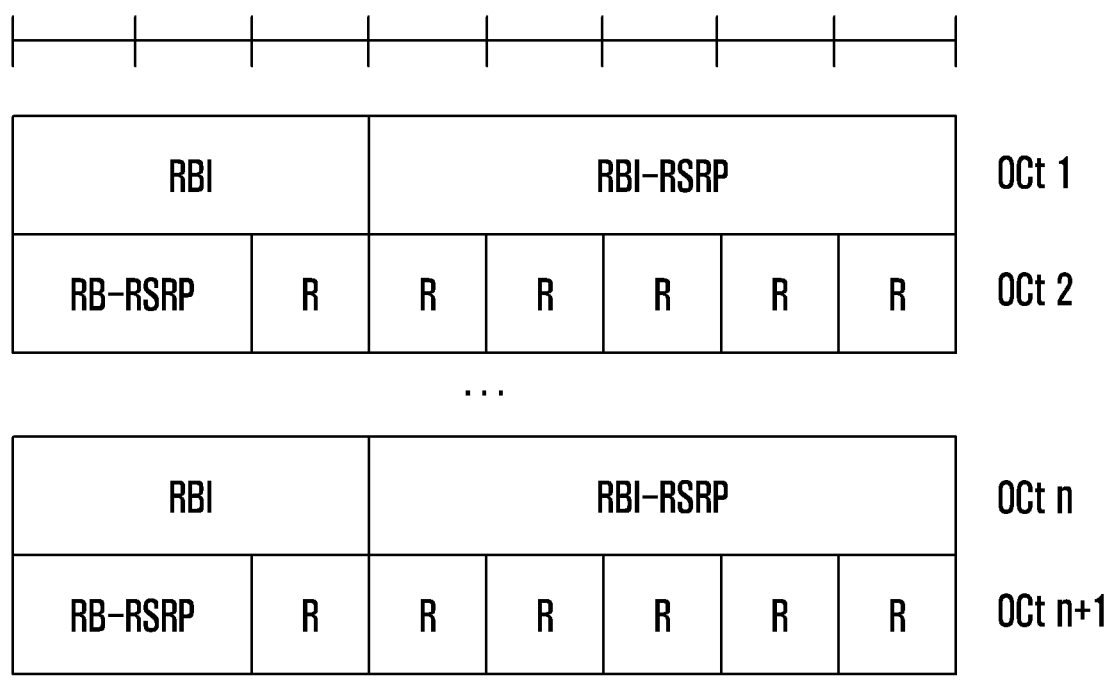
FIG. 2C is a diagram illustrating a frame structure for feeding back a multi-beam ID and a beam measurement value, according to an embodiment of the present disclosure.

FIG. 2C is a diagram illustrating a frame structure for feeding back a multi-beam ID and a beam measurement value, according to an embodiment of the present disclosure.

Referring to FIG. 2C, a MAC-CE structure for transmitting N-beam information (eNB beam ID 3 bits, BRSRP 7 bits) is shown. RBI (3-bit) is a field indicating a beam index. RB-RSRP (7-bit) is a field indicating a reception RSRP of a beam. R is a reserved bit, set to "0".

Although FIG. 2C shows the RBI of 9 bits and the RB-RSRP of 7 bits, the fields may have different bit sizes.

FIG. 2D is a diagram illustrating a frame structure for feeding back a multi-beam ID and a beam measurement value, according to an embodiment of the present disclosure.

Referring to FIG. 2D, a MAC-CE structure for transmitting N-beam information (eNB ID 9 bits, UE ID 5 bits, BRSRP 7 bits) is shown. BI_1 (9-bit) is a field indicating a beam index of a base station. BI_2 (9-bit) is a field indicating a beam index of a terminal. BRSRP (7-bit) is a field indicating an RSRP of a beam In an embodiment of the present disclosure, a method is proposed to improve the efficiency of exchanging information with the base station while minimizing information transmitted to the base station by the terminal.

A method for adding an indicator to request transmission of beam change information will now be discussed.

Figure 2E:
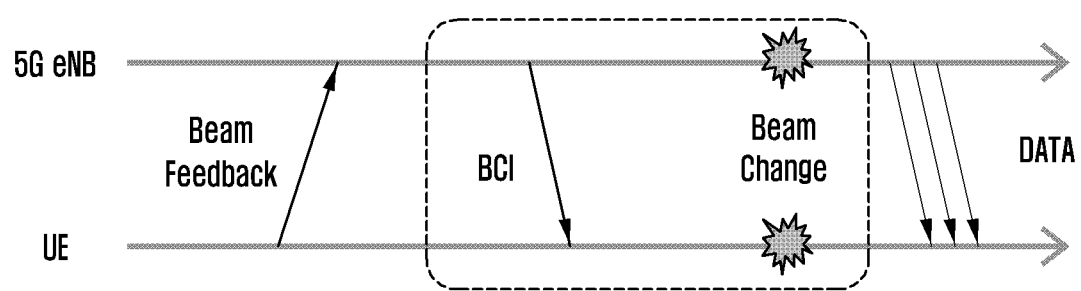
FIG. 2E is a diagram illustrating a beam change through beam feedback, according to an embodiment of the present disclosure.
Figure 2F:
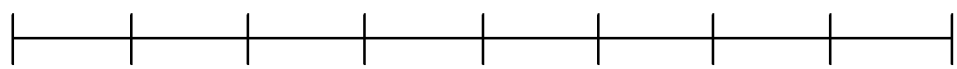
FIGS. 2F and 2G are diagrams illustrating frame structures for transmitting beam feedback, according to an embodiment of the present disclosure.
Figure 2G:
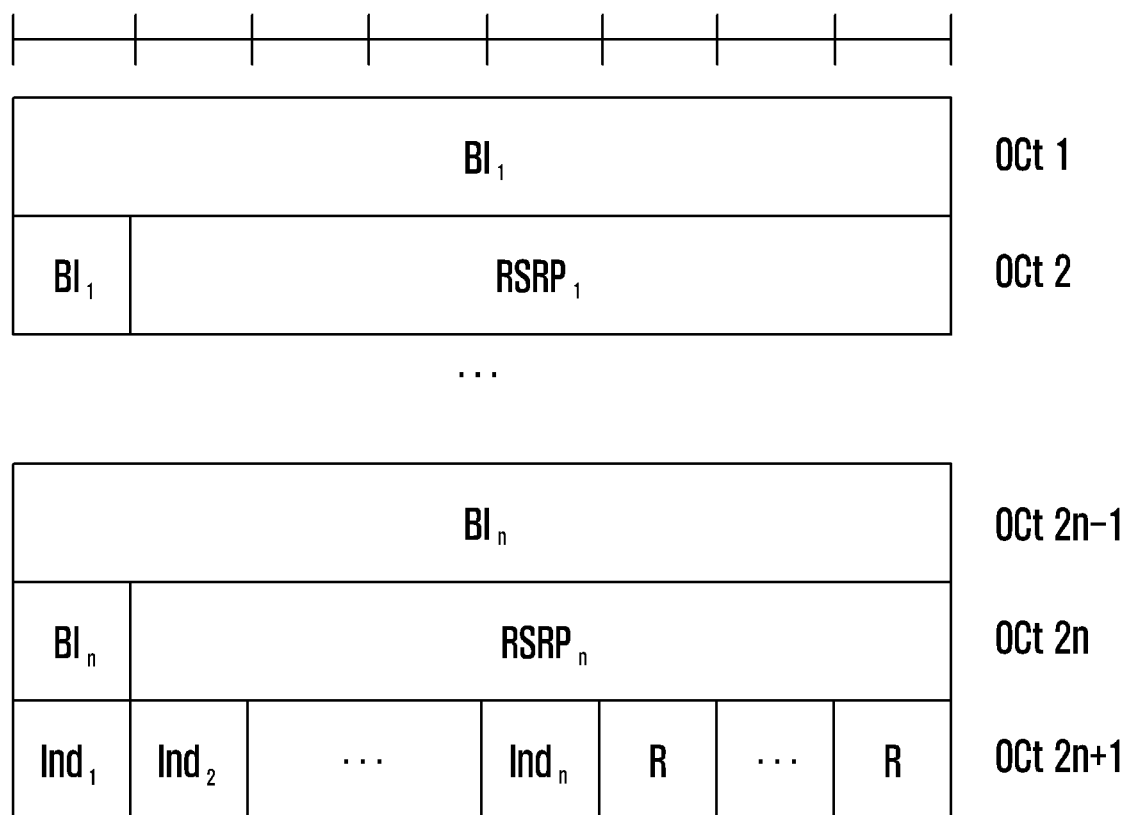

FIG. 2E is a diagram illustrating a beam change through beam feedback, and FIGS. 2F and 2G are diagrams illustrating frame structures for transmitting beam feedback.

The terminal has channel/link measurement values for both a transmission beam of each base station and a reception beam of the terminal through the observed and measured information. Based on these channel measurement values, the terminal feeds back measurement values of top-rank or best beams of the base station and their beam ID information. When the terminal provides only the information on the base station beam to the base station, and when the base station that receives the information uses a certain beam, the terminal does not have information on which beam is used. In other words, if the base station desires to change the currently used beam to a new beam at the time of receiving the beam feedback information, the base station should notify the terminal to which beam the beam will be changed. Then the base station and the terminal should wait until an appointed time and then change the beam.

When a beam change request message is a beam change indication (BCI) message, an example of the corresponding operation procedure is as shown in FIG. 2E.

As shown in FIG. 2E, when only the beam information of the base station is fed back without the beam information of the terminal, the beam change request message is transmitted/received at each beam change, and the beam is changed by waiting until the appointed time. However, if the base station beam needs to be changed but the terminal does not need to change the beam, the waiting time for transmitting the beam change request message and changing the beam is wasted.

In a system environment that considers multi-path and separated transmission reception points, the terminal may receive multiple beams of the same cell by using one Rx beam. In this case, if the Rx beam information of the corresponding terminal is not included in the beam measurement information fed back to the base station, it is impossible to distinguish the case of not needing to transmit the BCI message as described above. Therefore, the network may transmit the BCI message at every time and perform the beam change after a certain time.

In order to eliminate such waste, the present disclosure proposes a method for transmitting beam feedback by adding an indicator of one bit to beam information of the base station as shown in FIGS. 2F and 2G.

FIGS. 2F and 2G illustrate structures for transmitting a base station beam feedback with a 1-bit indicator added, according to an embodiment of the present disclosure.

The indicator may provide terminal beam information to the base station and be used in the following manner.

When the base station changes the used beam to the corresponding beam, an indicator is set to indicate to have to transmit a beam change request message to the terminal. The terminal may manage the measured beam pair information in accordance with Table 17.

Table 17 is a beam pair measurement information management table of the terminal.

TABLE 17

| Cell(or gNB, TRP) Tx beam ID | UE Rx beam ID | Beam quality (RSRP) |
|---|---|---|
| 1 | 1 | $RSRP_{1,1}$ |
| 1 | 2 | $RSRP_{1,2}$ |
| ... | ... | ... |
| 1 | NRx | $RSRP_{1,N\_Rx}$ |
| 2 | 1 | $RSRP_{2,1}$ |
| 2 | 2 | $RSRP_{2,2}$ |
| ... | ... | ... |
| 2 | NRx | $RSRP_{2,N\_Rx}$ |
| ... | ... | ... |
| NTx | NRx | $RSRP_{N\_Tx,N\_Rx}$ |

The terminal generates beam feedback information to be transmitted to the network in a descending order of beam pairs having the best performance (i.e., best quality, best RSRP, RSRQ, CQI, SNR, or SINR).

Table 18 is an example of K beam pair measurement information feedback of the terminal.

TABLE 18

| Cell(or gNB, TRP) Tx bema ID | UE Rx beam ID | Beam quality (RSRP) |
|---|---|---|
| 2 | 1 | $RSRP_{2,1}$ |
| 4 | 4 | $RSRP_{4,4}$ |
| ... | ... | ... |
| 1 | 1 | $RSRP_{1,1}$ |

If the UE Rx beam ID of the beam measurement information feedback table is equal to the currently used serving beam ID (the last beam ID), the indicator is set to 0, and in other cases, the indicator is set to 1.

Alternatively, if the UE Rx beam ID of the beam measurement information feedback table is for Rx beams that can be received by the terminal at the same time, the same indicator may be allocated, and if the UE Rx beam ID is for Rx beams that cannot be simultaneously received, different indicators may be allocated.

Table 19 shows an example in which an indicator is included in the K beam pair measurement information feedback of the terminal when the serving beam ID currently used by the terminal is 1.

TABLE 19

| Cell (or gNB, TRP) Tx beam ID | UE Rx beam ID | Indicator | beam quality (RSRP) |
|---|---|---|---|
| 2 | 1 | 0 | $RSRP_{2,1}$ |
| 4 | 4 | 1 | $RSRP_{4,4}$ |
| ... | ... | ... | ... |
| 1 | 1 | 0 | $RSRP_{1,1}$ |

Removing the UE Rx beam ID from the above information completes the beam feedback information.

Table 20 shows an example of K beam pair measurement information feedback of the terminal when the serving beam ID currently being used by the terminal is 1.

TABLE 20

| Cell(or gNB, TRP) Tx beam ID | Indicator | Beam quality (RSRP) |
|---|---|---|
| 2 | 0 | $RSRP_{2,1}$ |
| 4 | 1 | $RSRP_{4,4}$ |
| ... | ... | ... |
| 1 | 0 | $RSRP_{1,1}$ |

Figure 2H:
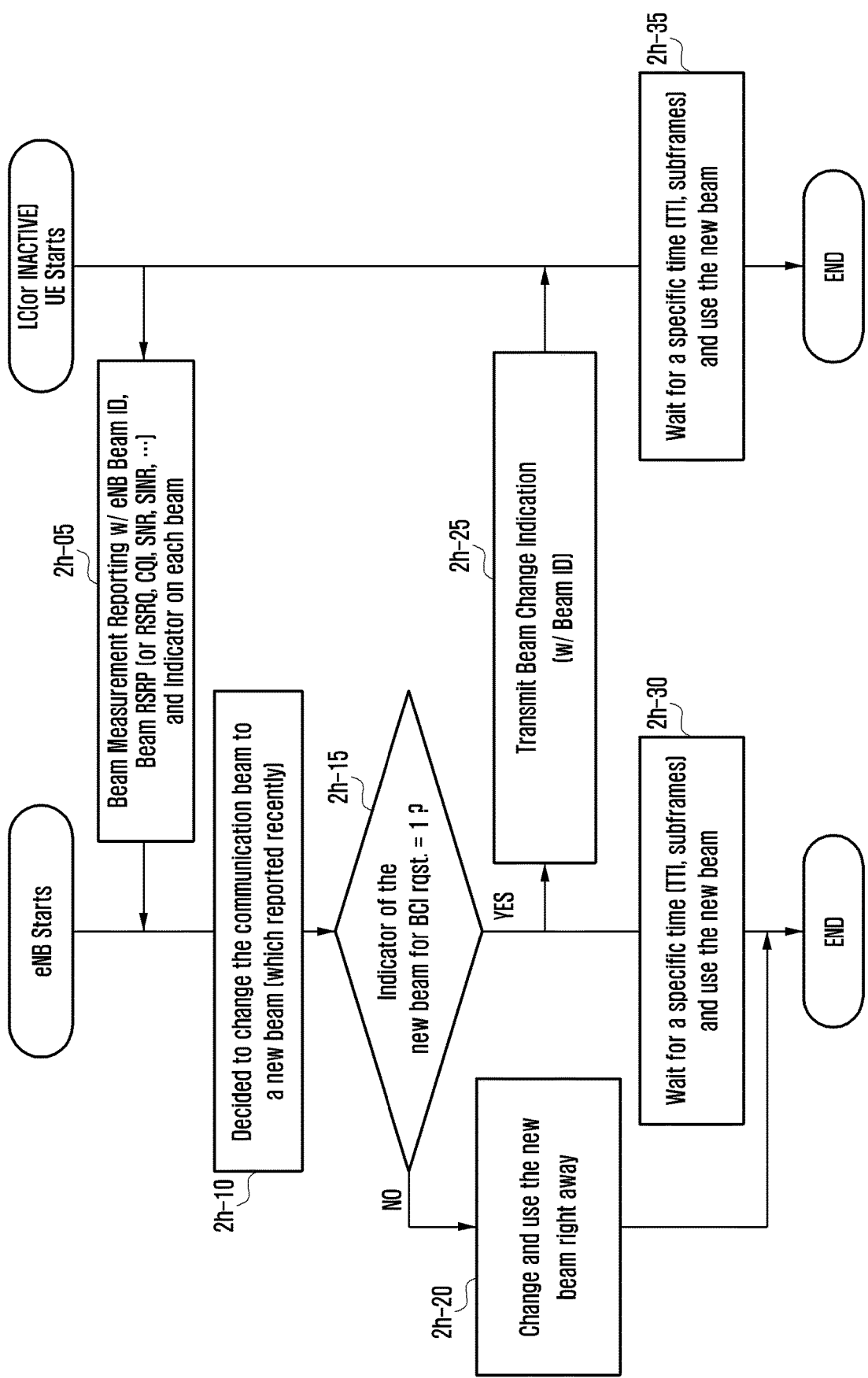
FIG. 2H is a diagram illustrating operations of a base station and a terminal for changing a currently used base station beam to a base station beam with an indicator turned on, according to an embodiment of the present disclosure.

FIG. 2H is a diagram illustrating operations of a base station and a terminal for changing a currently used base station beam to a base station beam with an indicator turned on, according to an embodiment of the present disclosure.

In this case, the corresponding indicator turned on (1) indicates that the terminal should use a terminal beam different from the currently used terminal beam to perform communication.

At this time, when the currently used base station beam is changed to a base station beam with an indicator turned off (0), the base station can arbitrarily change the beam without providing any information to the terminal. In this case, consumption of time, such as promising and waiting for the BCI message transmission and the beam change, is reduced and therefore efficient and fast beam changing becomes possible.

In various embodiments of the present disclosure, it is also possible to oppositely apply the values of the indicator, 0 and 1, and the indicator is not limited to 1-bit information.

Also, if the indicator is the same value, it may indicate that the terminal can simultaneously receive the base station beams. In this case, the indicator may indicate that the terminal can simultaneously receive base station beams indicated by the corresponding indicator with the same Rx beam (or simultaneously receivable and available Rx beams). In this case, the base station may use two or more base station beams simultaneously indicated by the indicator to perform transmission to the terminal.

FIG. 2H is a diagram illustrating operations of a base station and a terminal for changing a currently used base station beam to a base station beam with an indicator turned on, according to an embodiment of the present disclosure.

Referring to FIG. 2H, at operation 2h-05, the terminal sends beam measurement reporting information to the base station. The terminal may measure the channel quality between a reception beam of the terminal and a transmission beam of the base station and generate the beam measurement reporting information. The beam measurement reporting information may include the information described in Table 17-Table 20. Also, the beam measurement reporting information may include a transmission beam ID of the base station, beam RSRP, RSRQ, CQI, SNR, SINR, and an indicator.

At operation 2h-10, the base station changes a currently used beam for the terminal. The base station may change the beam, based on the beam measurement reporting information received from the terminal.

At operation 2h-15, the base station identifies the indicator included in the beam measurement reporting information. The base station may determine whether it is necessary to transmit the BCI message based on the indicator or whether it is necessary to wait for a given time at the beam change. For example, it is possible to check whether the indicator for the beam to be changed is 1 or not. If the indicator is 0, operation 2h-20 is performed. If the indicator is 1, operation 2h-25 is performed. The base station may recognize the beam pairs having the indicator 0 as one group and also recognize the beam pairs having the indicator 1 as one group.

If the indicator is 0, the base station changes the beam at operation 2h-20 without transmitting the BCI message to the terminal. The indicator 0 may indicate the transmission beam of the base station that can be received with the current reception beam of the terminal.

If the indicator is 1, the base station transmits the BCI message to the terminal at operation 2h-25. The BCI message may include identification information (e.g., a beam ID) for the beam that the base station wishes to change. The indicator 1 may indicate the transmission beam of the base station which is not receivable with the current reception beam of the terminal. In this case, when the base station changes to the corresponding transmission beam, the terminal needs to change the reception beam.

At operation 2h-30, the base station waits for a given time (or a specific TTI, subframe) after the BCI message transmission and then uses a new beam. At operation 2h-35, the terminal waits for a given time (or a specific TTI, subframe) after the BCI message reception and then uses a new beam. The base station may use the changed transmission beam, and the terminal may use the changed reception beam.

The base station may transmit downlink information by using the changed transmission beam, and the terminal may receive downlink information, transmitted by the base station, by using the changed reception beam or the current reception beam when the reception beam change is unnecessary.

In a case of changing to a beam having an indicator other than 1, the BCI message transmission and the waiting time may be omitted, thereby reducing the latency.

Also, the indicator may indicate the base station beams that the terminal can receive simultaneously. In this case, it may indicate that the terminal can simultaneously receive base station beams indicated by the corresponding indicator using the same Rx beam (or Rx beams). In this case, the base station may use two or more base station beams simultaneously indicated by the indicator to perform transmission to the terminal.

When the base station changes a used beam to the corresponding beam, an indicator indicating that the beam can be freely changed at any time without any special message is provided.

Figure 2I:
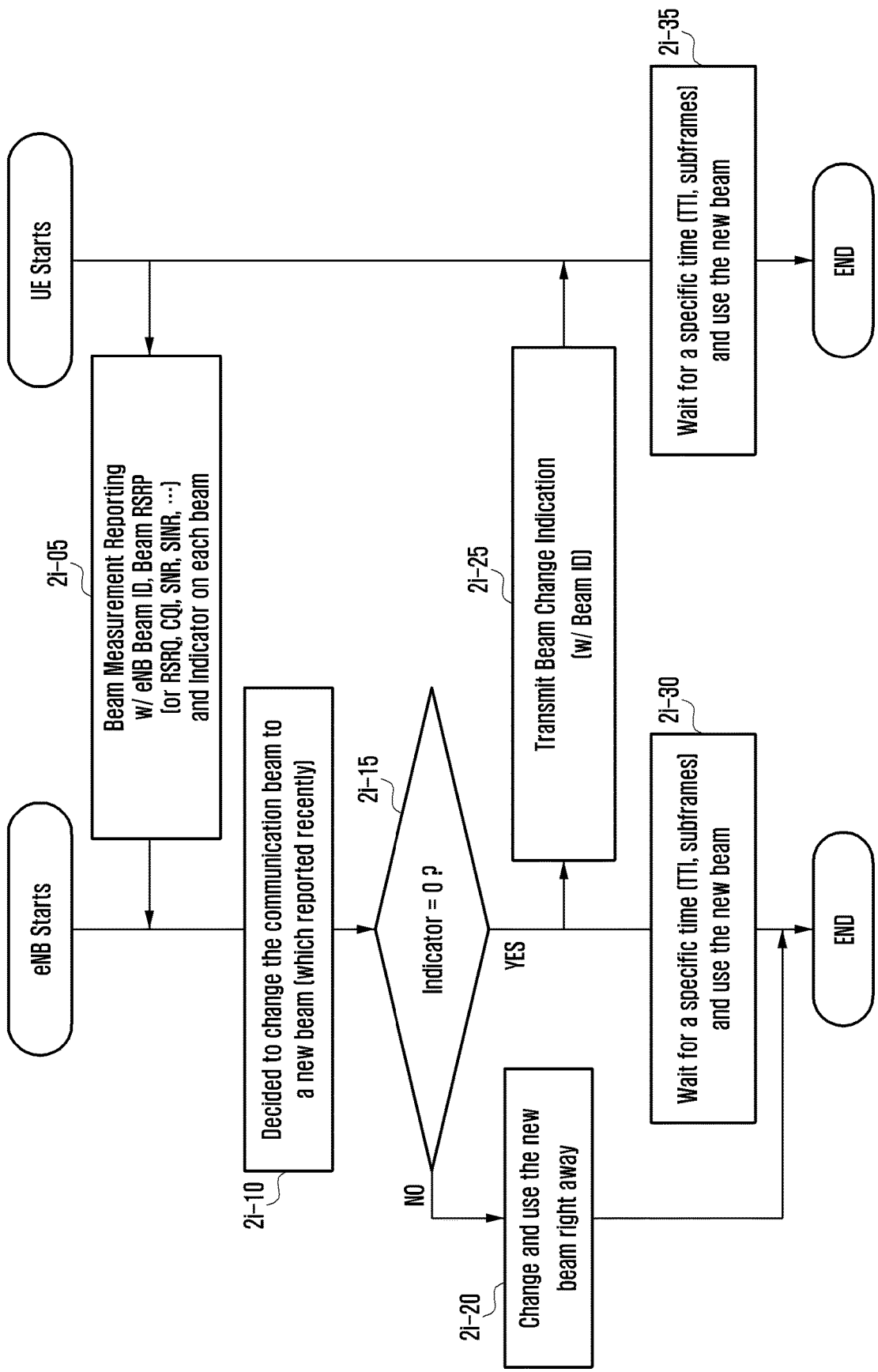
FIG. 2I is a diagram illustrating operations of a base station and a terminal in a case where an indicator specifies that the base station can freely change without sending a beam change indication (BCI) to the terminal, according to an embodiment of the present disclosure.

FIG. 2I is a diagram illustrating operations of a base station and a terminal in case where an indicator specifies that the base station can freely change without sending a BCI to the terminal, according to an embodiment of the present disclosure.

In contrast to FIG. 2H, the indicator in FIG. 2I may indicate that the base station can freely change without sending the BCI message to the terminal.

The base station transmission beams having the indicator of 0 may be simultaneously used under the determination of the base station and for MIMO transmission to the terminal.

Referring to FIG. 2I, at operation 2i-05, the terminal transmits beam measurement reporting information to the base station. The terminal may measure the channel quality between the reception beam of the terminal and the transmission beam of the base station and then generate the beam measurement reporting. The beam measurement reporting may include the information described in Table 17-Table 20. Also, the beam measurement reporting is not limited thereto and may include one of the beam pair measurement information feedback. For example, it may include a transmission beam ID of the base station, a beam RSRP, RSRQ, CQI, SNR, SINR, and an indicator. The indicator may indicate that the base station can freely change without sending the BCI message to the terminal.

At operation 2i-10, the base station determines to change the currently used beam for the terminal. The base station may determine whether to change the beam, based on the beam measurement reporting received from the terminal.

At operation 2i-15, the base station identifies the indicator included in the beam measurement reporting. The base station may determine whether it is necessary to transmit the BCI message based on the indicator or whether it is necessary to wait for a certain time at the beam change. For example, it is possible to check whether the indicator for the beam to be changed is 1 or 0. If the indicator is 0, operation 2i-20 is performed. If the indicator is 1, operation 2i-25 is performed. The base station may recognize the beam pairs having the indicator 0 as one group, and also recognize the beam pairs having the indicator 1 as one group.

If the indicator is 0, the base station changes the beam at operation 2i-20 without transmitting the BCI message to the terminal. The indicator 0 may indicate the transmission beam of the base station that can be received with the current reception beam of the terminal.

If the indicator is 1, the base station transmits the BCI message to the terminal at operation 2i-25. The BCI message may include identification information (e.g., a beam ID) for the beam that the base station wishes to change. The indicator 1 may indicate the transmission beam of the base station which is not receivable with the current reception beam of the terminal. In this case, when the base station changes to the corresponding transmission beam, the terminal needs to change the reception beam.

At operation 2i-30, the base station waits for a given time (or a specific TTI, subframe) after the BCI message transmission and then uses a new beam. At operation 2i-35, the terminal waits for a given time (or a specific TTI, subframe) after the BCI reception and then uses a new beam. The base station uses the changed transmission beam, and the terminal may use the changed reception beam.

The base station may transmit downlink information by using the changed transmission beam, and the terminal may receive downlink information, transmitted by the base station, by using the changed reception beam or the current reception beam when the reception beam change is unnecessary.

The indicator may indicate that the terminal can simultaneously receive information at the same time even if the base station simultaneously uses a transmission beam.

When the indicator indicates that the terminal can simultaneously receive information, the indicator may indicate that the terminal can simultaneously receive base station beams indicated by the corresponding indicator using the same Rx beam (or Rx beams). In this case, the base station may simultaneously use two or more base station beams indicated by the corresponding indicator to perform simultaneous transmission to the terminal.

Also, the indicator need not necessarily be 1 bit, and an indicator of the same value may indicate a plurality of beams that can be simultaneously transmitted.

Also, the indicator may be used as any arbitrary beam group ID set by the terminal. In this case, the base station may recognize that the terminal divides the base station beams into groups, identify different groups, and indicate a specific operation (e.g., beam measurement and reporting).

If the terminal can operate one Rx beam at a time and if beam transmission of different base stations can be simultaneously received using the corresponding Rx beam, a method for generating feedback information including the beam indication of the terminal is as follows.

Table 21 is a beam pair measurement information management table of the terminal.

TABLE 21

| Cell (or gNB, TRP) Tx beam ID | UE Rx beam ID | Beam quality (RSRP) |
|---|---|---|
| 1 | 1 | $RSRP_{1,1}$ |
| 1 | 2 | $RSRP_{1,2}$ |
| ... | ... | ... |
| 1 | NRx | $RSRP_{1,N\_Rx}$ |
| 2 | 1 | $RSRP_{2,1}$ |
| 2 | 2 | $RSRP_{2,2}$ |
| ... | ... | ... |
| 2 | NRx | $RSRP_{2,N\_Rx}$ |
| ... | ... | ... |
| NTx | NRx | $RSRP_{N\_Tx,N\_Rx}$ |

The terminal generates beam feedback information to be transmitted to the network in a descending order of beam pairs having the best performance (i.e., best quality, best RSRP, RSRQ, CQI, SNR, or SINR).

Table 22 is an example of K beam pair measurement information feedback of the terminal.

TABLE 22

| Cell(or gNB, TRP) Tx beam ID | UE Rx beam ID | Beam quality (RSRP) |
|---|---|---|
| 2 | 1 | $RSRP_{2,1}$ |
| 4 | 4 | $RSRP_{4,4}$ |
| 3 | 4 | $RSRP_{3,4}$ |
| 6 | 5 | $RSRP_{6,5}$ |
| ... | ... | ... |
| 1 | 1 | $RSRP_{1,1}$ |

Table 22 is a table in which measured information grouped into base station Tx beam and terminal Rx beam pairs are arranged in order of performance. For example, in Table 22 the channel performance (RSRP) of the second base station Tx beam and the first terminal Rx beam is the best, and the channel performance (RSRP) of the fourth base station Tx beam and the fourth terminal Rx beam is the next best.

After completion of the ordering according to the received signal strength of the beam pairs, the terminal may allocate the indicators by grouping simultaneously receivable beam pairs with the same indicator.

Table 23a is a table for allocating indicators by grouping simultaneously receivable beams in order of performance.

TABLE 23a

| Cell(or gNB, TRP) Tx beam ID | UE Rx beam ID | Indicator | Beam quality (RSRP) |
|---|---|---|---|
| 2 | 1 | 0 | $RSRP_{2,1}$ |
| 4 | 4 | 1 | $RSRP_{4,4}$ |
| 3 | 4 | 1 | $RSRP_{3,4}$ |
| 6 | 5 | 2 | $RSRP_{6,5}$ |
| ... | ... | ... | ... |
| 1 | 1 | 0 | $RSRP_{1,1}$ |

In Table 23a, the terminal allocates groups in the order of same Rx beam IDs, distinguishes the base station-terminal beam pairs belonging to the corresponding group, and allocates them to the same indicators.

In Table 23a, the terminal allocates the indicator 0 to the group to which the best base station-terminal beam pair belongs, and then allocates a new group indicator 1 to the next best base station-terminal beam pair. Since the third best base station-terminal beam pair has the same Rx beam as the second best base station-terminal beam pair and can be received at the same time, the same group indicator 1 as that of the second best base station-terminal beam pair is allocated. With this rule, the terminal may sequentially group the information of base station-terminal beam pairs to be transmitted to the network.

Here, the terminal Rx beam ID column may be removed from information that the terminal actually feeds back to the base station. Of course, another case of including the terminal Rx beam ID may also be considered.

Table 23b is table for allocating indicators by grouping simultaneously receivable beams in order of a terminal reception beam.

TABLE 23b

| Cell(or gNB, TRP) Tx beam ID | UE Rx beam ID | Indicator | Beam quality (RSRP) |
|---|---|---|---|
| 2 | 1 | 1 | $RSRP_{2,1}$ |
| 4 | 4 | 4 | $RSRP_{4,4}$ |
| 3 | 4 | 4 | $RSRP_{3,4}$ |
| 6 | 5 | 5 | $RSRP_{6,5}$ |
| ... | ... | ... | ... |
| 1 | 1 | 1 | $RSRP_{1,1}$ |

In Table 23b, the terminal allocates groups in the order of same Rx beam IDs, distinguishes the base station-terminal beam pairs belonging to the corresponding group, and allocates them to the same indicators.

In Table 23b, the terminal allocates the indicator of each beam pair group by using its Rx beam ID. For example, in a case of a base station-terminal beam pair having a terminal Rx beam ID of 4, the indicator is also allocated as 4. The disadvantage of this method is that, regardless of the amount of beam information transmitted in feedback by the terminal, the number of bits for indicator transmission should be guaranteed by the number of Rx beams of the terminal. For example, if a certain terminal has twelve Rx beams and transmits only four pieces of beam measurement information at each time, the number of bits in a signal for the indicator should be 4 bits so that the number of bits in the signal can be a maximum of twelve.

Here, the terminal Rx beam ID column may be removed from information that the terminal actually feeds back to the base station. Of course, other case of including the terminal Rx beam ID may also be considered.

Table 23c is a table for constructing feedback transmission by grouping simultaneously receivable beams with the same number.

TABLE 23c

| Cell(or gNB, TRP) Tx beam ID | UE Rx beam ID | Indicator | Beam quality (RSRP) |
|---|---|---|---|
| 2 | 1 | 0 | $RSRP_{2,1}$ |
| 1 | 1 | 0 | $RSRP_{1,1}$ |
| 4 | 4 | 1 | $RSRP_{4,4}$ |
| 3 | 4 | 1 | $RSRP_{3,4}$ |
| 6 | 5 | 2 | $RSRP_{6,5}$ |
| 5 | 5 | 2 | $RSRP_{5,5}$ |
| ... | ... | ... | ... |

In Table 23c, the terminal allocates group indicators to the beam pairs having the same Rx beam ID in the order of performance in the same manner as that in Table 23a, and then reconstructs the groups to contain information on the same number of beam pairs.

Although the group indicator of the terminal is allocated in the order of performance, Table 23c allocates the group indicator as in Table 23b (or using any other method) and then rearrange the number of beam pairs, belonging to the corresponding group and to be fed back to the base station, as the same two.

If the same number of beam information sets is included in each group and provided to the network, the network may deliver the number of beam pairs to be transmitted for each group by the terminal to the terminal through a downlink signal.

For example, as shown in Table 23c, the base station that desires to receive information on two beam pairs for each group may deliver the number of beam pairs per group to the terminal by using one of the following methods.

The total number of beam pairs to be reported in the radio resource management (RRM) measurement report configuration signal, the number of beam pairs to be reported per group, and the number of groups to be reported may be transmitted. In this case, the terminal transmits the RRM measurement report, to be uplink transmitted upon a condition, to include the group and the number of beam pairs to be reported per group. For example, if the total number of beam pairs to be reported is K, the number of beam pairs to be reported per group is L, and the number of groups to be reported is M, the terminal may report in the following manner.

If K>L×M, the terminal provides a total of L×M beam-pair information to the network by L for M groups.

If K<L×M, the terminal arranges the beam pairs in order of performance of the respective beam pairs, and provides information to the network by constructing a reporting signal so that each group includes a maximum of L beams within a range of not exceeding the maximum of M beam groups and thus the total number of beam pairs is K.

If L=0 and M=0, or if L=∞ and M=∞, the terminal does not care about the number of beams per beam group, and provides information to the network by constructing a reporting signal so that the beam pairs become K in the order or performance as in Table 23a and Table 23b.

The beam measurement information provided by the terminal may include information on a base station transmission beam ID, a terminal reception beam ID, a beam measurement quantity, RSRP, RSRQ, SNR, SINR, CQI, and a group indicator.

The total number of beam pairs to be reported in the downlink physical layer control signal (DCI on PDCCH) or the MAC-CE signal, the number of beam pairs to be reported per group, and the number of groups to be reported may be transmitted. In this case, the terminal transmits the uplink control signal (UCI on PUCCH), the uplink data signal (data on PUSCH), or the uplink MAC-CE, to be uplink transmitted upon a condition, to include the group and the number of beam pairs to be reported per group. For example, if the total number of beam pairs to be reported is K, the number of beam pairs to be reported per group is L, and the number of groups to be reported is M, the terminal may report in the following manner.

If K>L×M, the terminal provides a total of L×M beam-pair information to the network by L for M groups.

If K<L×M, the terminal arranges the beam pairs in order of performance of the respective beam pairs, and provides information to the network by constructing a reporting signal so that each group includes a maximum of L beams within a range of not exceeding the maximum of M beam groups and thus the total number of beam pairs is K.

If L=0 and M=0, or if L=∞ and M=∞, the terminal does not care about the number of beams per beam group, and provides information to the network by constructing a reporting signal so that the beam pairs become K in the order or performance as in Tables 23a and Table 23b.

The beam measurement information provided by the terminal may include information on a base station transmission beam ID, a terminal reception beam ID, a beam measurement quantity, RSRQ, SNR, SINR, CQI, and a group indicator.

On the other hand, the terminal Rx beam ID column may be removed from information that the terminal actually feeds back to the base station. Of course, another case of including the terminal Rx beam ID may also be considered.

A method for adding an indicator to request transmission of beam change information of a terminal capable of simultaneously using multiple Rx beams will now be described.

The terminal has channel/link measurement values for a pair of a Tx beam of each base station and an Rx beam of the terminal through the observed and measured information.

Based on these channel measurement values, the terminal feeds back measurement values of top-ranked or best beams of the base station and their beam ID information together with adding an indicator.

In this method for providing the beam feedback information to the base station with the indicator added, when the terminal can simultaneously operate two or more different Rx beams, the indicator and the beam feedback information may be configured in the following manner.

When the terminal needs to change to an Rx beam other than two or more Rx beams currently used for wireless communication, a method is provided for transmitting beam feedback with the indicator represented as ON (1, true).

The indicator of the Tx of the base station that can be received using the beam being used by the terminal is represented as 0 and transmitted. For other beams, the indicator is represented as 1 and transmitted.

Table 24 is a table including indicators in the K beam-pair measurement information feedback of the terminal when the UE Rx beam IDs currently being used by the terminal are 1 and 2.

TABLE 24

| Cell(or gNB, TRP) Tx beam ID | UE Rx beam ID | Indicator | Beam quality (RSRP) |
|---|---|---|---|
| 2 | 1 | 0 | $RSRP_{2,1}$ |
| 4 | 4 | 1 | $RSRP_{4,4}$ |
| 3 | 2 | 0 | $RSRP_{3,2}$ |
| 5 | 3 | 1 | $RSRP_{5,3}$ |
| ... | ... | ... | ... |
| 1 | 1 | 0 | $RSRP_{1,1}$ |

When the UE Rx beam ID is removed from the above information, the beam feedback information is completed as follows.

Table 25 is a table including indicators in the completed beam feedback when the UE Rx beam IDs currently used by the terminal are 1 and 2.

TABLE 25

| Cell (or gNB, TRP) Tx beam ID | Indicator | Beam quality (RSRP) |
|---|---|---|
| 2 | 0 | $RSRP_{2,1}$ |
| 4 | 1 | $RSRP_{4,4}$ |
| 3 | 0 | $RSRP_{3,2}$ |
| 5 | 1 | $RSRP_{5,3}$ |
| ... | ... | ... |
| 1 | 0 | $RSRP_{1,1}$ |

In order to change from the base station beam currently being used with the corresponding indicator turned on (1), the base station should change the beam through a procedure such as transmitting the BCI message to the terminal.

In this case, the corresponding indicator turned on (1) indicates that the terminal should use a terminal beam different from the currently used terminal beam to perform communication.

At this time, when the currently used base station beam is changed to a base station beam with an indicator turned off (0), the base station can arbitrarily change the beam without providing any information to the terminal. In this case, consumption of time, such as promising and waiting for the BCI message transmission and the beam change, is reduced and therefore efficient and fast beam change becomes possible.

Also, the indicator may indicate the base station beams that the terminal can receive simultaneously. In this case, it may indicate that the terminal can simultaneously receive base station beams indicated by the corresponding indicator with the same Rx beam (or simultaneously receivable and available Rx beams). In this case, the base station may use two or more base station beams simultaneously indicated by the indicator to perform transmission to the terminal.

On the other hand, the terminal Rx beam ID column may be removed from information that the terminal actually feeds back to the base station. Of course, another case of including the terminal Rx beam ID may also be considered.

A method for beam change/beam simultaneous use through an indicator of a base station will now be described.

The base station (eNB, gNB, or transmission and reception point (TRP)) may select and change a beam to be used for communication with the terminal through the information received as described above. At this time, in a case of using a beam with an indicator that indicates to require transmission of a BCI message for beam change, the corresponding beam should be used after the beam change request message transmission and beam change procedure is performed.

On the other hand, in a case of using a beam requiring no transmission of the BCI message for beam change because an indicator indicates that the terminal can receive using the same Rx beam, the corresponding beam may be used freely without requiring the beam change request message transmission and beam change procedure.

Also, the indicator may indicate the base station beams that the terminal can receive simultaneously. In this case, it may indicate that the terminal can simultaneously receive base station beams indicated by the corresponding indicator using the same Rx beam (or Rx beams). In this case, the base station may use two or more base station beams simultaneously indicated by the indicator to perform transmission to the terminal.

A method for using as an indicator to indicate when the simultaneous reception is impossible will now be described.

The indicator may indicate the base station beams that the terminal cannot simultaneously receive. In this case, the indicator may indicate that the base station beams indicated by the corresponding indicator using the same Rx beam (or Rx beams) may not be simultaneously received by the terminal. The base station may utilize two or more base station beams included in different indicator groups to perform transmission to the terminal.

If the terminal can use multiple Rx beams simultaneously, it is possible to group and indicate the base station beams that cannot be used simultaneously to obtain diversity gain using these different Rx beams, based on the same Rx beam or to maximize the diversity gain.

For example, referring to Table 23a, the terminal indicates information that can be received using the same Rx beam to the network by grouping the Tx beams of the network. In this case, if the terminal can receive different Rx beams simultaneously, beams that can be simultaneously transmitted using this information should be selected from base station beams belonging to different group indications rather than the same group indication. Therefore, the terminal can simultaneously receive these base station beams by using different Rx beams.

A first beam feedback transmission scheme according to beam selection at initial connection will now be described.

Figure 2J:
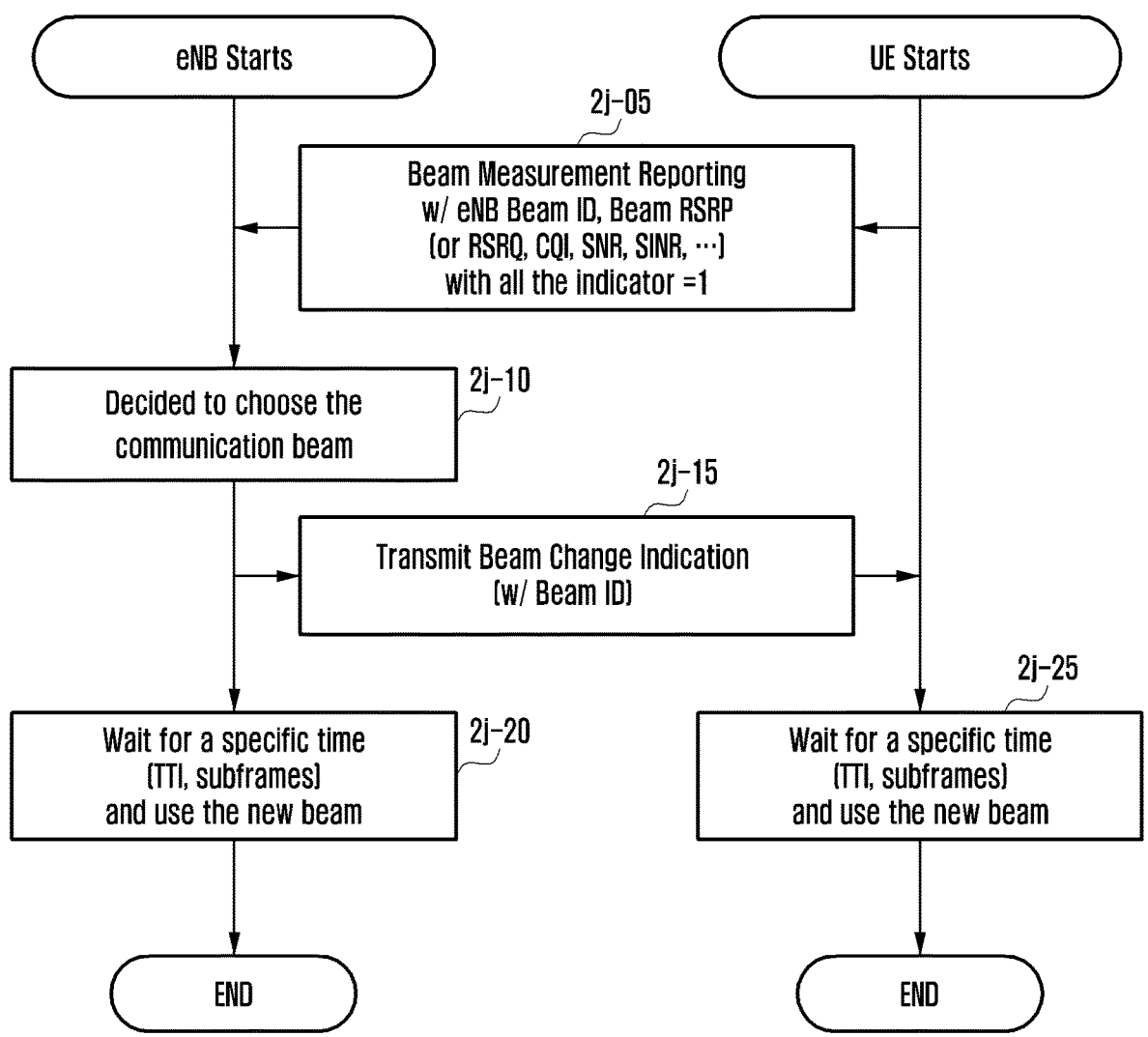
FIG. 2J is a diagram illustrating operations of a base station and a terminal according to a first beam feedback transmission method for selection of a used beam at the initial connection, according to an embodiment of the present disclosure.

FIG. 2J is a diagram illustrating operations of a base station and a terminal according to a the first beam feedback transmission method for selection of a used beam at the initial connection, according to an embodiment of the present disclosure.

Referring to FIG. 2J, in order for the terminal to select an indicator to be included in the beam feedback, it is necessary to recognize the currently used Rx beam. To do this, the first Rx beam is selected when the terminal first connects to the network, and then the indicator in beam feedback to be transmitted is selected.

The terminal and the base station specify a usable beam by using a method other than beam feedback. The terminal selects the beam pair having the highest success rate through the pre-beam measurement result and successfully performs random access by using the corresponding beam pair. The terminal performs random access in any way and successfully receives a RAR from the base station by using a specific beam. The terminal successfully receives a UE specific message from the base station in any manner.

When the terminal and the base station specify a usable beam by using the beam feedback, the terminal transmits all indicators in the beam feedback to be sent before the beam is specified, indicating that a beam change message is required (e.g., 1).

A transmission scheme including beam group information in a beam change indication of a base station will now be described.

If the terminal constructs a group of beam information and transmits it to the base station, the base station may select the following methods when transmitting a beam change indication for use of a new beam to the corresponding terminal in the downlink.

The base station may select a method for transmitting a beam ID to be changed and a beam group ID to which the beam to be changed belongs.

The network may transmit a beam ID and a beam group ID to be changed to the terminal. For example, if the beam group ID is an ID indicating a group of beams that can be simultaneously received by the terminal, and if the base station transmits such a beam group ID, the terminal knows the beam group ID and thereby knows which Rx beam to use for receiving the base station transmission. In a multi-antenna transmission/reception structure in which one base station beam can be received with two or more terminal beams, since the same base station beam may belong to two or more different terminal beam groups, the operation of the terminal can be simplified when the base station gives a clear message to indicate the receiving terminal such a beam classification by using a certain beam group. On the other hand, the base station has an overhead to perform additional operations to identify and select such terminal groups. Considering a battery-operated terminal, this operation performed by the network instead of the terminal may increase the battery usage time of the terminal.

The network may transmit only the beam group ID without transmitting the beam ID to be changed to the terminal. For example, if the beam group ID is an ID indicating a group of beams that can be simultaneously received by the terminal, and if the base station transmits such a beam group ID, the terminal knows the beam group ID and thereby knows which Rx beam to use for receiving the base station transmission. The terminal needs only to receive information successfully from the base station and to transmit its own information, so that information can be given to properly select only the terminal beam. This method has an advantage of simplifying the operation of the terminal by giving a clear message to indicate the receiving terminal by using a certain beam group. In addition, there is an advantage that the base station can use the beam overlappingly or changeably at any time in the group.

After receiving the beam group ID, the terminal performs communication using a terminal Rx beam (or Rx beams) capable of receiving base station information transmitted with the corresponding beam group ID. This operation may be the same as the beam change operation of FIG. 2E, and may transmit the signal including the beam group ID instead of the beam ID in the downlink information to be transmitted for beam change only.

According to an embodiment of the present disclosure, the terminal may measure the degradation of the beam or beams in use and trigger a beam recovery procedure to recover the beam or beams to another beam. The procedure for determining the performance degradation of the beam in use is referred to as a beam failure detection procedure, and the condition for triggering the beam recovery procedure including the beam failure detection procedure can be achieved by the following method.

According to the beam failure detection method, the beam may be any beam (a base station beam, a terminal beam, or a pair of such beams) used by the terminal and the base station, or any beam group (a set of beams) used explicitly (or implicitly) by the terminal and the base station.

In this case, the beam may be a physical antenna setting, or may be a measurement unit of the terminal (e.g., synchronization signal (SS) block, SS burst, SS burst set, CSI-RS block, CSI-RS burst, or CSI-RS burst set).

Resource/RS Configuration may be accomplished by beam recovery transmission resource allocation (i.e., RACH time/frequency/sequence, or any dedicated/common resource). Beam (or beams) information for which the terminal compares condition 1 may be beam ID, RS position, frequency, and time. Values such as threshold or offset may be required by the terminal.

L1 detection may be performed. If the beam(s) measured by the physical layer satisfies condition 1, the beam failure is determined. The physical layer transmits a corresponding indication to the upper layer for later operation. The upper layer initiates the beam recovery procedure after receiving indication.

L2 detection with L1 indication may be performed. If the beam(s) measured by the physical layer satisfies condition 1, the indication is transmitted to the upper layer. The L2 layer receives one or more indications from the physical layer and, if the reception of the indications satisfies condition 2, the L2 layer determines the beam failure and/or the beam recovery triggering. The L2 layer initiates the beam recovery procedure.

L3 detection with L1 indication may be performed. If the beam(s) measured by the physical layer satisfies condition 1, the indication is transmitted to the upper layer. The L3 layer receives one or more indications from the physical layer and, if the reception of the indications satisfies condition 2, determines the beam failure and/or the beam recovery triggering. The L3 layer initiates the beam recovery procedure.

L2 detection with L1 indication may be performed. If the beam(s) measured by the physical layer satisfies condition 1, the indication is transmitted to the upper layer. If the terminal receives one or more indications from the physical layer and, if the reception of the indications satisfies condition 2, the terminal tries the UL beam feedback transmission using pre-allocated resources (L1 feedback and/or L2 feedback).

If condition 3 is satisfied, the L2 layer determines the beam failure and/or the beam recovery triggering. The L2 layer initiates the beam recovery procedure.

L3 detection with L1 indication may be performed. If the beam(s) measured by the physical layer satisfies condition 1, the indication is transmitted to the upper layer. If the terminal receives one or more indications from the physical layer and, if the reception of the indications satisfies condition 2, the terminal tries the UL beam feedback transmission using pre-allocated resources (L1 feedback and/or L2 feedback and/or L3 reporting).

If condition 3 is satisfied, the L3 layer determines the beam failure and/or the beam recovery triggering. The L3 layer initiates the beam recovery procedure.

The condition 1 may be a measurement value of the beam(s) with the base station control channel measurable by the terminal<Threshold 1.

The condition 1 may be an estimated DL signal reception error probability>N1%.

The condition 1 may be a measurement value of the beam(s)<Threshold 1 and any one beam measurement value>Threshold 2.

The condition 1 may be a measurement value of beam set 1 promised in advance with the base station (or configured from the base station)<Threshold 1.

The condition 1 may be any condition created by a combination of the above conditions.

The condition 2 may be the same as above condition 1 or a continuous N2 times reception of indications (i.e., L1 OOS).

The condition 2 may be N3 times reception or more of indications within a given time (timer 2) (i.e., L1 OOS).

The condition 2 may be any one beam measurement value>Threshold 2.

The condition 2 may be a measurement value of a certain beam in beam set 2 promised in advance with the base station (or configured from the base station)<Threshold 2.

If any timer 1 triggered immediately after the condition 1 is satisfied is expired then the timer 1 may be a value set in the terminal implementation in a case of failing to receive IS from L1 in the timer 1, in a case of failing to succeed in UL signal transmission in the timer 1, or in a case of maintaining the condition 1 in the timer 1. In addition, the timer 1 may be a value configured by the base station, the timer 1 may be canceled when any indication (i.e., in-sync-indicator) is received from the lower layer, the timer 1 may be canceled when any indication (i.e., RLF triggering indication, RLF declaration indication) is received from the upper layer, or any condition created by a combination of the above conditions.

The condition 3 may be a continuous N4 times reception of indications (i.e., L1 out of service (OOS)) or N5 times reception or more of indications within a given time (timer 2) (i.e., L1 OOS).

The condition 3 may be any one beam measurement value>Threshold 3.

The condition 3 may be a measurement value of certain beam in beam set 2 promised in advance with the base station (or configured from the base station)<Threshold 3.

If any timer 2 triggered immediately after condition 2 is satisfied is expired then the timer 2 may be a value set in the terminal implementation or the timer 2 may be a value configured by the base station in a case of failing to receive IS from L1 in the timer 2, a case of failing to succeed in UL signal transmission in the timer 2 or a case of maintaining the condition 1 and/or the condition 2 in the timer 2. The timer 2 may be a value configured by the base station, or the timer 2 may be a time value greater than a certain threshold 4 and a timer indicating a position of an uplink transmittable resource (PRACH, or SR resource) to arrive within a time period exceeding the threshold 4 or more. Additionally, the timer 2 may be canceled when any indication (i.e., in-sync-indicator) is received from the lower layer, when any indication (i.e., RLF triggering indication or RLF declaration indication) is received from the upper layer, or when any condition created by a combination of the above conditions is satisfied.

A beam recovery request signal transmission method will now be described. The terminal may perform a beam recovery operation when the beam failure condition is satisfied. Specifically, the terminal may transmit an uplink beam recovery request signal for the beam recovery. To this end, the terminal can trigger UL beam recovery request signal immediately if the beam failure condition 2 is met.

Figure 2K:
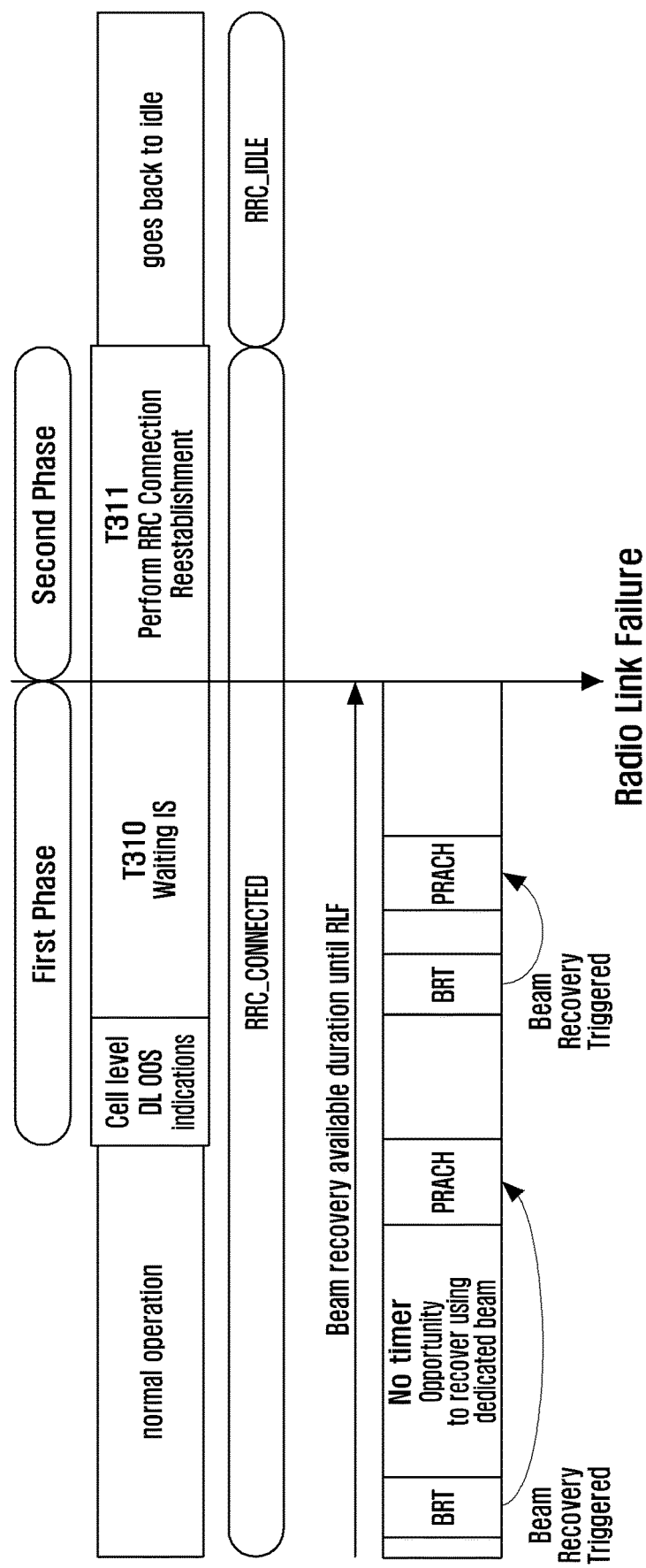

FIG. 2K illustrates a method for a terminal to attempt a beam recovery request transmission when the condition 2 is satisfied, in association with an RLF operation, according to an embodiment of the present disclosure.

Referring to FIG. 2K, if the condition 2 is satisfied, the terminal immediately triggers the uplink beam recovery request signal transmission to arrive within the nearest time. At this time, if there is a large difference between the resource for uplink transmission and the triggered time, the terminal waits for a corresponding time and determines whether the triggering condition is satisfied or canceled.

Also, between the trigger time point and the actual transmission time point, the terminal continuously transmits the UL signal by using the uplink resource allocated in advance. At this time, if the measured value of the resource is less than a certain threshold value (condition 1), an attempt may be made to perform uplink transmission (beam resumption: uplink feedback using pre-allocated resources).

If the triggering condition 1 is canceled (or if it is no longer satisfied) even though the triggered uplink beam recovery request (BRR) signal transmission time has not arrived yet, the terminal may cancel all the procedures in progress. For example, if the received signal strength of a certain beam is below a certain threshold so that the transmission of the corresponding uplink BRR signal is triggered, and if the received signal strength of the corresponding beam is observed again above the threshold before arriving at the transmission time, the transmission of the uplink BRR signal may be canceled.

A trigger UL beam recovery request signal after condition 3 is met after the beam failure condition is met may be provided.

Figure 2L:
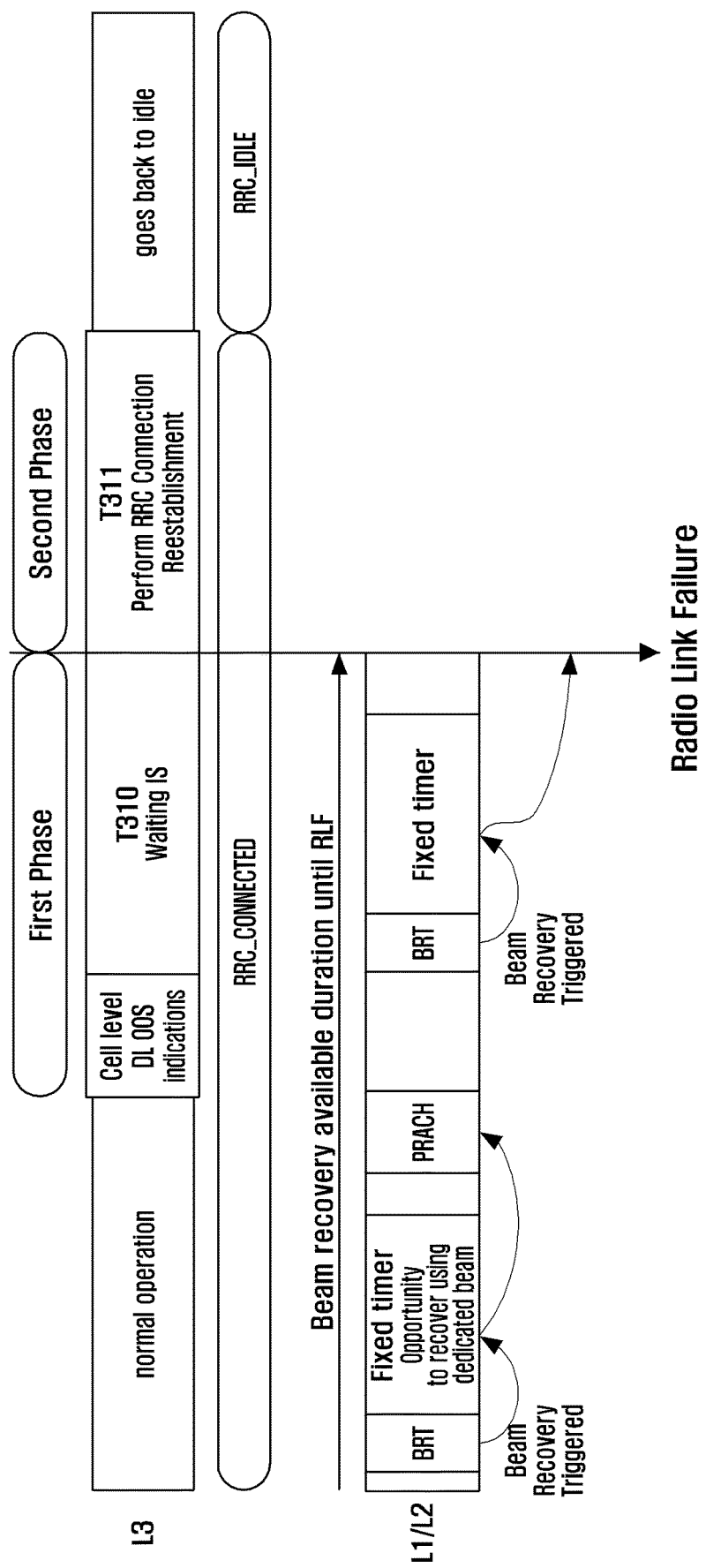

FIG. 2L illustrates a method for a terminal to attempt a beam recovery request transmission when a certain condition 2 is satisfied, in association with an RLF operation, according to an embodiment of the present disclosure. FIG. 2L is an example of performing an operation of waiting for a time until the PRACH arrives at the end of a fixed timer.

Referring to FIG. 2L, the terminal sets a condition 3 (e.g., a timer) when the condition 2 is satisfied, and continuously transmits a UL signal by using the pre-allocated uplink resource while waiting for the condition to be satisfied. At this time, even if the measured value of the resource is less than a certain threshold value (condition 1), the uplink transmission may attempt to increase the success rate.

If the condition 3 is satisfied, the terminal immediately triggers transmission of the uplink beam recovery request signal to arrive within the shortest time.

At this time, if there is a difference between the time at which the condition 3 is satisfied and the resource to perform the UL beam recovery request, the terminal may perform an operation to be performed when the condition 2 is satisfied (beam resumption: uplink feedback using pre-allocated resources), and may determine whether the condition 1 is canceled.

If the corresponding triggering condition 1 is canceled (or if it is no longer satisfied) even though the condition 3 is not satisfied, the terminal may cancel all the procedures in progress. For example, if the received signal strength of a certain beam is below a certain threshold so that the transmission of the corresponding uplink BRR signal is triggered, and if the received signal strength of the corresponding beam is observed again above the threshold before arriving at the transmission time, the transmission of the uplink BRR signal may be canceled. If the triggering condition 1 is canceled (or if it is no longer satisfied) even though the resource time to perform UL beam recovery request transmission has not arrived yet, the terminal may cancel all the procedures in progress.

Also, if radio link failure (RLF) is first performed even though the condition 3 is not satisfied, or if the RLF is declared before reaching the nearest PRACH arrival time even though the condition 3 is satisfied, the terminal may cancel all beam recovery operations and perform an operation according to the RLF.

Figure 2M:
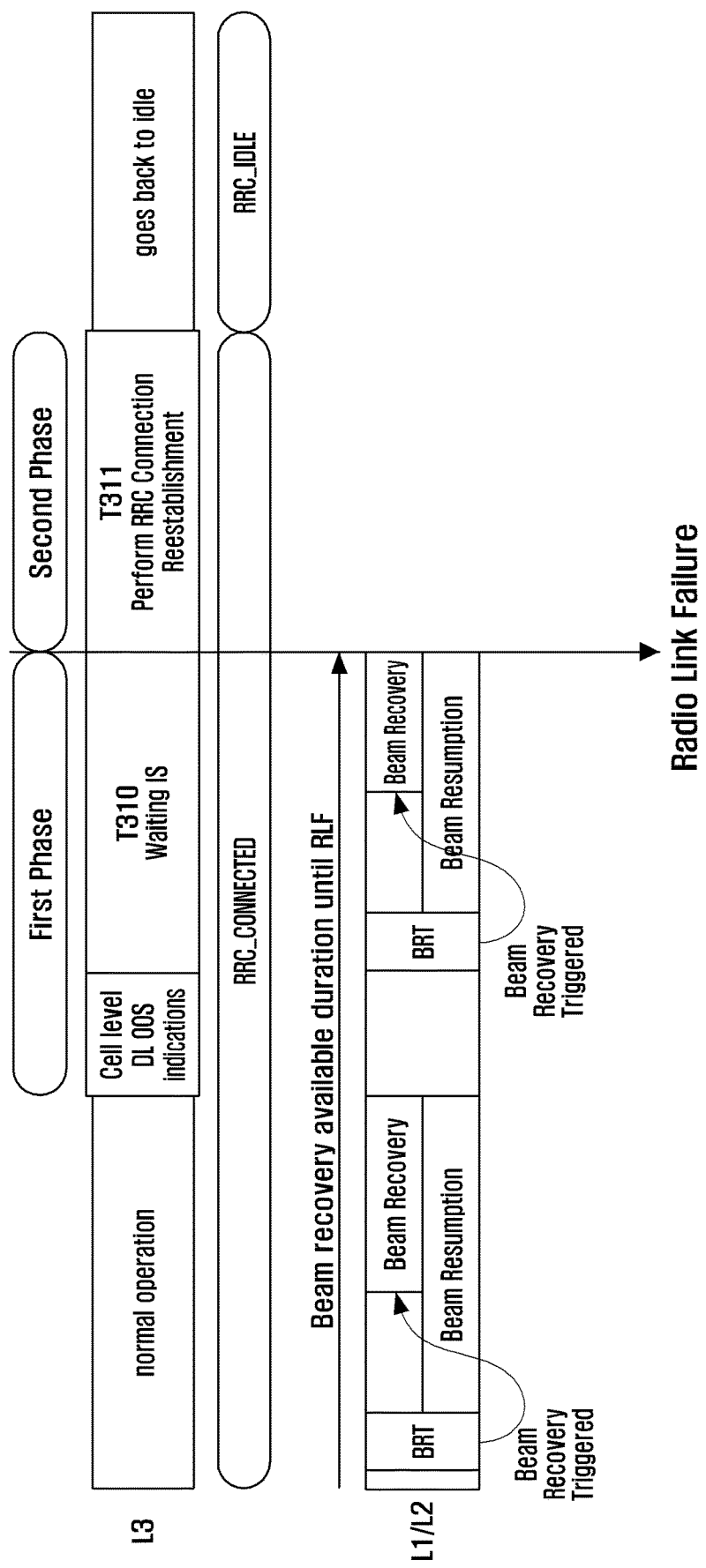
Figure 20:
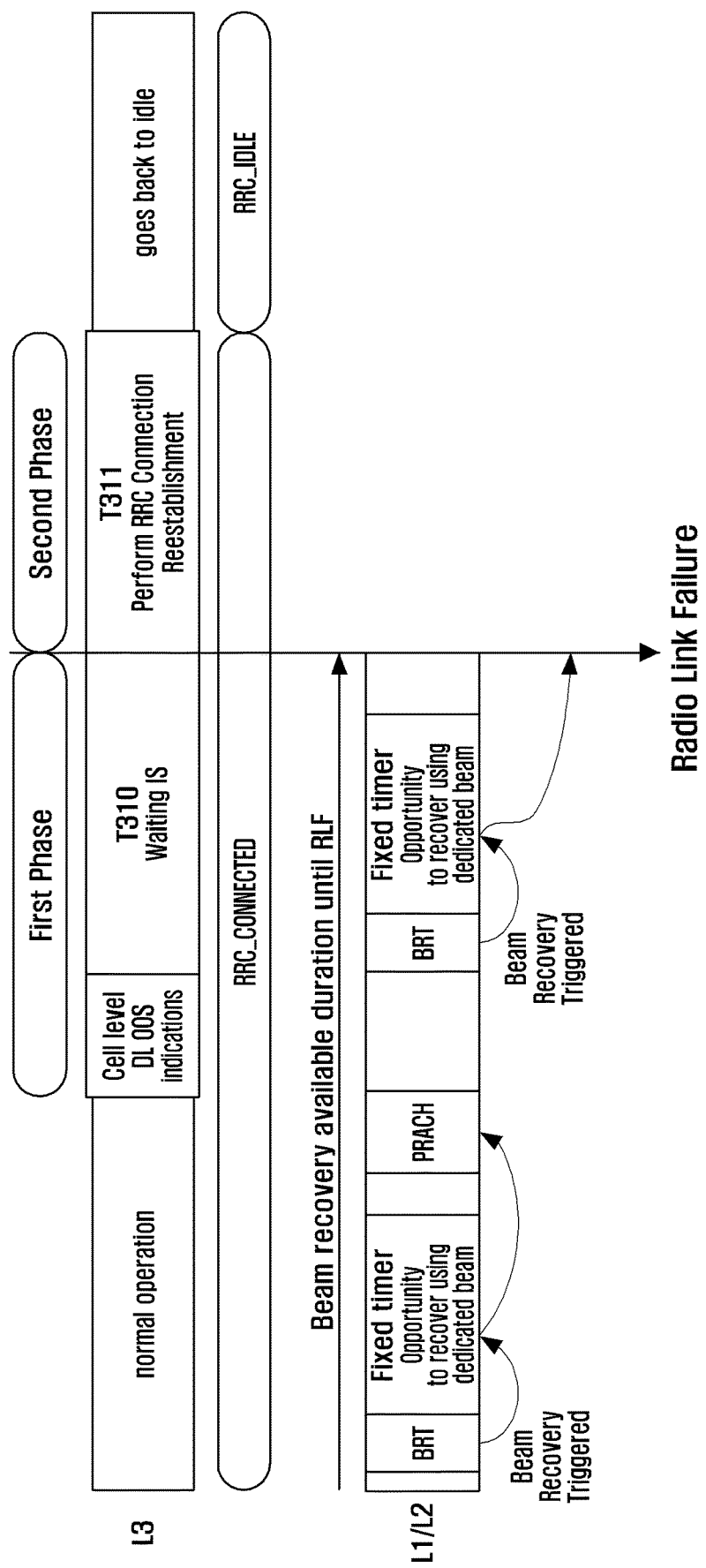

FIG. 2M illustrates a method for a terminal to attempt a beam recovery request transmission when a certain condition 2 is satisfied, in association with an RLF operation, according to an embodiment of the present disclosure.

Referring to FIG. 2M, shown is an example in which BRT is declared by the condition 1 or 2 and the terminal performs a beam resumption operation (i.e., uplink feedback using pre-allocated resources) until a certain condition 3 is satisfied (i.e., fixed timer expiration), and then, when the condition 3 is satisfied, performs the beam resumption operation (i.e., uplink feedback using pre-allocated resources) while attempting the beam recovery using the PRACH. In this case, the beam recovery using the PRACH may be continuously performed when the condition 1 is satisfied, be attempted only for a corresponding timer with a certain timer_br, or be attempted until a successive (or discontinuous) N_max_br failure occurs.

FIG. 2N illustrates a method for a terminal to attempt a beam recovery request transmission when a certain condition 2 is satisfied, in association with an RLF operation, according to an embodiment of the present disclosure.

FIG. 2N is an example in which BRT is declared by the condition 1 or 2 and the terminal performs a beam resumption operation (i.e., uplink feedback using pre-allocated resources) while attempting the beam recovery using the PRACH. In this case, the beam recovery using the PRACH may be continuously performed when the condition 1 is satisfied, be attempted only for a corresponding timer with a certain timer_br, or be attempted until a successive (or discontinuous) N_max_br failure occurs.

FIG. 2O illustrates a method for a terminal to attempt a beam recovery request transmission when a certain condition 2 is satisfied, in association with an RLF operation, according to an embodiment of the present disclosure.

Referring to FIG. 2O, the terminal sets a certain condition 3 (e.g., a timer), waits for the condition to be satisfied, and transmits a UL signal by using a pre-allocated uplink resource (beam resumption). At this time, the uplink transmission may attempt to increase the success rate even though the measured value of the resource is less than a certain threshold value (condition 1).

Even though the fixed timer is terminated, the terminal may continue to perform the beam resumption operation until the PRACH arrival time or the RLF declaration time. If the condition 3 is satisfied, the terminal immediately triggers transmission of the uplink beam recovery request signal to arrive within the shortest time.

Also, if RLF is first performed even though the condition 3 is not satisfied, or if the RLF is declared before reaching the nearest PRACH arrival time even though the condition 3 is satisfied, the terminal may cancel all beam recovery operations and perform an operation according to the RLF.

Figure 2P:
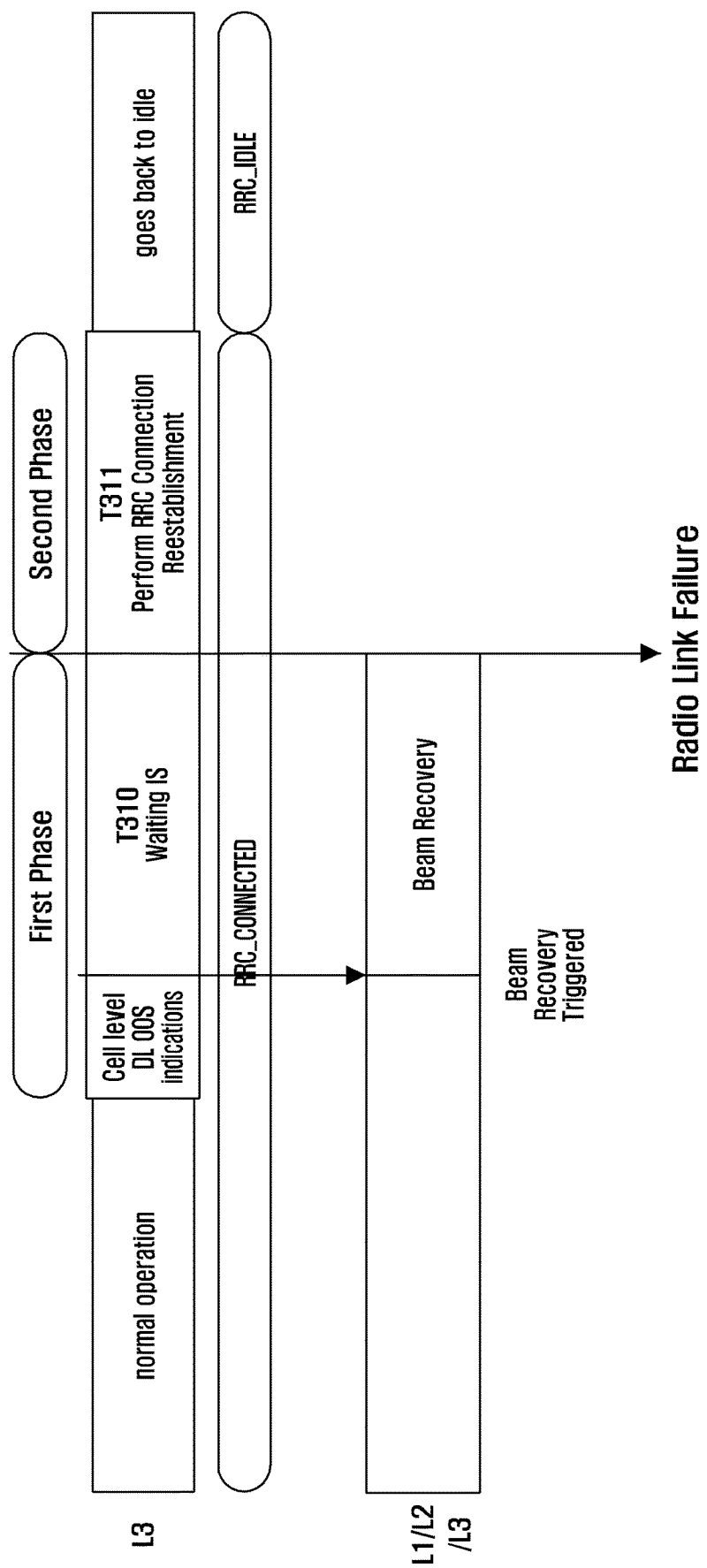

FIG. 2P illustrates a method for a terminal to attempt a beam recovery request transmission when a certain condition 2 is satisfied, in association with an RLF operation, according to an embodiment of the present disclosure.

Referring to FIG. 2P, when the T310 timer for RLF is triggered, the terminal may trigger a beam recovery request at the same time. In this instance, the terminal may transmit a beam recovery request trigger message from the RRC layer to the MAC/PHY layer or from the MAC layer to the PHY layer.

Conversely, if a beam problem is detected by the condition 1 or 2, the terminal may transmit this to the upper layer to trigger the T310 timer. For this, the terminal may transmit a T310 trigger message from the PHY layer to the MAC/RRC layer or from the MAC layer to the RRC layer.

Control channels used to declare the beam failure and reference signals (RS) for measurement of each channel may be RSs and channels scheduled in advance by the base station.

The candidates for the corresponding beam failure detection RSs may include UE-specific resource scheduled CSI-RS with dedicated signal configured including CSI-RS with characteristics/resources allocated for that terminal only, cell-specific resource scheduled CSI-RS with dedicated signal configured including CSI-RS with characteristics/resources allocated for unspecified multiple terminals and NR-Sync Signal (PSS, SSS, PBCH) including synchronous signal and broadcast channel signal with characteristics/resources allocated for unspecified multiple terminals.

The beams (such as a new candidate beam or a RACH performed beam) used for performing the beam recovery may be RSs pre-scheduled by the base station or RSs capable of self-measurement by the terminal.

The candidates for the corresponding beam recovery identification RSs may include UE-specific resource scheduled CSI-RS with dedicated signal configured including CSI-RS with characteristics/resources allocated for that terminal only, cell-specific resource scheduled CSI-RS with dedicated signal configured including CSI-RS with characteristics/resources allocated for unspecified multiple terminals and NR-Sync Signal (PSS, SSS, PBCH) including synchronous signal and broadcast channel signal with characteristics/resources allocated for unspecified multiple terminals.

The reference signals (RSs) used for performing the cell level problem detection may be RSs previously scheduled by the base station or RSs measured by the terminal itself.

An RLF declaration method due to failure of beam recovery will now be described.

According to an embodiment of the present disclosure, the terminal may declare the RLF when the beam recovery operations performed continuously fail. Specifically, the terminal may declare the RLF when beam recovery fails N_RLF1 continuously (NACK count or failure indication count, in case of failure within Timer_RLF1, when N_RLF2 times failed in Timer_RLF2 (regardless of whether it is discontinuous), when an RLF declaration request DL signal is received from the network (or from Node-B) in response to recovery attempt, or in case of failing to attempt beam recovery more than Timer_RLF3 (when condition 3 is dissatisfied) after beam failure declaration (the condition 1 or 2).

Referring to FIG. 1Y, the transceiver 1y-10 of the terminal may transmit and receive a signal. The transceiver 1y-10 may transmit and receive a signal under the control of the controller 1y-30. The controller 1y-30 of the terminal may control the overall operation of the terminal. The controller 1y-30 may control the terminal to perform the operations described with reference to FIGS. 2A to 2P.

For example, the controller 1y-30 may control performing a beam measurement for at least one transmission beam of a base station and at least one beam of the terminal, transmitting beam measurement information to the base station, based on the beam measurement, and receiving downlink information through a new transmission beam of the base station. The new transmission beam of the base station may be changed, based on a relationship between the new transmission beam of the base station and a current reception beam of the terminal included in the beam measurement information.

If the new transmission beam of the base station corresponds to the current reception beam of the terminal, the transmission beam of the base station may be changed without receiving a beam change indication message from the base station. If the new transmission beam of the base station does not correspond to the current reception beam of the terminal, the controller 1y-30 may control receiving a beam change indication message from the base station.

Also, the reception beam of the terminal and the transmission beam of the base station may be changed after the beam change indication message is transmitted and then a predetermined time elapses. The beam measurement information may include an indicator, and the indicator may indicate whether the terminal is capable of receiving the transmission beam of the base station in the current reception beam of the terminal.

The transceiver 1z-10 of the base station 1z-00 may transmit and receive a signal. The transceiver 1z-10 may transmit and receive a signal under the control of the controller 1z-30. The controller 1z-30 of the base station may control the overall operation of the base station. The controller 1z-30 may control the base station to perform the operations described with reference to FIGS. 2A to 2P.

For example, the controller 1z-30 may control receiving beam measurement information from a terminal, determining a transmission beam change of the base station for the terminal, based on the beam measurement information, and changing a transmission beam of the base station, based on a relationship between a new transmission beam of the base station and a current reception beam of the terminal included in the beam measurement information.

In addition, when the new transmission beam of the base station corresponds to the current reception beam of the terminal, the transmission beam of the base station may be changed without transmitting a beam change indication message. Also, when the new transmission beam of the base station does not correspond to the current reception beam of the terminal, the controller 1z-30 may control transmitting a beam change indication message to the terminal. And also, the transmission beam of the base station may be changed after the beam change indication message is transmitted and then a predetermined time elapses.

Further, the beam measurement information may include an indicator, and the indicator may indicate whether the terminal is capable of receiving the transmission beam of the base station in the current reception beam of the terminal.

While the present disclosure has been shown and described with reference to certain embodiments thereof, it is understood by those skilled in the art that various changes in form and details may be made therein without departing from the spirit and scope of the present disclosure, which is defined, not by the detailed description and embodiments, but by the appended claims and their equivalents.

What is claimed is:

1. An operating method of a base station in a wireless communication system, the method comprising:
   transmitting, to a terminal, configuration information including information associated with a beam group;
   transmitting, to the terminal, reference signals for measuring beams;
   receiving, from the terminal, beam measurement information determined based on the reference signals, the beam measurement information including a reference signal received power (RSRP) of a beam pair included in the beam group and a beam group identity (ID);
   determining, based on the beam measurement information, a second transmission beam of the base station in case of determining to change a first transmission beam of the base station; and
   determining whether to transmit a beam change indication message based on the second transmission beam and the beam group ID.

2. The method of claim 1, further comprising:
   determining not to transmit the beam change indication message in case that a beam group ID corresponding to the second transmission beam is identical to a beam group ID corresponding to the first transmission beam.

3. The method of claim 1, further comprising:
   transmitting, to the terminal, the beam change indication message in case that a beam group ID corresponding to the second transmission beam is not identical to a beam group ID corresponding to the first transmission beam.

4. The method of claim 1, wherein the first transmission beam is changed to the second transmission beam after a predetermined time.

5. A base station comprising:
   a transceiver; and
   a controller coupled with the transceiver and configured to:
   transmit, to a terminal, configuration information including information associated with a beam group,
   transmit, to the terminal, reference signals for measuring beams,
   receive, from the terminal, beam measurement information determined based on the reference signals, the beam measurement information including a reference signal received power (RSRP) of a beam pair included in the beam group and a beam group identity (ID),
   determine, based on the beam measurement information, a second transmission beam of the base station in case of determining to change a first transmission beam of the base station, and
   determine whether to transmit a beam change indication message based on the second transmission beam and the beam group ID.

6. The base station of claim 5, wherein the controller is further configured to determine not to transmit the beam change indication message in case that a beam group ID corresponding to the second transmission beam is identical to a beam group ID corresponding to the first transmission beam.

7. The base station of claim 5, wherein the controller is further configured to:
   transmit, to the terminal, a beam change indication message in case that a beam group ID corresponding to the second transmission beam is not identical to a beam group ID corresponding to the first transmission beam.

8. The base station of claim 7, wherein the first transmission beam is changed to the second transmission beam after a predetermined time.

9. An operating method of a terminal in a wireless communication system, the method comprising:
   receiving, from a base station, configuration information including information associated with a beam group;
   receiving, from the base station, reference signals for measuring beams; and
   transmitting, to the base station, beam measurement information determined based on the reference signals, the beam measurement information including a reference signal received power (RSRP) of a beam pair included in the beam group and a beam group identity (ID), wherein a second transmission beam of the base station is determined based on the beam measurement information in case that a first transmission beam of the base station is determined to be changed, and wherein it is determined whether to transmit a beam change indication message based on the second transmission beam and the beam group ID.

10. The method of claim 9, wherein the beam change indication message is not received from the base station in case that a beam group ID corresponding the second transmission beam is identical to a beam group ID corresponding to the first transmission beam.

11. The method of claim 9, further comprising:
receiving, from the base station, the beam change indication message in case that a beam group ID corresponding to the second transmission beam is not identical to a beam group ID corresponding to the first transmission beam.

12. The method of claim 11, wherein a reception beam of the terminal is changed after a predetermined time.

13. A terminal comprising:
a transceiver; and
a controller coupled with the transceiver and configured to:
receive, from a base station, configuration information including information associated with a beam group,
receive, from the base station, reference signals for measuring beams, and
transmit, to the base station, beam measurement information determined based on the reference signals, the beam measurement information including a reference signal received power (RSRP) of a beam pair included in the beam group and a beam group identity (ID), wherein a second transmission beam of the base station is determined based on the beam measurement information in case that a first transmission beam of the base station is determined to be changed, and wherein it is determined whether to transmit a beam change indication message based on the second transmission beam and the beam group ID.

14. The terminal of claim 13, wherein the beam change indication message is not received from the base station in case that a beam group ID corresponding the second transmission beam is identical to a beam group ID corresponding to the first transmission beam.

15. The terminal of claim 13, wherein the controller is further configured to receive, from the base station, the beam change indication message in case that a beam group ID corresponding to the second transmission beam is not identical to a beam group ID corresponding to the first transmission beam.

16. The terminal of claim 15, wherein a reception beam of the terminal is changed after a predetermined time.

* * * * *